US011327302B2

(12) United States Patent
Holst

(10) Patent No.: US 11,327,302 B2
(45) Date of Patent: May 10, 2022

(54) SECURE CAPTURE AND TRANSFER OF IMAGE AND AUDIO DATA

(71) Applicant: Beth Holst, Springfield, VA (US)

(72) Inventor: Beth Holst, Springfield, VA (US)

( * ) Notice: Subject to any disclaimer, the term of this patent is extended or adjusted under 35 U.S.C. 154(b) by 855 days.

(21) Appl. No.: 15/979,605

(22) Filed: May 15, 2018

(65) Prior Publication Data

US 2018/0267301 A1 Sep. 20, 2018

Related U.S. Application Data

(63) Continuation-in-part of application No. 14/489,558, filed on Sep. 18, 2014, now Pat. No. 10,008,124.
(Continued)

(51) Int. Cl.
| | | |
|---|---|---|
| G02B 27/00 | (2006.01) |
| G02B 27/01 | (2006.01) |
| G03B 17/56 | (2021.01) |
| H04N 7/18 | (2006.01) |
| G09B 19/00 | (2006.01) |
| G09B 7/02 | (2006.01) |
| G03B 29/00 | (2021.01) |
| H04N 5/225 | (2006.01) |

(Continued)

(52) U.S. Cl.
CPC ....... *G02B 27/0093* (2013.01); *G02B 27/017* (2013.01); *G03B 17/561* (2013.01); *G03B 29/00* (2013.01); *G09B 7/02* (2013.01); *G09B 19/00* (2013.01); *H04N 5/2252* (2013.01); *H04N 5/23206* (2013.01); *H04N 5/23219* (2013.01); *H04N 7/181* (2013.01); *H04N 7/185* (2013.01); *H04N 21/21805* (2013.01); *G02B 2027/014* (2013.01); *G02B 2027/0138* (2013.01); *G02B 2027/0178* (2013.01); *H04N 5/247* (2013.01)

(58) Field of Classification Search
CPC .............. G02B 27/0093; G02B 27/017; G02B 2027/014; G02B 2027/0178; G02B 2027/0138; H04N 21/21805; H04N 7/185; H04N 5/2252; H04N 5/23219; H04N 5/23206; H04N 7/181; H04N 5/247; G09B 19/00; G09B 7/02; G03B 29/00; G03B 17/561
See application file for complete search history.

(56) References Cited

U.S. PATENT DOCUMENTS

| | | | |
|---|---|---|---|
| 4,145,122 | A | 3/1979 | Rinard et al. |
| 4,659,197 | A | 4/1987 | Weinblatt |

(Continued)

FOREIGN PATENT DOCUMENTS

| | | |
|---|---|---|
| CN | 101393325 A | 3/2009 |
| CN | 203118082 U | 8/2013 |
| EP | 2026264 A2 | 2/2009 |

*Primary Examiner* — Nasim N Nirjhar
(74) *Attorney, Agent, or Firm* — Edell, Shapiro & Finnan, LLC

(57) ABSTRACT

Secure monitoring of the field of view of remotely located operators comprises capturing video and data signals representing a series of images including the forward field of view of the operator and the operator's ocular movement and may also include rearward and other operator fields of view. The images are transmitted to an operator microprocessor which, in turn, transmits the signals to a centrally located server where the signals are processed and the resulting information saved in files dedicated to respective operators.

21 Claims, 48 Drawing Sheets

Related U.S. Application Data

(60) Provisional application No. 61/879,257, filed on Sep. 18, 2013.

(51) Int. Cl.
*H04N 5/232* (2006.01)
*H04N 21/218* (2011.01)
*H04N 5/247* (2006.01)

(56) References Cited

U.S. PATENT DOCUMENTS

| | | | |
|---|---|---|---|
| 4,687,310 A | 8/1987 | Cuvillier | |
| 5,915,973 A | 6/1999 | Hoehn-Saric et al. | |
| 6,077,237 A * | 6/2000 | Campbell | G06F 3/011 600/587 |
| 6,130,783 A | 10/2000 | Yagi et al. | |
| 6,333,826 B1 | 12/2001 | Charles | |
| 6,392,687 B1 | 5/2002 | Driscoll, Jr. et al. | |
| 6,424,377 B1 | 7/2002 | Driscoll, Jr. et al. | |
| 6,449,103 B1 | 9/2002 | Charles | |
| 6,480,229 B1 | 11/2002 | Driscoll, Jr. et al. | |
| 6,615,020 B2 | 9/2003 | Richter et al. | |
| 6,637,883 B1 | 10/2003 | Tengshe et al. | |
| 6,999,714 B2 | 2/2006 | Pfenninger et al. | |
| 7,206,022 B2 | 4/2007 | Miller et al. | |
| 7,242,425 B2 | 7/2007 | Driscoll, Jr. et al. | |
| 7,245,273 B2 | 7/2007 | Eberi et al. | |
| 7,391,887 B2 | 6/2008 | Durnell | |
| 7,649,690 B2 | 1/2010 | Simkulet et al. | |
| 8,164,655 B2 | 4/2012 | Lablans | |
| 8,510,166 B2 | 8/2013 | Neven | |
| 8,713,130 B2 | 4/2014 | Logan et al. | |
| 8,736,680 B1 | 5/2014 | Cilia et al. | |
| 9,069,444 B1 * | 6/2015 | Hansen | G06F 16/178 |
| 9,958,934 B1 * | 5/2018 | Mullen | A63F 13/212 |
| 2002/0172931 A1 | 11/2002 | Greene et al. | |
| 2003/0071891 A1 | 4/2003 | Geng | |
| 2004/0061831 A1 | 4/2004 | Aughey et al. | |
| 2005/0018069 A1 | 1/2005 | Krogmann et al. | |
| 2007/0048723 A1 | 3/2007 | Brewer et al. | |
| 2007/0109411 A1 | 5/2007 | Jung et al. | |
| 2007/0117083 A1 | 5/2007 | Winneg et al. | |
| 2011/0207108 A1 | 8/2011 | Dorman | |
| 2011/0223576 A1 | 9/2011 | Foster | |
| 2011/0279228 A1 | 11/2011 | Kumar | |
| 2011/0279666 A1 | 11/2011 | Strombom et al. | |
| 2012/0072121 A1 | 3/2012 | Mollicone et al. | |
| 2012/0113209 A1 | 5/2012 | Ritchey et al. | |
| 2012/0224070 A1 | 9/2012 | Burroff et al. | |
| 2012/0290401 A1 * | 11/2012 | Neven | G06K 9/00671 705/14.68 |
| 2013/0114850 A1 | 5/2013 | Publicover et al. | |
| 2014/0022402 A1 | 1/2014 | Mishra et al. | |
| 2014/0051047 A1 | 2/2014 | Bender et al. | |
| 2014/0055746 A1 | 2/2014 | Nistico et al. | |
| 2014/0078283 A1 | 3/2014 | Nistico et al. | |
| 2014/0085452 A1 | 3/2014 | Nistico et al. | |
| 2014/0160129 A1 * | 6/2014 | Sako | H04N 5/225 345/427 |
| 2014/0300693 A1 * | 10/2014 | Hirata | G03B 37/02 348/39 |
| 2015/0046161 A1 | 2/2015 | Locker | |
| 2016/0150156 A1 * | 5/2016 | Okumura | H04N 5/23238 348/36 |

* cited by examiner

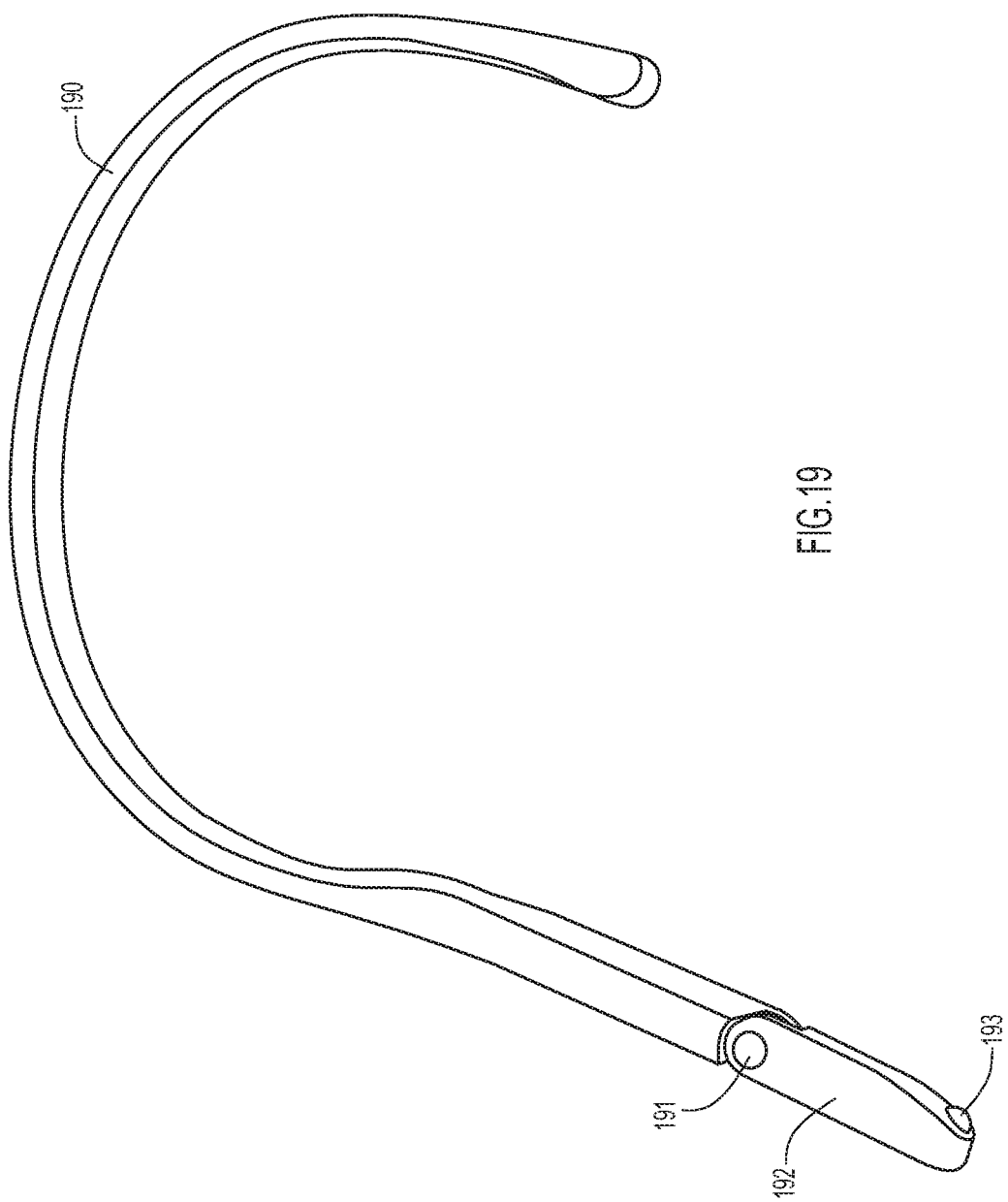

SECURE CAPTURE AND TRANSFER OF IMAGE AND AUDIO DATA

CROSS-REFERENCE TO RELATED APPLICATIONS

This application is a Continuation-In-Part Application of U.S. Non-Provisional Application Ser. No. 14/489,558, entitled "Method and System for Providing Secure Remote Testing" filed Sep. 18, 2014, which claims priority to U.S. Provisional Application No. 61/879,257, entitled "Secure Test Eye Wear System" filed Sep. 18, 2013, both of which are incorporated herein by reference in their entireties.

BACKGROUND

Technical Field

The present invention pertains generally to systems and methods for securely collecting images and image data from remotely located users and/or operators and transmitting them to a central location. The invention further pertains to head-mounted and torso-mounted image capture apparatus, each having multiple integrated cameras that capture images and image data from all directions (i.e., omni-directionally) and transmit those images and data to computer networks for processing.

Terminology

It is to be understood that, unless otherwise stated or contextually evident, as used herein:

The terms "test", "exam" and "examination" as used herein refer to a process wherein a remotely located test candidate is presented with a series of questions or problems and is required to respond thereto by entering information into a computer for transmission to a centrally located server. The questions or problems are typically presented on the computer screen but may instead be presented orally or in a hard copy document.

The terms "test candidate", "candidate", "test taker" and "examinee" as used herein refer to a student or other person taking an examination with the use of the present invention.

The term "device" as used herein refers to head mounted image capture devices such as image capture device 200 depicted in FIG. 1 and all of the embodiments thereof illustrated and/or described herein. Any component described as a "device" component (e.g., "device controller", "device battery", etc.), means such component mounted on or in the head mounted image capture device.

The phrase "remote test terminal" as used herein refers to a computer terminal in an unsupervised environment at which a test candidate takes a test. The unsupervised environment may be located any distance (e.g., many miles) from the centrally located server or may be in a room in the same building in which that server is located.

The phrases "test sponsor", "test administrator" and "test delivery organization" as used herein refer to an institution or organization administering a test on its own behalf or on behalf of another person or entity.

The phrase "central location" refers to a location where a system server or other computer equipment is located and arranged to receive information transmitted from remote test terminals and/or remotely located users and operators. Alternatively, or in addition, an individual for monitoring the received information may be at the central location to monitor the information in real time.

The terms "operator" and "user" as used herein refer to a remotely located person or persons observing a situational event with the use of the present invention. The situational event may be located any distance (e.g., many miles) from the centrally located server.

The term "apparatus" as used herein refers to torso mounted image capture apparatus such as apparatus 600 depicted in FIG. 36 and all of the embodiments thereof illustrated and/or described herein. Any component described as an "apparatus" component (e.g., "apparatus camera", "apparatus battery", etc.), means such component mounted on or to the torso mounted image capture apparatus.

The terms "forward", "rearward", "front", "rear", "left", "right", "upper", "lower", "top", "bottom", "vertical", "horizontal", etc., are used for convenience to refer to the orientation of a device and/or apparatus when normally worn or used by an examinee or operator and are not intended to otherwise limit the structures described and claimed.

Discussion of the Prior Art

The Internet has opened up a world of possibilities for on-line learning for all ages and levels of education. What does not currently exist is a reliable way to validate a person's learning through a secure remote testing environment when a test or exam leads to credit, a certificate, a credential, or a license, etc. More specifically, there is a need for a way to assure the integrity and security of remotely administered tests and examinations (e.g., school exams, exams for college entrance and professional qualification, etc.). The testing industry has been plagued with security breaches prior to, during, and after examinations. The effects of this problem are not limited to primarily testing companies that deliver exams, but include primary, secondary, and higher education institutions, industry, and other test delivery organizations. Security breaches include test form and item theft through brain dumping sites that collect test items and sell them on-line, test candidates capturing images of the exam through various illicit methods, test candidates bringing unauthorized materials to the designated place of testing, and candidates using proxy testers to take their exams. In recent years the number of computer delivered examinations has been growing exponentially, and keeping the networks and exams secure is of utmost concern to the test sponsor and to the test delivery organization.

The latest trend in testing has candidates testing remotely in their choice of settings. This opens up a whole new set of problems for the test sponsor and test delivery organization. Some test delivery organizations, or "remote proctoring" organizations, are claiming to have test security that validates the candidate/examinee, featuring a 360° camera view of what the candidate is doing throughout the examination period. The problem is that neither tripod-set cameras nor remote or in-person proctors can capture what a candidate is doing 100% of the time.

Accordingly, there is a need to ensure that a remotely located test candidate, while taking an exam, is looking only at the computer screen, or at items that are acceptable to the test sponsor. These items could be, for example, calculators, paper and pencil for calculations, prescribed books if permitted, and other items that the testing sponsor has approved for use during an exam.

Further, due to advances in technology over the past few years, society as a whole is seeing a continuing evolution of workers from various fields and industries working at locations remote from their normal workplace. Whether it is a doctor in a health care facility assisting an Emergency Medical Technician (EMT) with a critical patient being transported to the facility; a dispatcher working on a remote ongoing police matter in the law enforcement community; military personnel at a command center assisting servicemen in a military operation; or a service technician talking a customer through an issue or working on a problem while discussing options with a team based in another location; it has become increasingly apparent that verifiable and indisputable video (as well as audio) records of remote situational events are of utmost importance.

Several significant studies have been conducted in the law enforcement environment which show that the use of body-worn cameras have changed the behavior of perpetrators as well as police officers. The so-called "self-awareness effect" caused by the body camera's neutral third eye affects police officers and suspects alike, prompting suspects to cool down aggressive actions and deterring police officers from reacting with excess or unnecessary force because neither party wants to get caught engaging in socially undesirable behavior that may have costly consequences. However, there has also been a plethora of documented cases where the body camera is turned off, not working properly and, in most cases, utilizes only a forward facing image. These identified factors typically create doubt and unverifiable certainty when analyzing a situation in real time or after the fact.

Accordingly, there is a need to ensure that verifiable and indisputable video (as well as audio) records of situational events are available in order to provide a more complete picture of the situation for real time and after the fact analysis. The video (as well as audio) record could also provide documentation of the behavior of personnel who work at remote locations for a company or organization, or who are members of a police or military force.

OBJECTS AND SUMMARY OF THE INVENTION

Therefore, in light of the above, and for other reasons that will become apparent from the descriptions below, it is one object of the present invention to provide improved methods and apparatus for assuring that an examinee, located in a remote environment or an environment where there is no in-person proctor, views or is looking only at predetermined items such as a computer screen or other test-related items acceptable to the test administrator.

It is another object of the invention to provide an improved method and apparatus for enhancing remote test security in real time by 360° monitoring of both a test candidate's field of view and that candidate's ocular movements, and streaming the monitoring information to a server at a central location where it can be analyzed in real time and/or stored for analysis at a later date.

It is still another object of the invention to provide improved head mounted image capture devices to be worn by an examinee during a test that can monitor both the forward field of view from the device and the position and movement of the examinee's eye or eyes.

It is a further object of the present invention to provide an improved method and apparatus for enhancing collection and transmission of a remote situational event in real time by providing a 360° field of view about an operator view while monitoring the operator's ocular movements, and streaming the monitoring information to a server at a central location where it can be analyzed in real time and/or stored for analysis at a later date.

It is yet another object of the present invention to provide improved head mounted image capture devices to be worn by a remotely located operator during a situational event that can monitor both the forward field of view and the 360° field of view from the device, as well as the position and movement of the operator's eye or eyes.

It is an additional object of the present invention to provide torso mounted image capture apparatus to be worn by a remotely located operator during a situational event that can monitor up to a 360° field of view from the apparatus, and can be used as a stand-alone apparatus or in conjunction with the improved head mounted image capture devices.

The aforesaid objects are achieved individually and in combination, and it is not intended that the present invention be construed as requiring two or more of the objects to be combined unless expressly required by the claims attached hereto.

With the foregoing objects in mind, in accordance with one aspect of the invention, a method and system provide security for remotely administered tests to examinees at respective remote locations by providing:

with a head mounted image capture device for each examinee, video and data signals representing a series of images including the forward field of view of the examinee and the examinee's eyes;

for each examinee, transmitting the video and data signals from the examinee image capture device to the examinee computer;

transmitting the video and data signals from each examinee computer to a central location via a transmission link; and at a centrally located system server, receiving the video and data signals from said transmission link for each examinee and saving information representing said signals in files dedicated to respective examinees.

The examinee image capture device may be any head mounted device equipped with one or more cameras arranged to provide the necessary images of the examinee's field of view and eyes and may comprise eyewear (e.g., a frame for eyeglasses, goggles, etc.), a resiliently flexible head attachment clamp, or any item that may be secured to the examinee and support a camera or cameras having suitably directed viewing fields.

In accordance with another aspect of the present invention, a method and system provide secure monitoring of remotely located operators' field of view during a situational event by providing:

with a head mounted image capture device for each operator, video and data signals representing a series of images including the forward field of view of the operator and the operator's eyes;

for each operator, transmitting the video and data signals from the operator image capture device to the operator computer;

transmitting the video and data signals from each operator computer to a central location via a transmission link; and at a centrally located system server, receiving the video and data signals from said transmission link for each operator and saving information representing said signals in files dedicated to respective operators.

The operator image capture device may be any head mounted device equipped with multiple cameras arranged to provide the necessary images of the operator's field of view and eyes and may comprise an eyeglasses frame, a resiliently flexible head attachment clamp, goggles with a flexible band, or any other item that may be secured to the operator and support multiple cameras having suitably directed viewing fields.

The above and still further features and advantages of the present invention will become apparent upon consideration of the definitions, descriptions and descriptive figures of specific embodiments thereof set forth herein. In the detailed description below, like reference numerals in the various figures are utilized to designate like components and elements, and like terms are used to refer to similar or corresponding elements in the several embodiments. While these descriptions go into specific details of the invention, it should be understood that variations may and do exist and would be apparent to those skilled in the art in view of the following description.

BRIEF DESCRIPTION OF THE DRAWINGS

FIG. 19 is a perspective view of a fourth head attachment clamp embodiment of the head mounted image capture device according to another embodiment of the present invention showing field of view captured by the device.

DESCRIPTION OF THE PREFERRED EMBODIMENTS

The following detailed explanations of the drawings and the preferred embodiments reveal the methods and systems of the present invention.

Figure 1:
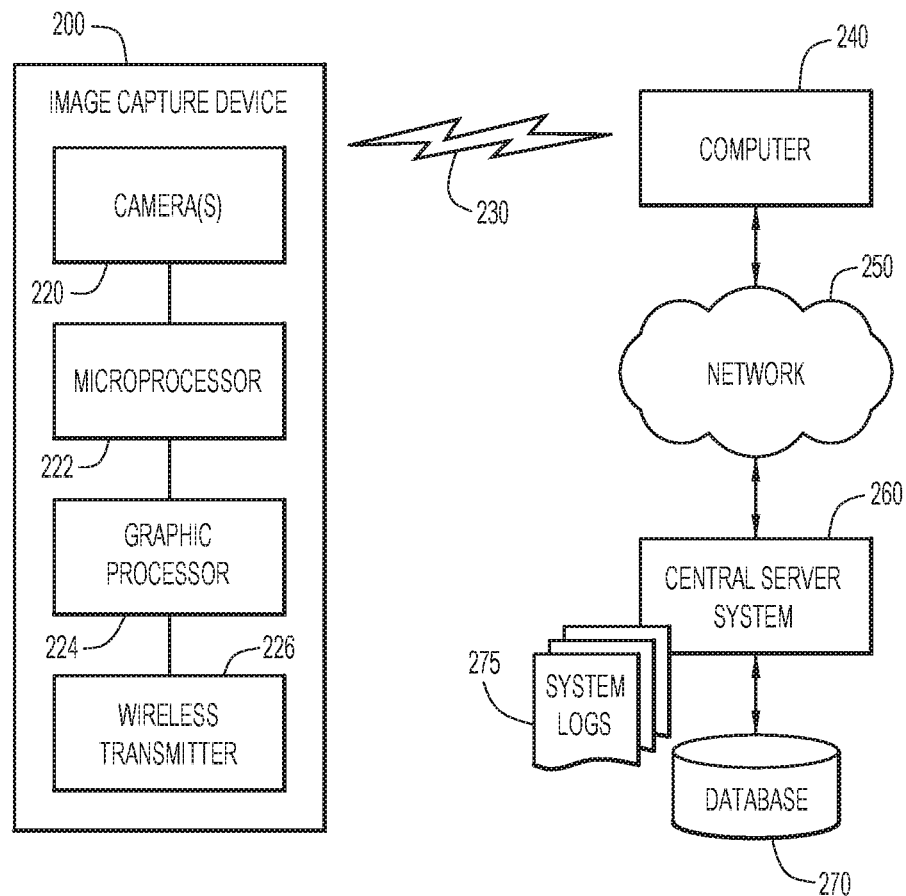
FIG. 1 is a functional block diagram illustrating one or more exemplary embodiments of a method and system according to one or more aspects of the present invention.

Referring specifically to FIG. 1 of the accompanying drawings, there is illustrated a functional block diagram of an embodiment of the system and method of the present invention in connection with a remotely located examinee taking an exam administered from a central location. Each remotely located examinee in this embodiment is provided with an examinee image capture device 200 that communicates with a computer 240 at his/her remote location via a link 230 (e.g., a wired or wireless connection). Device 200 is a head mounted unit such as an eyeglasses frame, a resiliently flexible head clamp, or other unit capable of being supported on the examinee and carrying one or two cameras 220, as needed for the embodiments described hereinbelow, that can view the examinee's field of view and the examinee's eyes. The camera system permits capture of a 360° field of view about the examinee during an exam.

Computer 240 may be a personal desktop computer, laptop computer, or the like, that is configured to communicate with device 200 via communication link 230. Computer 240 and the image capture device 200 may include wireless transmission components to enable the communication link 230. The wireless connection can be made by using, e.g., Bluetooth radio technology, communication protocols described in IEEE 802.11 (including any IEEE 802.11 versions), etc. Computer 240 may access the Internet or other communication channel 250 to gain access to a centrally located secure testing server system 260. The video streaming data from the image capture device 200 is received at the server system 260 where it is monitored (in real time or after the exam) and saved in system logs 275 in a server database 270 on a per examinee basis. That is, there is typically an individual file (virtual or actual) in the database for each examinee.

Figure 2:
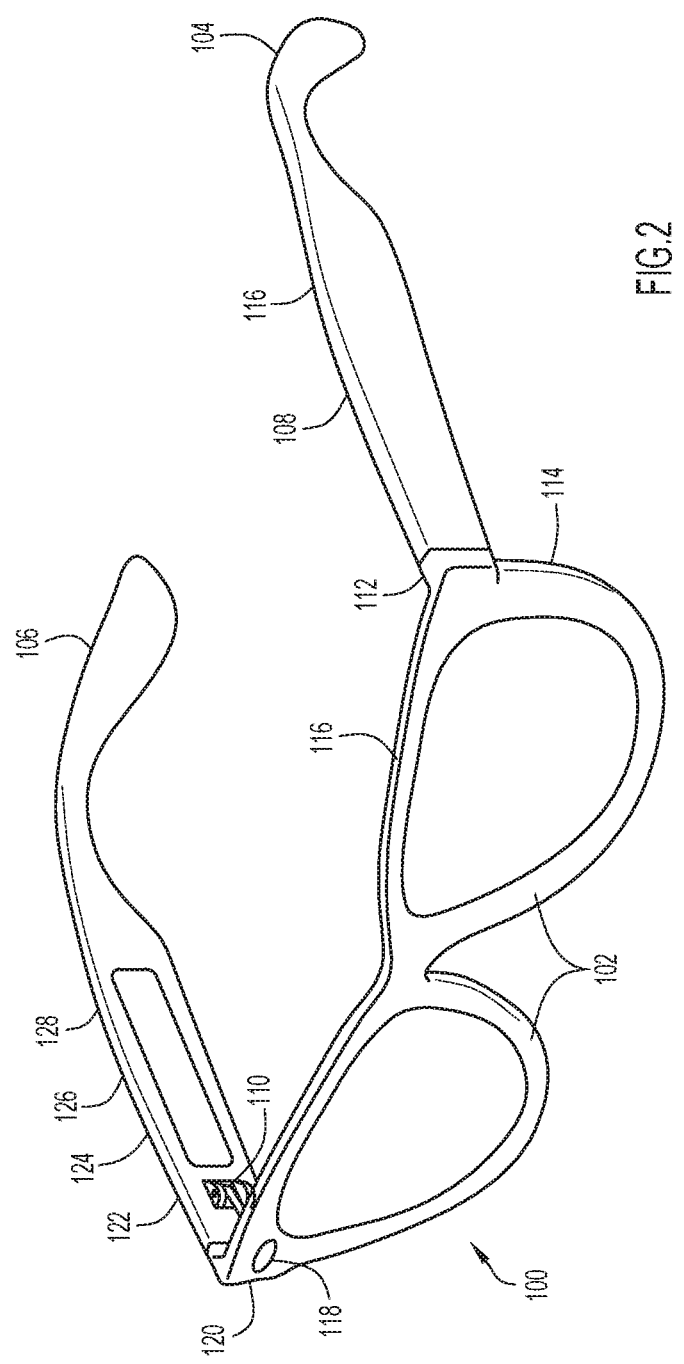
FIG. 2 is a view in perspective from the front and left side of a first eyewear assembly embodiment of a head mounted image capture device according to one embodiment of the present invention.
Figure 3:
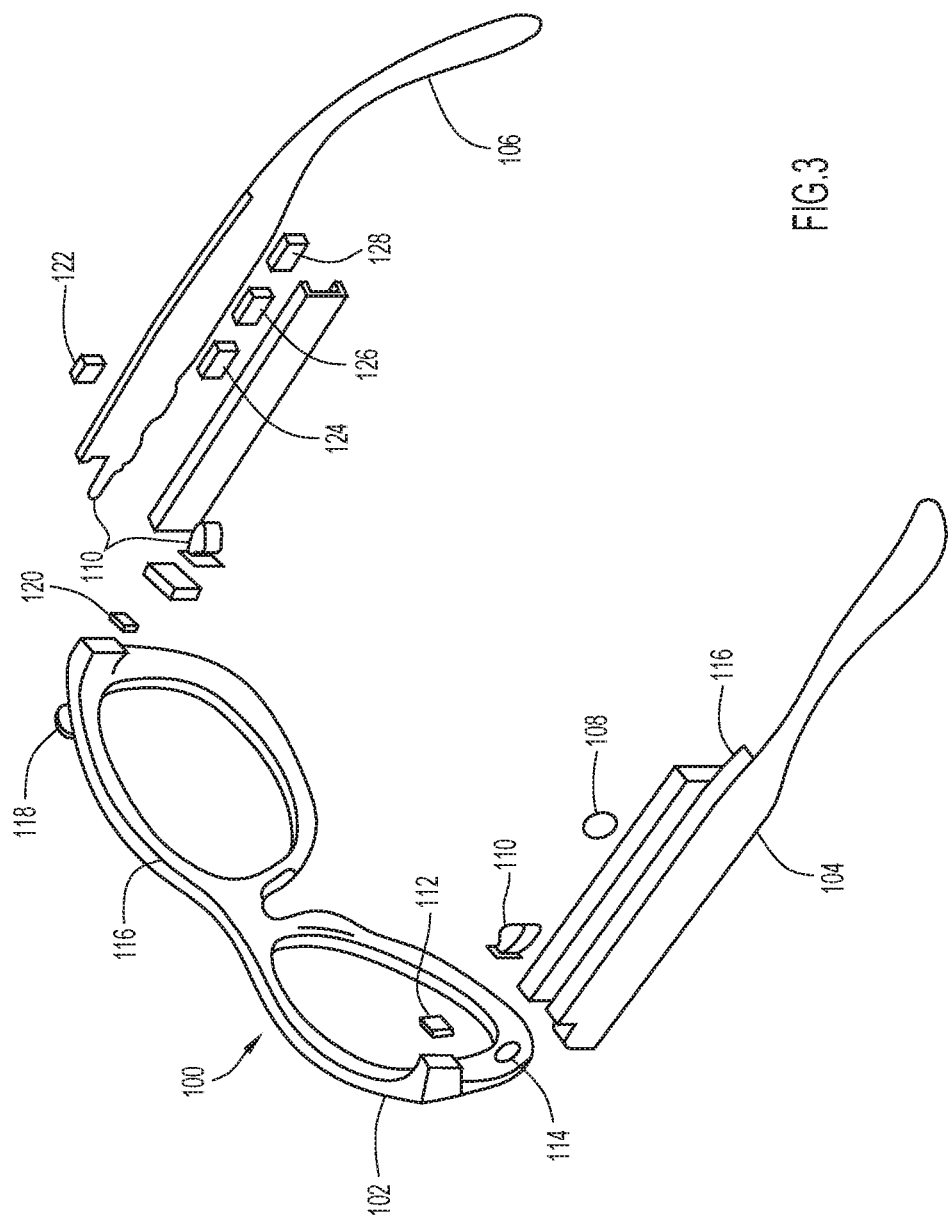
FIG. 3 is an exploded rear view in perspective of the eyewear assembly embodiment of FIG. 2.
Figure 4:
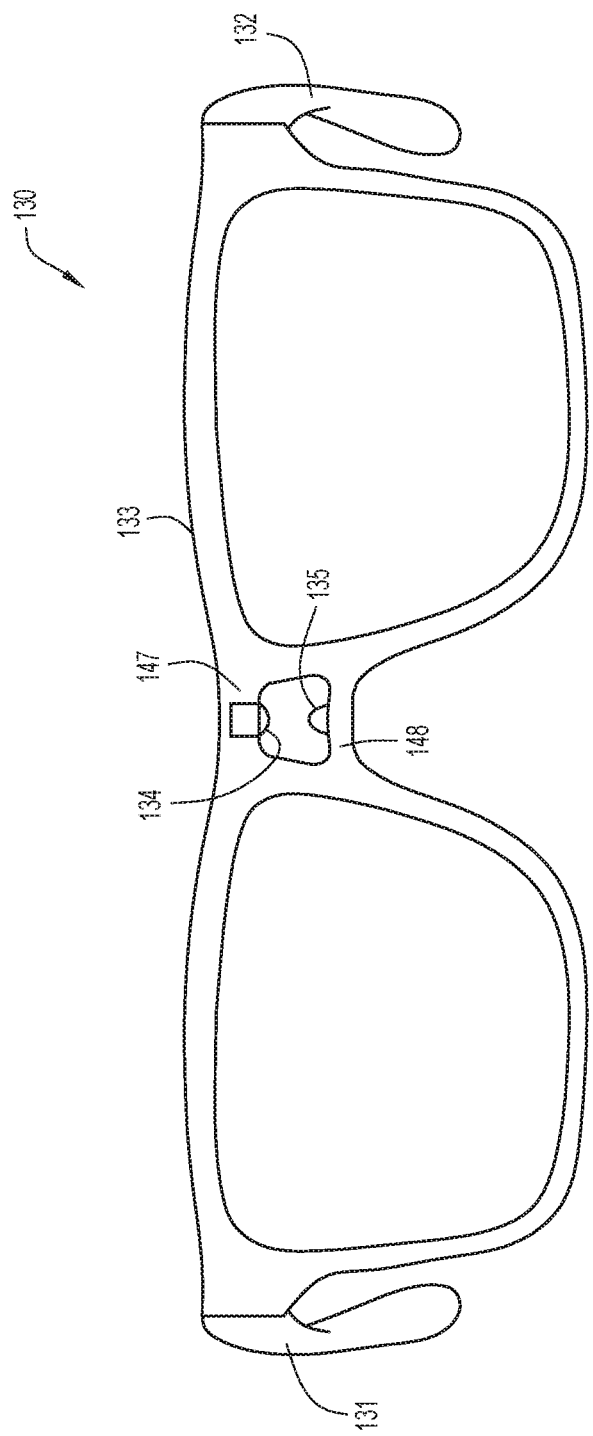
FIG. 4 is a front view in elevation of a second eyewear assembly embodiment of a head mounted image capture device according to the present invention.

Referring now to FIGS. 2 and 3, shown is an exemplary unit 100 comprising one embodiment of an image capture device of the present invention. Unit 100 is shown in the form of eyewear, specifically an eyeglasses unit with or without lenses. The elements of the unit 100 include a frame or rims 102 and two side arms or temples 104 and 106. Hinges 110 connect the left temple 104 and right temple 106 to the front rims 102. The rims 102 and temples 104, 106 may be formed of solid or hollow structural plastic or metal or similar material as to allow for the connections and functions described herein, and particularly for wiring and/or other electrical connections to be internally routed through the eye-gear.

Unit 100 may have mounted thereon or built into the unit a front facing video camera 120 and lens 118, an ocular tracking video camera 112 and lens 114, and a device processing system which includes a wireless transmitter 124, a microprocessor 126 and a graphics processor 128, all of which may be connected to and/or mounted on a circuit board.

The on-board device processing system is shown positioned on temple 106 of the eye-gear 100 and is used for scaling and streaming real time front facing video to the remote secure testing server 260 (FIG. 1). The front facing video camera/recorder 120 is forward facing and positioned at the junction between temple 106 and right rim 102 with its lens 118 located exposed at the far upper right hand side of right frame or rim 102. The ocular tracking video camera/recorder 112 is positioned on the inside of the left frame or rim 102. Both video cameras/recorders 112 and 120 provide continuous video streams of front facing images and ocular eye images, respectively. The video recorders 112 and 120 may be standard definition video recorders limited to recording in low resolution, such as video graphic array (VGA) resolutions of 640×480 pixels.

More specifically, the front facing video recorder 120 may be embedded in a corner between the right frame or rim 102 and the proximal end of the right temple 106 with its lens 118 protruding through the frame. The ocular tracking video camera 112 may be embedded in a corner between the left rim 102 and the proximal end of the left temple 104. The video recorder lens 114 is angled to face rearwardly to capture direct images of the examinee's eye from a peripheral vantage point. The two cameras allow the image capture device 100 to capture the user's eye movements while viewing the front facing images during the taking of an exam.

Both video recorders 112 and 120 are connected to a graphic processor 128, the microprocessor 126 and the wireless transmitter 124. Both the front facing video signals and the ocular video signal for the device 100 are transmitted to the examinee's computer 240 from their respective video cameras 120 and 112 by the wireless transmitter 124 and then remotely streamed to the secure centrally located testing server 260 (FIG. 1) as described.

The video transmission data may be streamed from the video recorders 112 and 120 with a resolution of 640×480 pixels to the graphic processor 128. The graphic processor 128 may encode and scale the video data into a particular video compression format such as H.264 video stream, and scale the video into a 0.5 Mbps stream with a resolution of 480×360 pixels. The encoded and scaled video stream from the graphic processor 128 is transmitted to the microprocessor 126, which packages the data for the transmission via the wireless transmitter 124. The wireless transmitter 124 transmits the data to the secure testing server 260 via the examinee's computer 240 (FIG. 1). The front facing and ocular tracking video streams are time keyed or synchronized with each other.

The front facing camera 120 captures the front facing image as viewed by the examinee wearing device 100. A front facing image is a continuous video stream of single frame front facing images. The front facing images may be captured using a variety of different standardized imaging codecs (e.g. MPEG, MPEG4, series of JPEG images etc.) or a proprietary imaging protocol. The front facing image includes anything viewed by the examinee who typically sits at a remote testing station or terminal (e.g., for a desk top computer or laptop), the front facing images typically including various items such as the computer monitor, keyboard, mouse, and calculator or other items that are permitted in the remote testing environment. The front facing images are obtained continuously in real-time, recording everything viewed by the examinee wearing device 100.

Prior to operating the system, the examinee is asked to execute a calibration test where the user is instructed to look in various directions or at various objects, as described hereinbelow in relation to FIGS. 23A and 23B. In the process, device 200 transmits information to the secure testing server system 260 so that the system log 275 is tracked and saved. The information gathered by the image capture device will be continuously streamed to the secure testing server 260 in real time.

The image capture device utilizes both the front facing image video camera 120 and the ocular video camera 112 which also provides video signals that may be captured using a variety of different standardized imaging codecs (e.g. MPEG, MPEG4, series of JPEG images etc.) or proprietary imaging. The eye images can be analyzed along with the front facing images to determine the user's ocular movements. Those ocular movements can be correlated to the forward facing images captured by the front facing camera 120 to determine what the user was directly looking at when viewing the front facing images through the eye gear.

The ocular tracking camera 112 captures an eye image of the user in real time while the user is viewing the front facing image when wearing the eye gear device 100. The ocular tracking camera captures the eye images contemporaneously with the front facing camera 118, and the two captured video streams are time keyed or synchronized with each other. The front facing images and the ocular images are transmitted in real time to the testing server system.

If the ocular tracking camera option is included in the eye gear, prior to operating, the examinee is asked to execute a calibration test. The calibration software must be downloaded after the eye gear is turned on and wireless connection has been made between the eye gear 100 or 200 and the computer 240. The examinee is instructed to look in various directions or at various objects. During the calibration the pupil location with each eye image may then be calibrated to the corresponding items captured in the front facing images (e.g., computer monitor, keyboard, and calculator).

Image capture device 100 transmits information to the secure testing server so that system log information (i.e., the ocular tracking images and front facing images) for the examinee can be captured and logged. This log functions as a history of what the examinee was viewing during the exam and his/her ocular eye movements during the exam.

The information gathered by the image capture device 100 (or, generically, 200) is continuously streamed to the central testing secure server 260 in real time. Thus, if the image capture device detects a constant image on the ocular or front facing download for more than a predetermined time (e.g., five) minutes, the remote proctor will send a message to the examinee; if no response is received from the examinee, the exam will be shut down. This predetermined time may be selected to accommodate a test sponsor's particular exam content or format (e.g., looking at a long passage or a diagram that is complex)

The device 100 shown in FIGS. 2 and 3 has an On/Off switch 122 located on right temple 106. Switch 122 must be activated in order for the device to function. Once the device has been turned on, the testing software provided by the test delivery organization prompts the examinee to download the system program. This program allows the device to be calibrated and also runs a security check to validate that the unique device ID number matches the examinee's test profile. If it does not match, the image capture device software shuts down and the exam does not proceed.

The device battery 108 typically has a lifespan of at least four hours and preferably at least eight hours; the battery is preferably rechargeable. Battery 108 may be located in the left temple 104 of the eye gear and coupled by wiring 116 through the frame to the electronic components embedded in the right temple 106 to provide power to the components. For example, the battery 108 is connected to the video cameras 112 and 120, wireless transmitter 124, microprocessor 126 and the graphic processor 128. The wiring 116 may be extended from the battery 108 on the left temple 104 through the frame or rim 102 to the right temple 106 through the hinges 110 that couple the right and left temples to the frame or rim 102. The wiring 116 may be embedded in the front frame and the right and left temples via over-molding. For example, wiring 116 may be placed directly into an injection molding tool before hot liquid plastic is injected into the tool to form the front frame and the eye glass temples. This allows the plastic to flow around the wiring which embeds the wiring 116 into the device. Over-molding the wire 116 into the device reduces the space consumed by the wiring which minimizes size requirements needed for the device to accommodate the video cameras 112 and 120 and the electronic components 124, 126 and 128.

FIGS. 4-10 pertain to an exemplary device 130 comprising another embodiment of an image capture device of the present invention. Device 130 is also shown in the form of eyewear or, specifically, a frame 133 for eyeglasses which may or may not have lenses mounted in the frame. The frame is comprised of elements that allow for the expansion of temples 131, 132 through the addition of respective temple adjustment plugs 136, 137, and for expansion of or addition to the device processor system through the left arm pivot case 138 which may house additional processors, cameras, or other elements as/if needed. A left hinge plug 139 connects the proximal end of left eyeglass temple pivot case 138 to the front eyeglass frame 133. The opposite or distal end of pivot case 138 is connected to the left eyeglass temple adjustment plug 137 from which the distal end of left temple 132 extends. A right hinge plug 140 of frame 133 is pivotally connected to the proximal end the device controller case 142. The opposite or distal end of device controller case 142 is connected to the right temple adjustment plug 136 from which the distal end of temple 131 extends. The frame and temples may be formed of solid structure of plastic or metal or of a hollow structure of similar material as to allow wiring and component interconnections to be internally routed through the eye-gear.

The device controller case 142 and all embedded elements may be placed on the right or left side of the front frame 133 and connected by using the hinge plugs 139 and 140. The embedded elements included in controller case 142 are a device processor 143, a battery 144, control buttons 145, a device transmitter 146, an ocular tracking video camera including a very wide angle (i.e., fish eye) lens 134 and a 360° mirror 135. The pivot case 138 may be placed on the right or left side of the front of frame 133 and connected by using the right or left hinge plugs 140, 139. The device controller case 142 and the pivot case 138 may be coupled or attached to a circuit board.

The device processing system is shown to be positioned on the right temple 131; alternatively, it may be positioned on the left temple 132. The device processing system is used for scaling and streaming real time 360° field of view video to the remote secure testing server 260 (FIG. 1).

The fish eye lens 134 of the video camera and the 360° mirror 135 comprise the video recorder or camera system of the eye-gear image capture device 130. The camera fish eye lens 134 is centrally mounted on the bottom side of the frame top bar 147 that joins the two lens support sections of frame 133. The 360° mirror 135 is secured on the top side of the bridge 148 extending between the lens support sections parallel to and spaced below top bar 147. The fish eye lens 134 and mirror 135 are vertically aligned and spaced from one another. The fish eye lens and the 360° mirror combine to provide a continuous video stream of a 360° field of view including eye images of the examinee. The video recorders embedded in the camera and receiving the images from the fish eye lens 134 and mirror 135 may be a standard definition video recorder limited to recording at a relatively low resolution, such as video graphic array (VGA) resolutions of 640×480 pixels. A suitable camera for this purpose is the model 3.4 mm Diameter ⅛ OV6920 3M COMS Video Camera Module sold by Alibaba.com.

Figure 6:
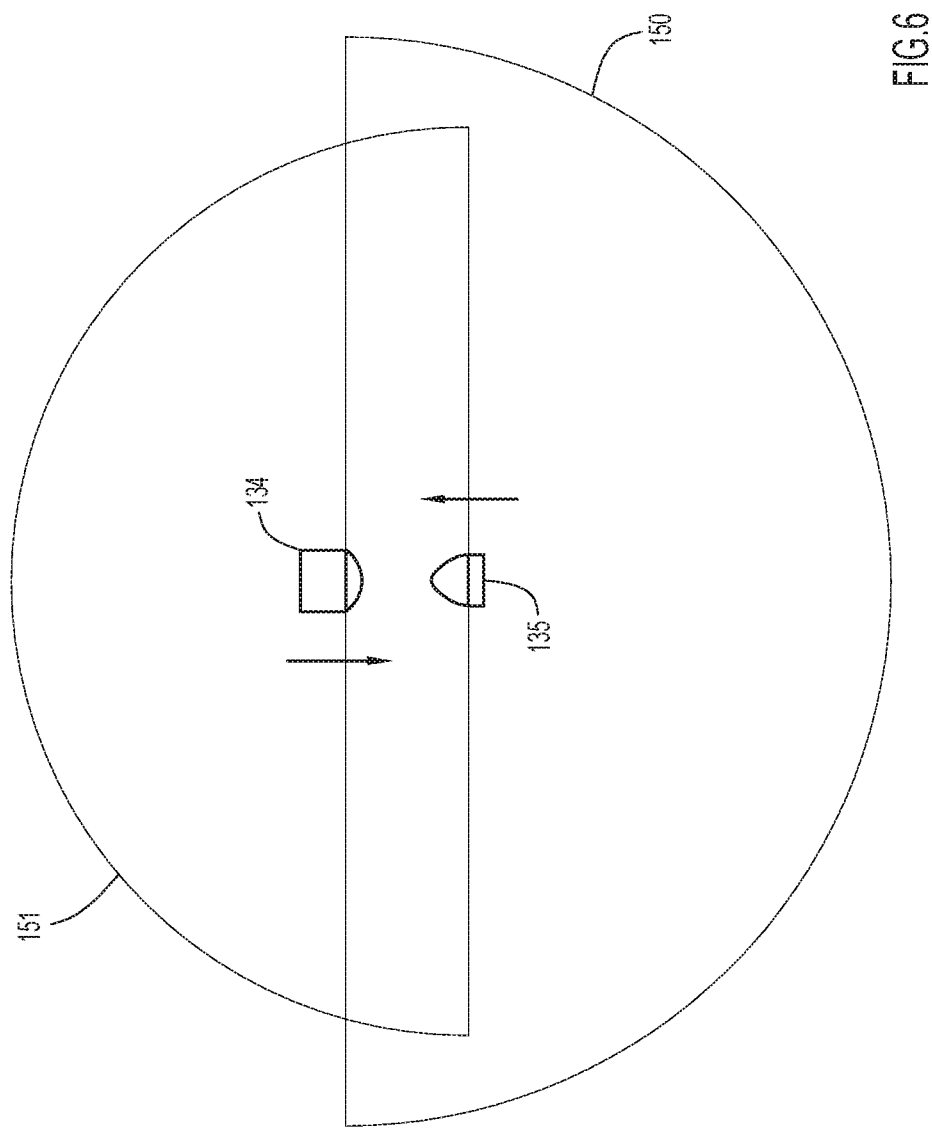
FIG. 6 is a diagrammatic top view illustration of the vertical plane fields of view captured by the eyewear assembly of FIG. 4.
Figure 7:
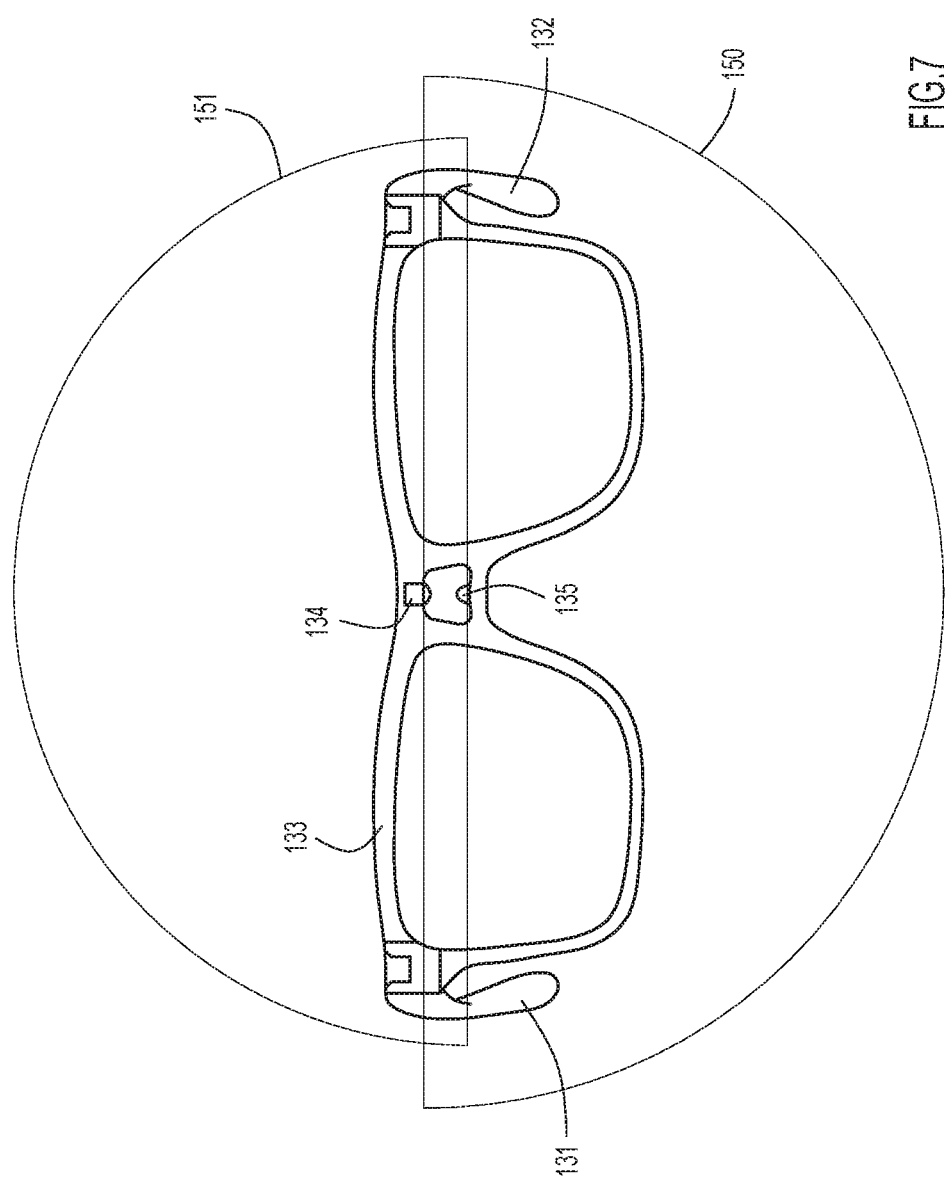
FIG. 7 is a diagrammatic view similar to that of FIG. 6 with the eyewear assembly of FIG. 4 superimposed.
Figure 8:
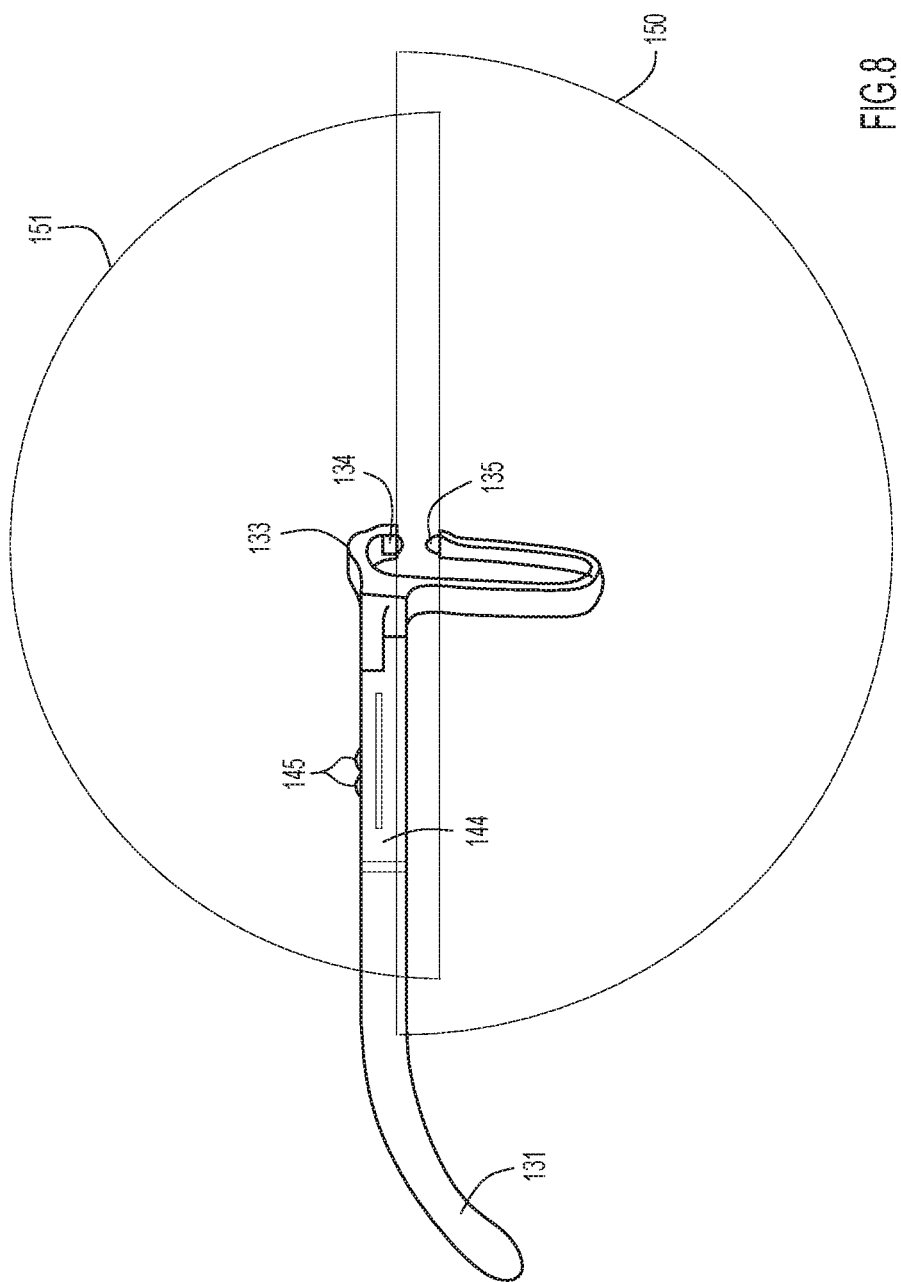
FIG. 8 is a diagrammatic side view illustration of the vertical plane fields of view captured by the eyewear assembly of FIG. 4 with the eyewear superimposed.
Figure 9:
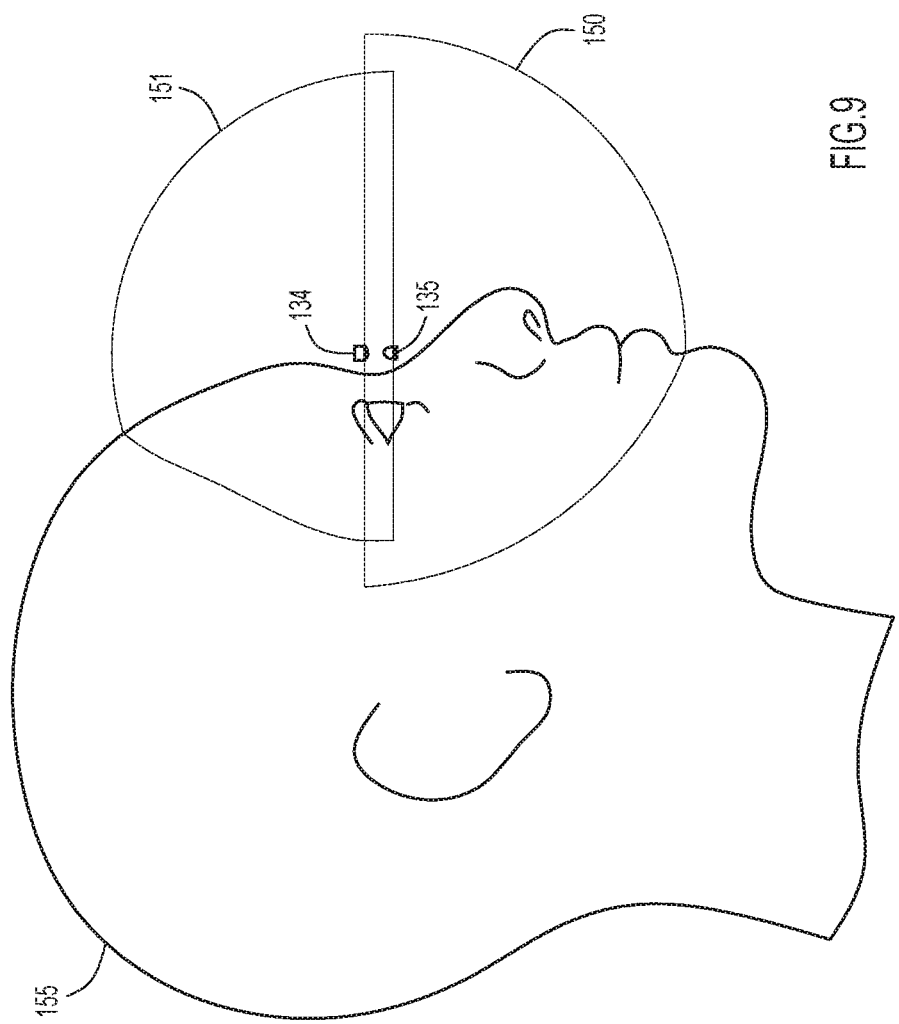
FIG. 9 is a diagrammatic side view depicting the fields of view shown in FIG. 8 superimposed on the head of an examinee.
Figure 10:
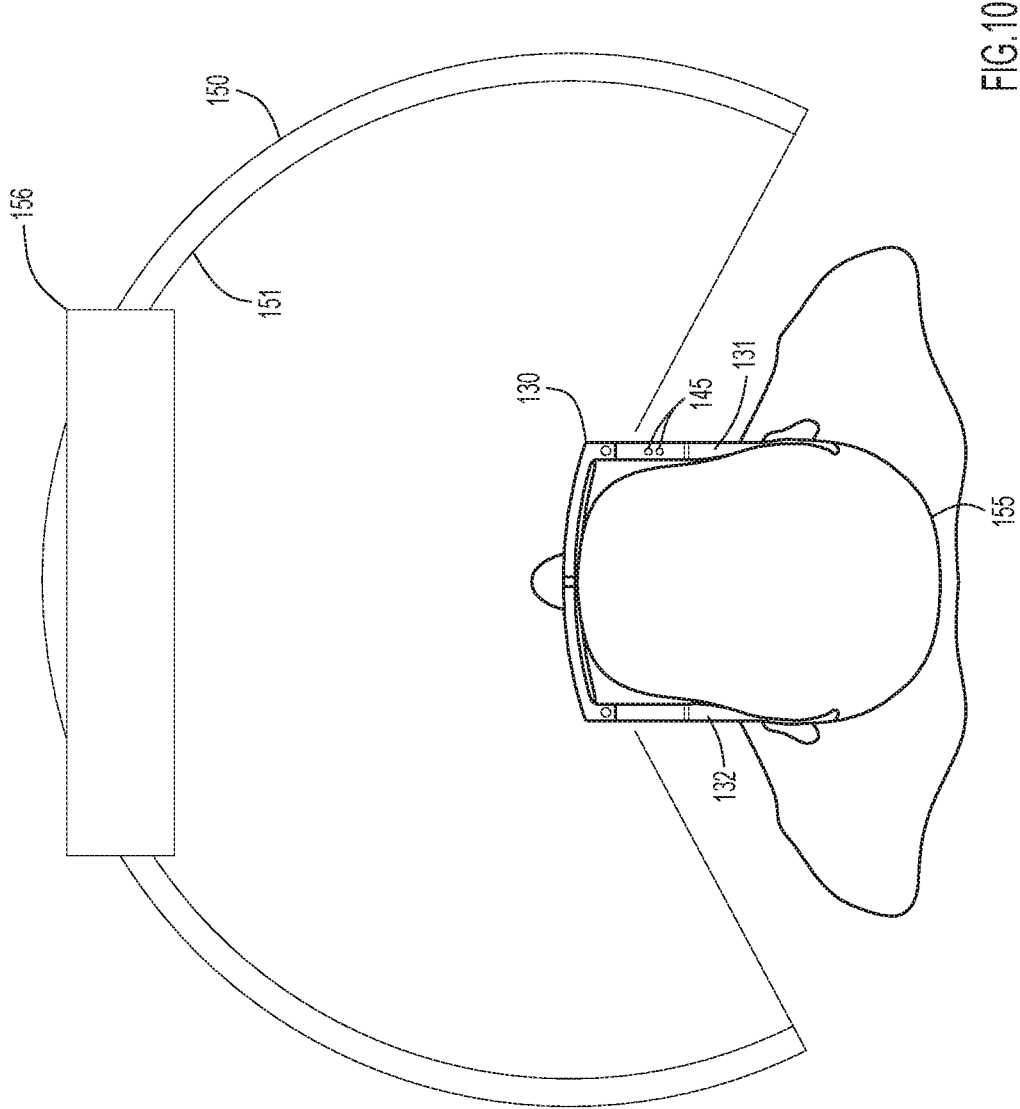
FIG. 10 is view from above depicting an examinee's head and a computer screen with the fields of view captured by the eyewear assembly of FIG. 4 superimposed.

FIG. 6 is diagrammatic view from in front of an examinee showing the functional relationship between the camera fish eye lens 134 and the 360° mirror 135. This allows for a 360° view and recording of examinee's movements and the surrounding area. The horizontal field of view of camera lens 134 is represented by semicircle 150 which is actually a horizontal slice through the vertical plane of a hemispheric field of view. The horizontal field of view of mirror 135, which is reflected into and received by lens 134, is represented by a semicircle 151 which is actually a horizontal slice through the vertical plane of another hemispheric field of view. FIG. 7 shows the fields of view 150, 151 as in FIG. 6 with the eye gear superimposed thereon. FIG. 8 shows the fields of 150 and 151 from the right side of the eye gear 130 of FIG. 6. FIG. 9 is a view also from right side showing camera lens 134, mirror 135 and the fields of view 150, 151 relative to the position of an examinee's head 155. FIG. 10 is a view from above the examinee's head showing slices of the respective fields of view 150, 151 in respective horizontal planes and relative to a computer screen 156 that is typically part of the examinee's computer 240 referred to in relation to FIG. 1.

Figure 11:
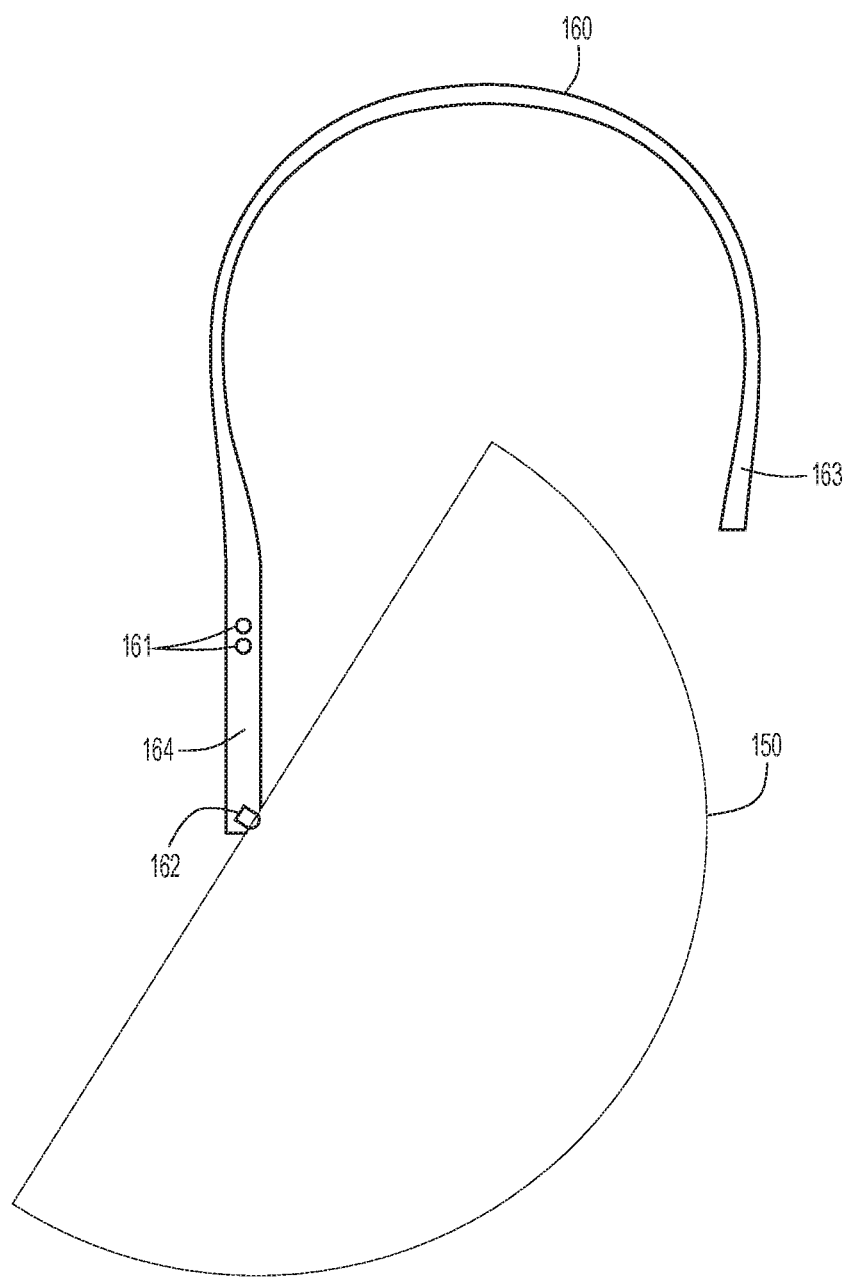
FIG. 11 is a diagrammatic view from above of a first head attachment clamp headset embodiment of the head mounted image capture device according to another embodiment of the present invention with the attached camera field of view diagrammatically superimposed.
Figure 12:
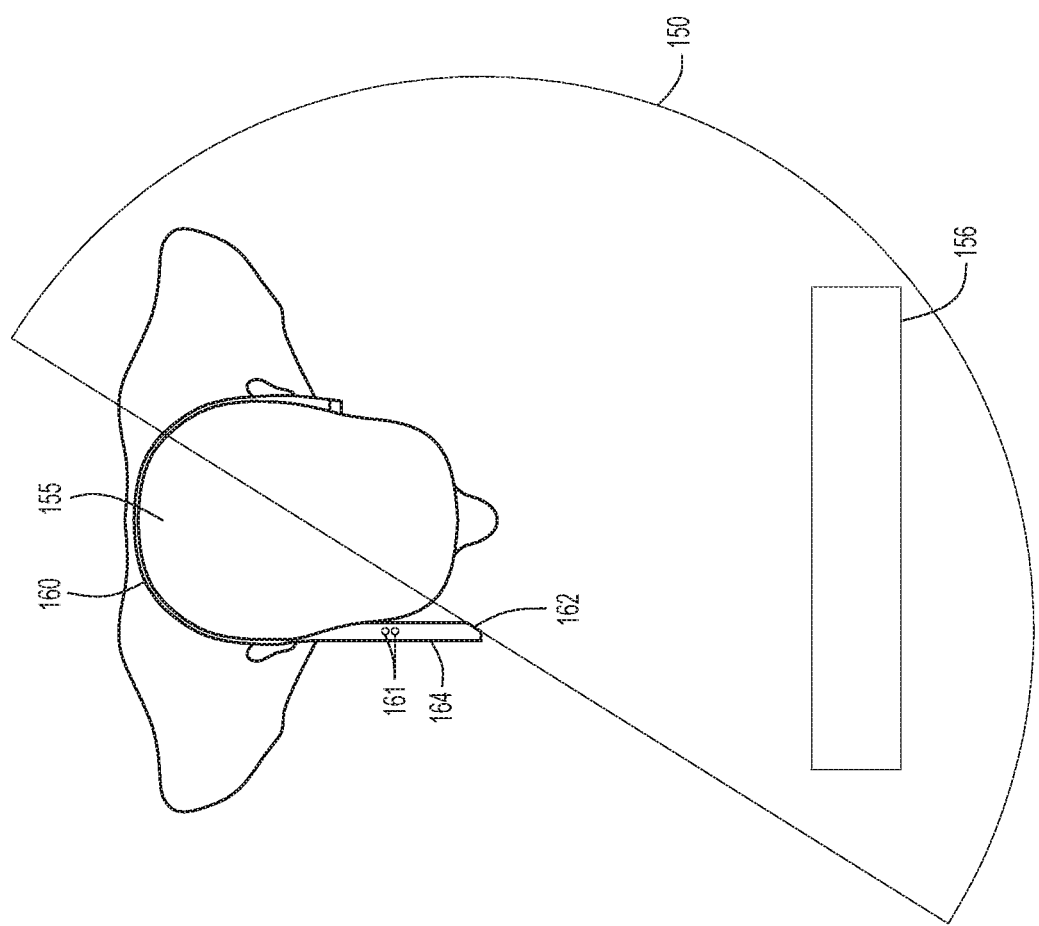
FIG. 12 is a view from above of the head attachment clamp headset of FIG. 11 being worn by an examinee viewing a computer screen with the camera field of view diagrammatically superimposed.
Figure 13:
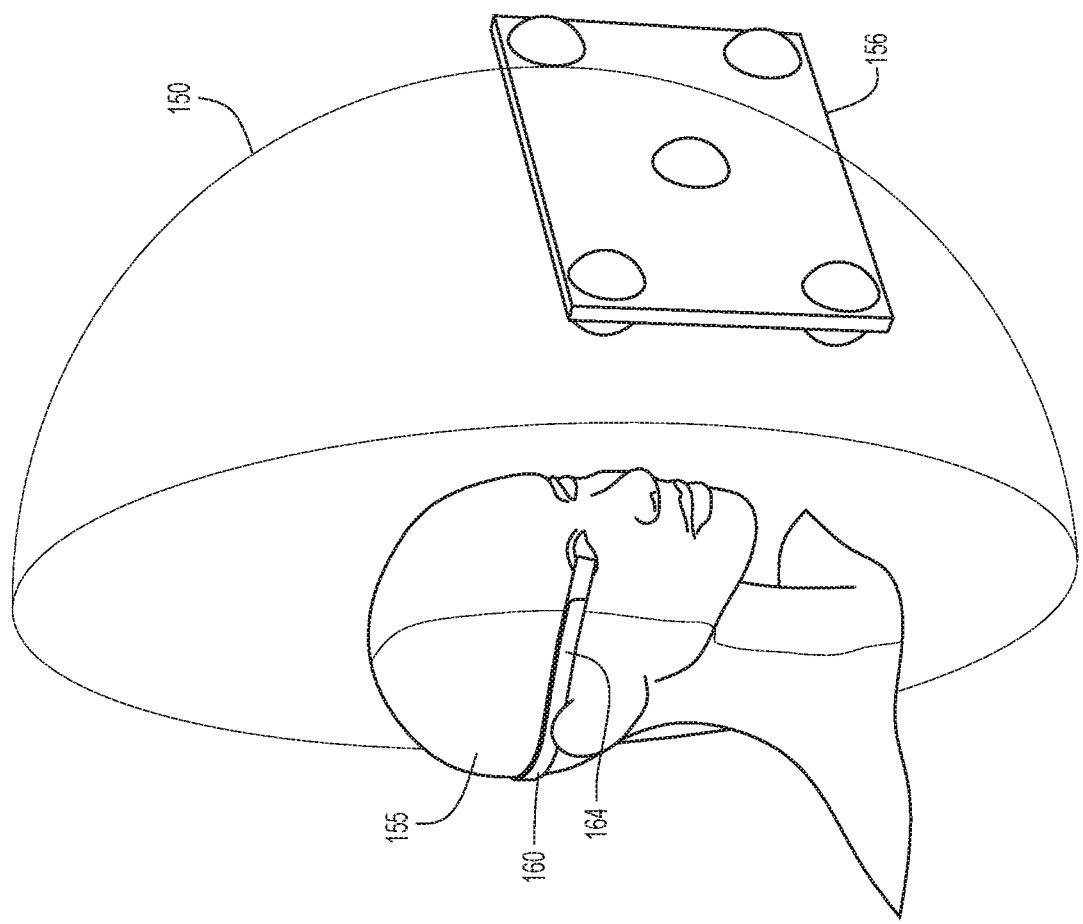
FIG. 13 is a front perspective view depicting an examinee wearing the head attachment clamp headset of FIG. 11 and showing a three-dimensional representation of the camera field of view diagrammatically superimposed.
Figure 14:
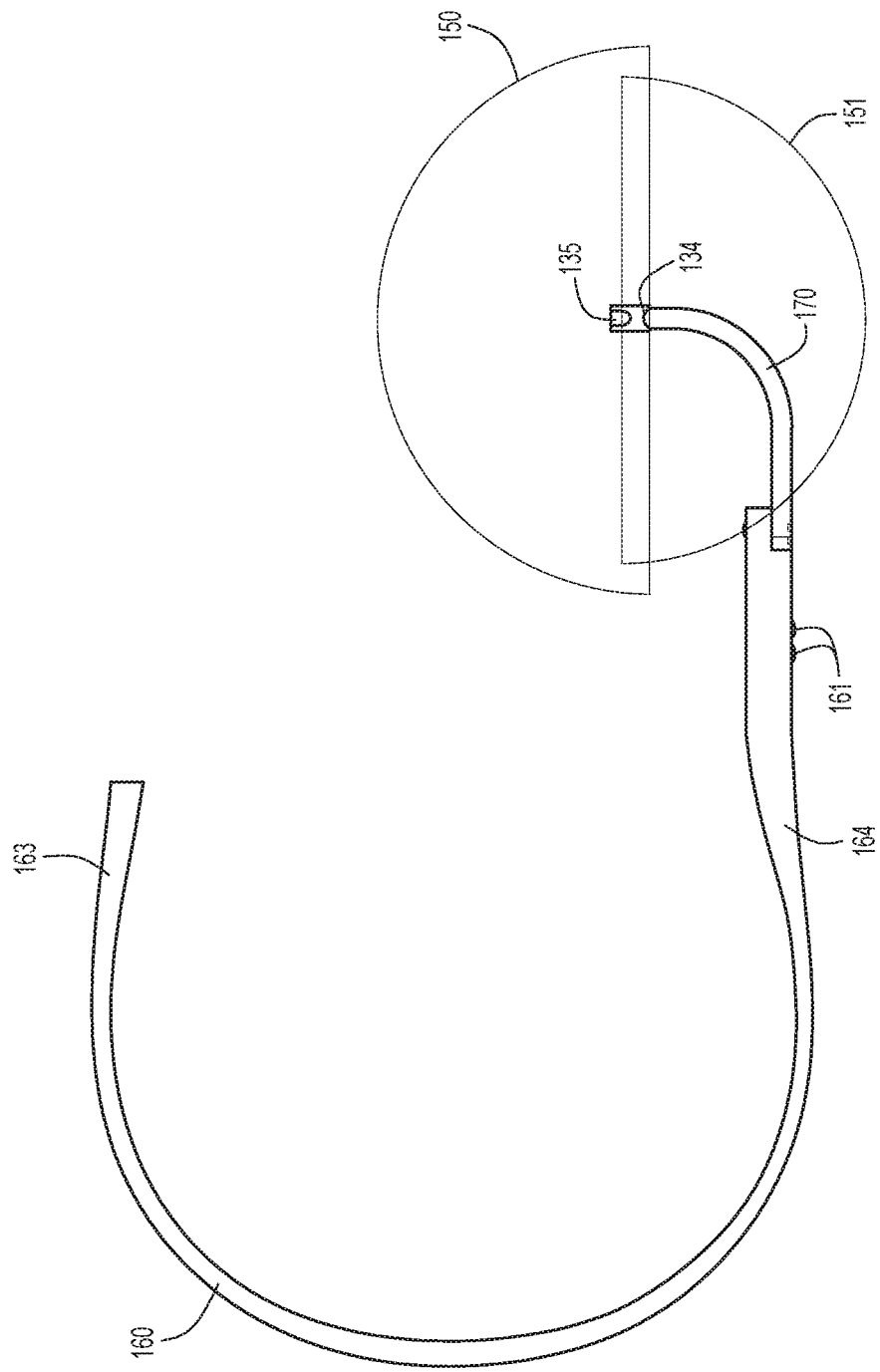
FIG. 14 is a diagrammatic view from above of a second head attachment clamp headset embodiment with a hook camera mount extending therefrom and showing the field of view captured by the device.
Figure 15:
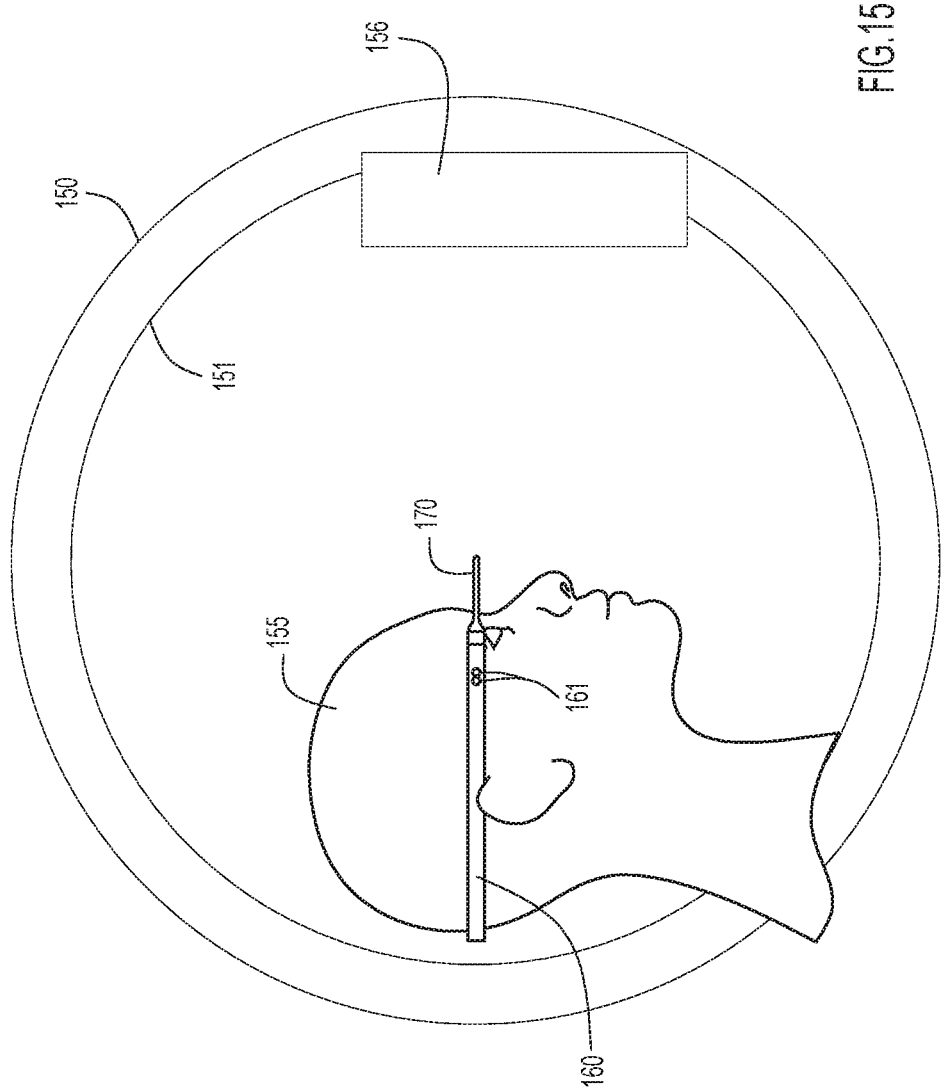
FIG. 15 is a right side view depicting an examinee wearing the head attachment clamp headset of FIG. 14 showing the vertical plane of the field of view captured by the device when viewing a computer screen.
Figure 16:
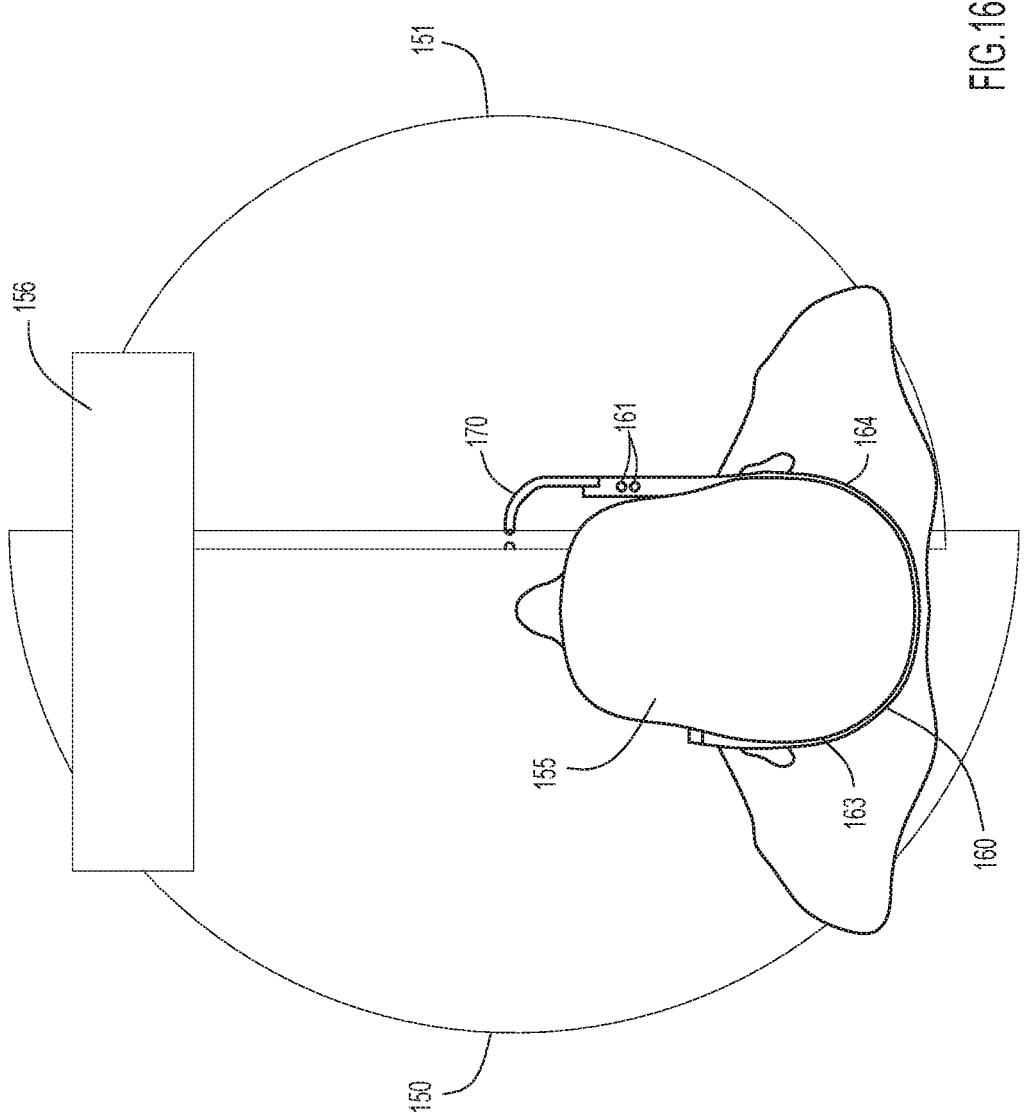
FIG. 16 is a right side view depicting an examinee wearing the head attachment clamp headset of FIG. 14 showing the horizontal plane lane field of view captured by the device when viewing a computer screen.
Figure 17:
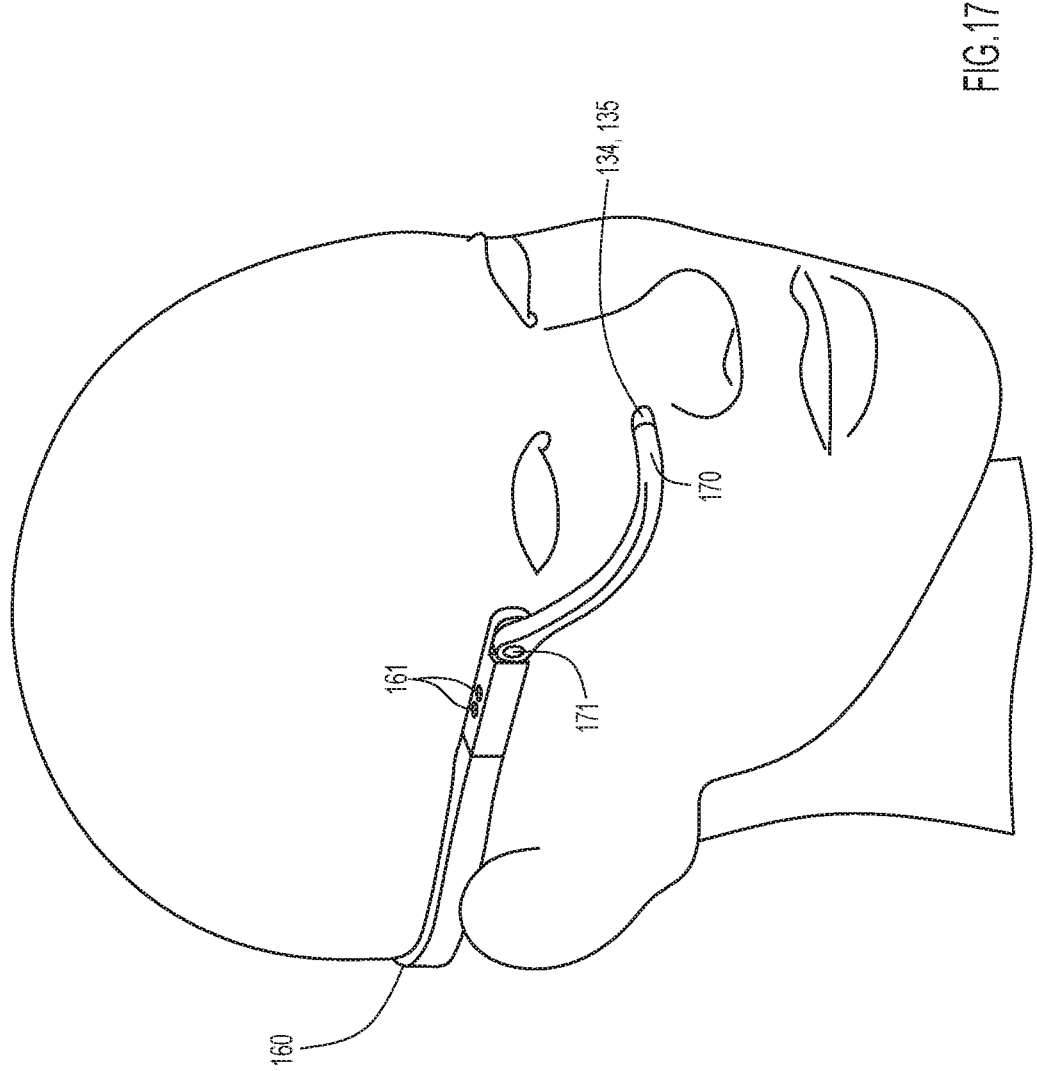
FIG. 17 is a diagrammatic view in perspective of a third head attachment clamp headset embodiment according to another embodiment of the present invention, showing the device worn by an examinee.

FIGS. 11-13 show a resiliently expandable clamp or pincher type headset 160 functioning as an alternative embodiment of the image capture device 200 of FIG. 1. Headset 160 is generally U-shaped with one leg 164 projecting longer than the other leg 163, the legs being resiliently expandable outwardly to permit placement of the headset about a portion of a wearer's head and then released to engage the head. Headset 160 is provided with a device processor or controller 161 that includes the components described in connection with the embodiment of FIG. 5 but not repeated in FIG. 11, namely the device microprocessor, battery, control switches, etc. A camera assembly 162 that typically is comprised of the fish eye camera lens and 360° mirror, described above, is secured at the distal end of the longer leg 164 of the headset so as to project beyond the examinee's eye (i.e., the right eye when the headset is worn as shown in FIGS. 12 and 13). The headset may be worn in either of two orientations so that the longer leg 164 may be on either the right side or left side of the examinee's head, as desired by the examinee. The device controller 161 may be rotatable through 360° about a horizontal axis perpendicular to the longitudinal axis of leg 164 to facilitate calibrating the system for processing as described below in connection with step 306 in FIG. 20A. The field of view 150 as provided by headset 160 is illustrated in FIGS. 12 and 13.

FIGS. 14-17 show an alternative embodiment wherein a hook camera mount 170 may be attached to the headset 160 or to an examinee's own prescription eyeglasses. The hook camera mount 170 embodiment includes the same integrated device controller components described in connection with the embodiment of FIG. 5 but not repeated in FIGS. 14-17, namely the device microprocessor, battery, control button switches, etc. At the distal end of mount 170 there is secured a camera assembly including fish eye camera lens 134 and 360° mirror 135. The hook camera mount 170 may be positionally rotatable 360° about a horizontal axis perpendicular to the longitudinal axis of leg 164 at their point of attachment 171 to enable optimal positioning of the camera and mirror unit 134, 135, and to facilitate calibrating the system for processing as described below in connection with processing step 306 in FIG. 20A.

Figure 18:
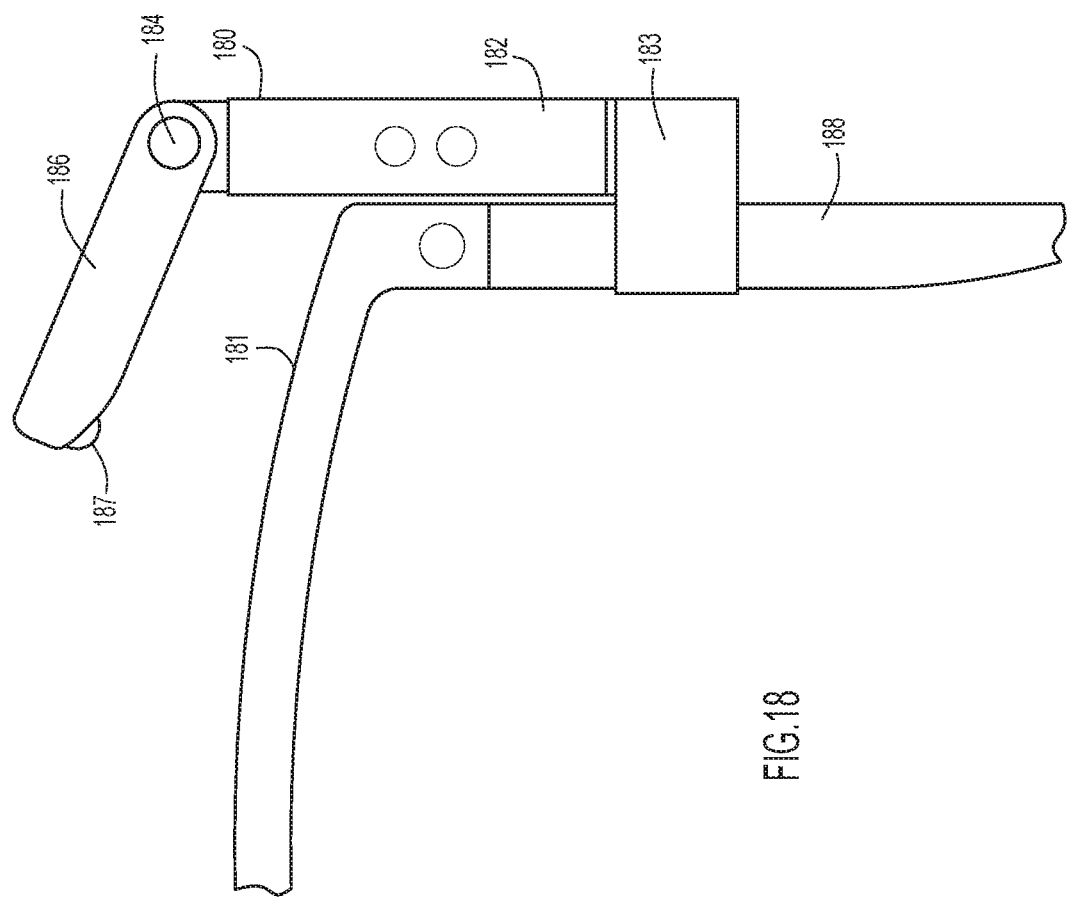
FIG. 18 is a top view in plan of a first camera mount unit attached to a temple of an eyeglasses frame constituting yet another embodiment of the head mounted image capture device according to the present invention.

FIG. 18 illustrates an embodiment of the invention wherein the image capture device 180 is a separate unit that can be selectively attached to and removed from the examinee's own eyeglasses 181. As shown, device 180 includes an elongate housing 182 for the device microprocessor, battery, control button switches, etc., terminating at a pivot joint 184 from which extends an arm 186 having at its distal end a camera assembly 187 that typically is comprised of the fish eye camera lens 134 and 360° mirror 135 described above. Housing 182 is secured at its proximal end to a temple 188 of the eyeglasses 181 by a band 183 which may be an elastic band, a strap or any suitable connection means that permits device 180 to be readily attached securely to eyeglasses 181 during use and removed thereafter. Arm 186 is selectively pivotable about a vertical axis relative to temple 188 to any position in which it can remain during an examination.

FIG. 19 illustrates an analogous arrangement for a resiliently flexible headset 190 of the type described hereinabove where the long leg of the U-shaped clamp terminates at a pivot joint 191 from which extends an arm 192 having at its distal end a camera assembly 193 that typically is comprised of the fish eye camera lens 134 and 360° mirror 135 described above.

Figure 20A:
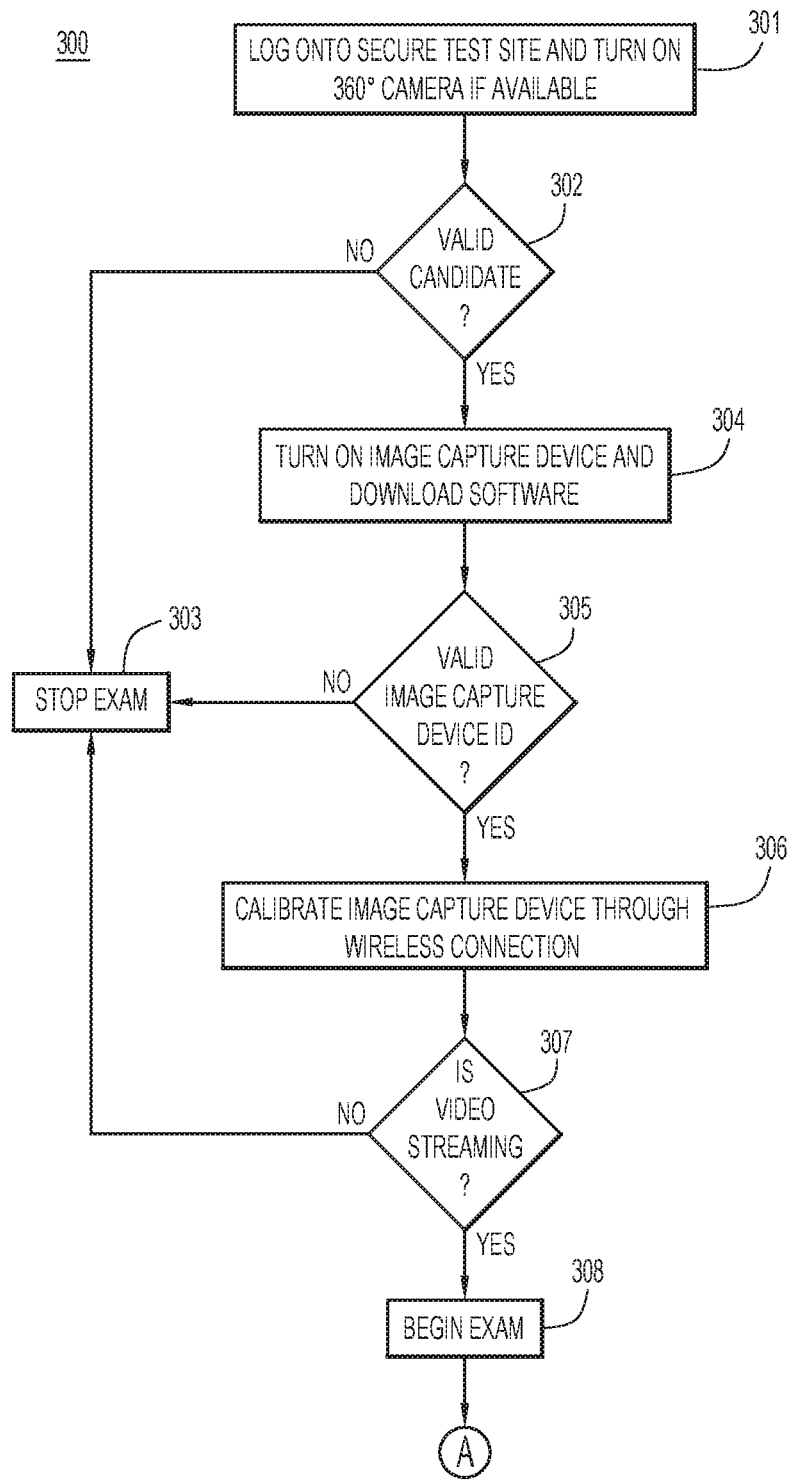
FIGS. 20A and 20B comprise a flow chart illustrating one embodiment of test candidate section processing according to the present invention.
Figure 20B:
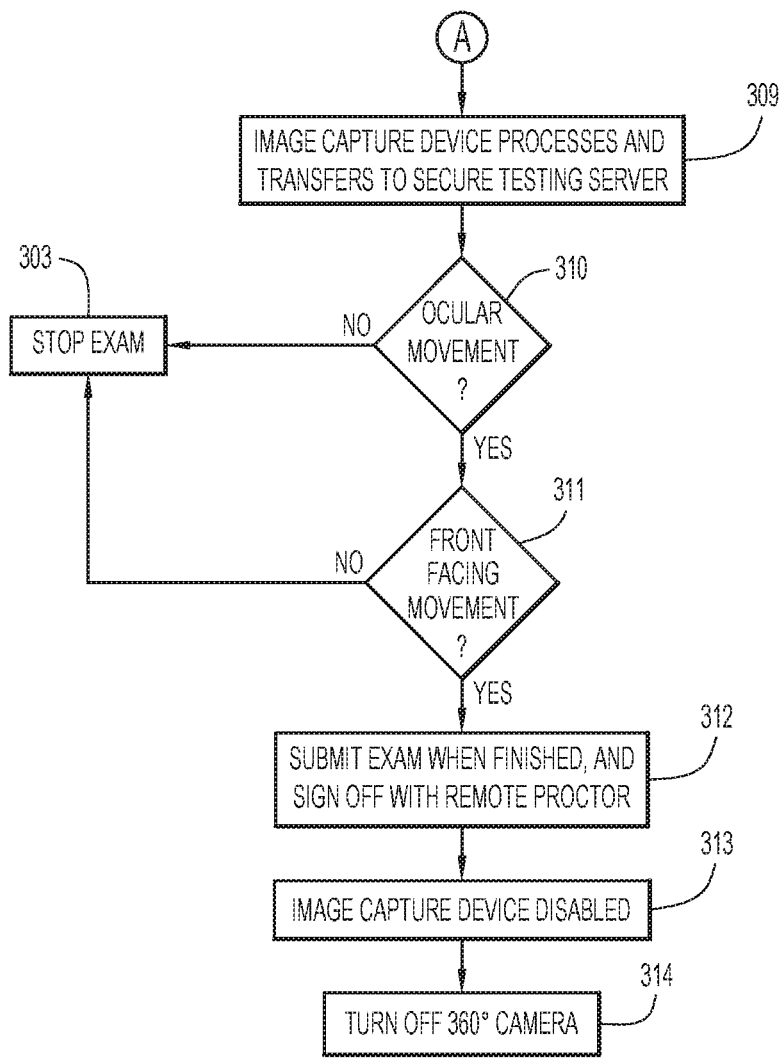

FIGS. 20A and 20B constitute a flow chart illustrating the test candidate side process 300 for a typical embodiment of the invention. Process 300 may be executed by any image capture device 200 illustrated in FIG. 1 including, but not limited to, the devices illustrated in FIGS. 2-19.

In process block 301 the examinee, or test candidate, logs onto the test delivery organization's secure test site and as an additional security feature may turn on a 360° room camera if available from that organization. In process block 302 there is interaction between the test candidate and the remote proctor to validate the test candidate. If it is determined that the candidate is invalid, the exam will stop as in process block 303. In block 304, if the test candidate passes the first validity test, he/she is prompted to turn on the image capture device and download the software validation and calibration program described below in connection with FIGS. 22A and 22B. Process block 305 validates the image capture device's unique ID with the examinee's testing profile. If the unique ID does not match the examinee's testing profile, process block 303 will stop the exam. Process block 306 calibrates the image capture device through the wireless connection. In process block 307 the device establishes the streaming video connection with the integrated device camera through the wireless connection. In process block 308 the test candidate begins taking the exam. In process block 309 the image capture device streams the 360° videos, in real time, to the test delivery organization secure server. In process blocks 310 and 311, if the image capture device detects that a front facing or ocular screen image has been frozen on the same image with no movement for more than a predetermined time (e.g., five minutes), the remote proctor will send a message to the testing candidate via the testing software. If no response is received within, for example, fifteen seconds, the exam will shut down as in process block 303. In process block 312, when the testing candidate finishes the exam he/she will submit the exam and will sign off with the remote proctor. In process block 313, when the exam has been submitted by the test candidate the image capture device will be automatically disabled. In process block 314 the 360° camera is turned off.

Figure 21A:
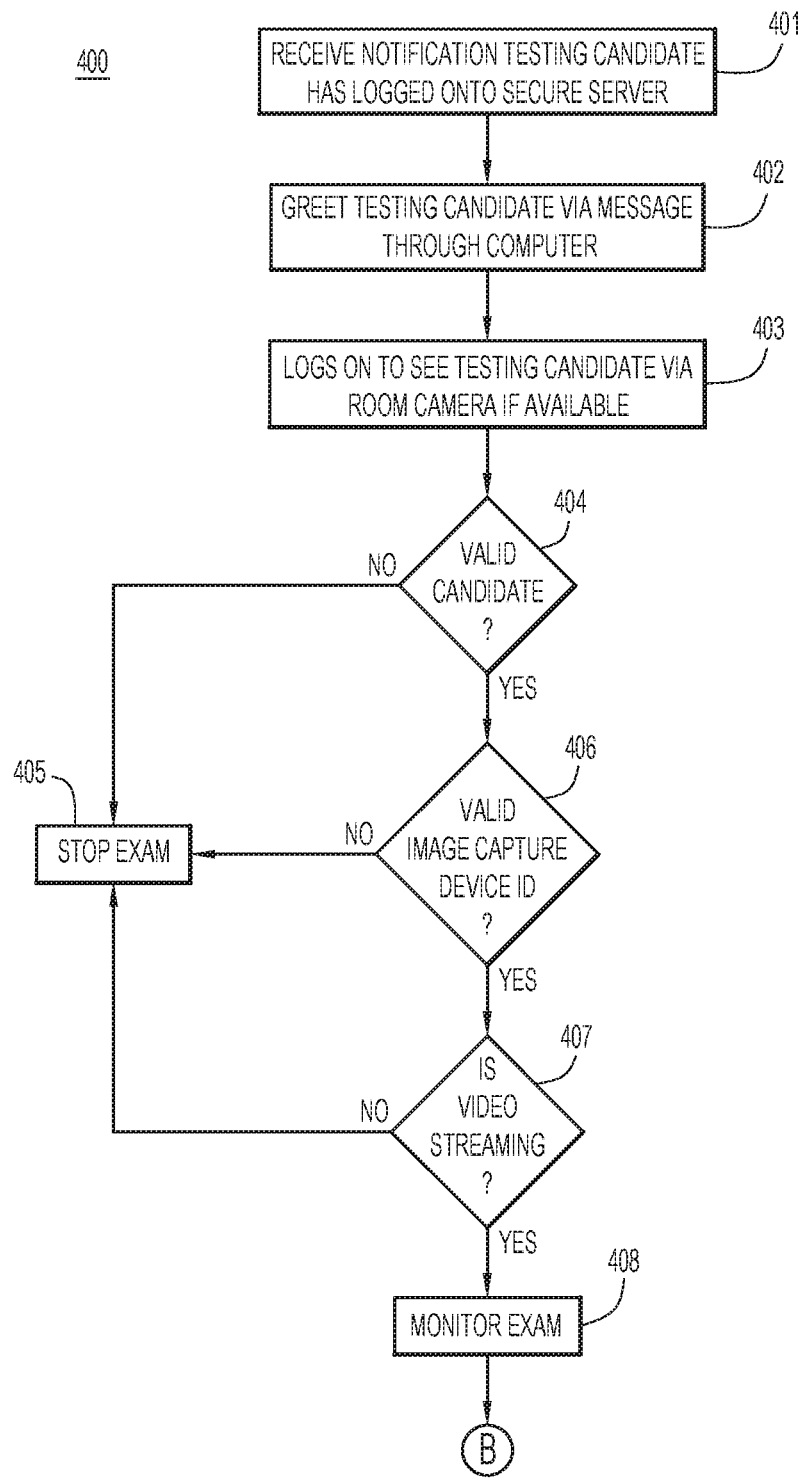
FIGS. 21A and 21B comprise is a flow chart illustrating one embodiment of remote proctor section processing according to the present invention.
Figure 21B:
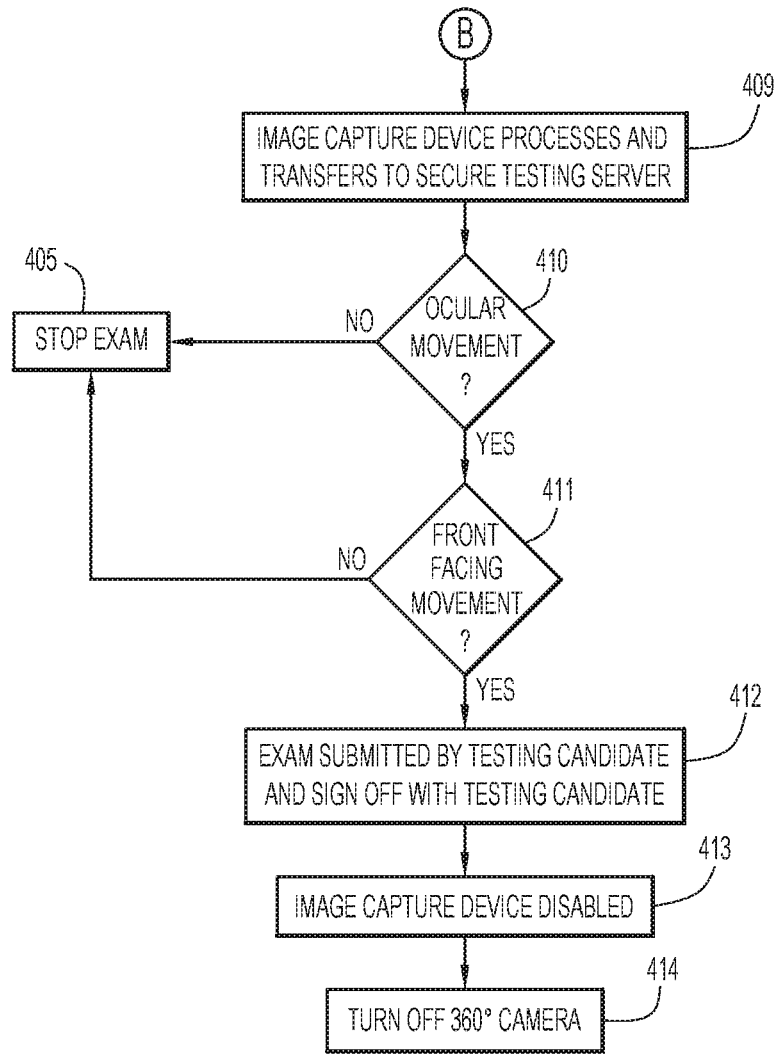

FIGS. 21A and 21B constitute a flow chart illustrating the proctor side progressing 400 for a typical embodiment of the invention. Process 400 may be executed by any image capture device 200 illustrated in FIG. 1 including, but not limited to, the devices illustrated in FIGS. 2-19. In process block 401 the proctor receives notification that a testing candidate has signed onto the secure server. In process block 402 there is communication between the test candidate and the proctor via the test candidate's computer. In the process block 403 the proctor logs on to view the candidate if room cameras are available at the test candidate's location. In process block 404 the proctor checks the validity of the test candidate. If it is determined the candidate is invalid the exam will stop as in process block 405. In process block 406, if the test candidate passes the first validity test, he/she is prompted to turn on the image capture device and download the software validation and calibration program; this process also validates the image capture detector's unique ID with candidate's testing profile. If not valid, process block 405 will stop the exam. In process block 407 the image capture device establishes the streaming video connection with the device camera through the wireless connection for 360° tracking video to the test delivery organization secure server. In process block 408 the system monitors the exam. In process block 409 the image capture device is streaming in real time 360° videos to the test delivery organizations secure server. In process blocks 410 and 411, if the image capture device detects that a front facing or ocular screen image has been frozen on the same image with no movement for more than a predetermined amount of time (e.g., five minutes), the proctor will send a message to the testing candidate. If no response is received the exam will shut down in process block 405. In process block 412, when the testing candidate finishes the exam he/she will submit the exam and will sign off with the proctor. In process block 413, when the exam has been submitted by the test candidate, the image capture devise will be automatically disabled. In process block 414 the test candidate turns off the 360° room cameras, if available, from the test delivery organization.

Figure 22A:
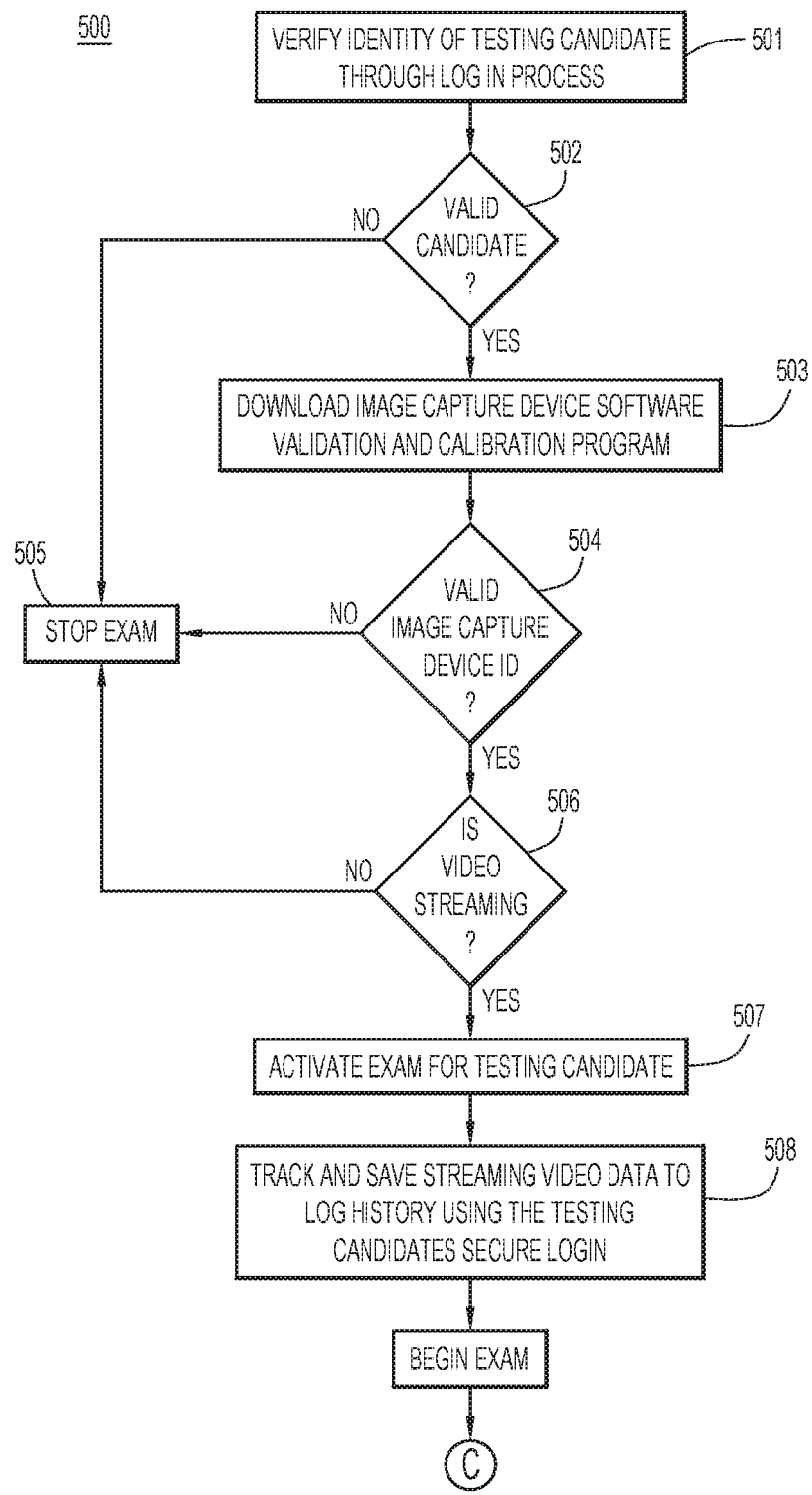
FIGS. 22A and 22B comprise a flow chart illustrating one embodiment of test delivery organization processing according to the present invention.
Figure 22B:
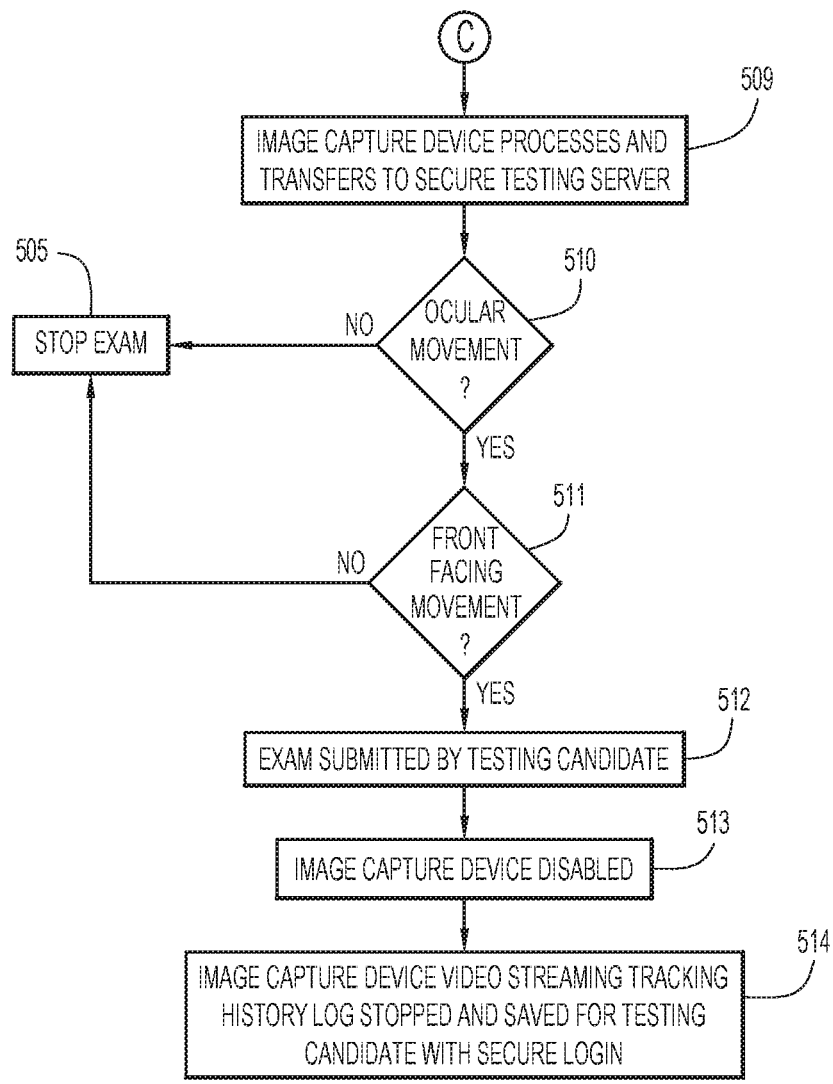

FIGS. 22A and 22B constitute a flow chart illustrating the test delivery organization side processing 500 for a typical embodiment of the invention. Process 500 may be executed by any image capture device 200 illustrated in FIG. 1 including, but not limited to, the devices illustrated in FIGS.

2-19. In process block 501 the test delivery organization secure server verifies the identity of the testing candidate through the secure logon procedure. In process block 502 the test delivery organization secure server checks the validity of the test candidate. If it is determined the candidate is invalid, the exam will stop in process block 505. In process block 503 if the test candidate passes the first validity test, he/she is prompted to turn on the image capture device and download the software validation and calibration program; this process also validates the device's unique ID with candidate's testing profile. If the unique ID does not match the candidate's testing profile, process block 505 will stop the exam. In process block 506 the eyewear establishes the streaming video connection with the integrated camera through the wireless connection for 360° tracking video to the test delivery organization secure server. In process block 507 the testing candidate's exam is activated. In process blocks 508 and 509 the image capture device is streaming in real time the 360° tracking videos to the test delivery organization secure server. In process blocks 510 and 511, if the image capture device detects that a front facing or ocular screen image has been frozen on the same image with no movement for more than a predetermined period of time (e.g., five minutes), the proctor will send a message to the testing candidate via the testing software. If no response is received the exam will shut down in process block 505. In process block 512, when the testing candidate finishes the exam he/she will submit the exam and will sign off with the proctor. In process block 513, when the exam has been submitted by the test candidate the image capture device will be automatically disabled. In process block 514 the device video streaming tracking history log is stopped and saved for the testing candidate with their secure login.

Figure 23A:
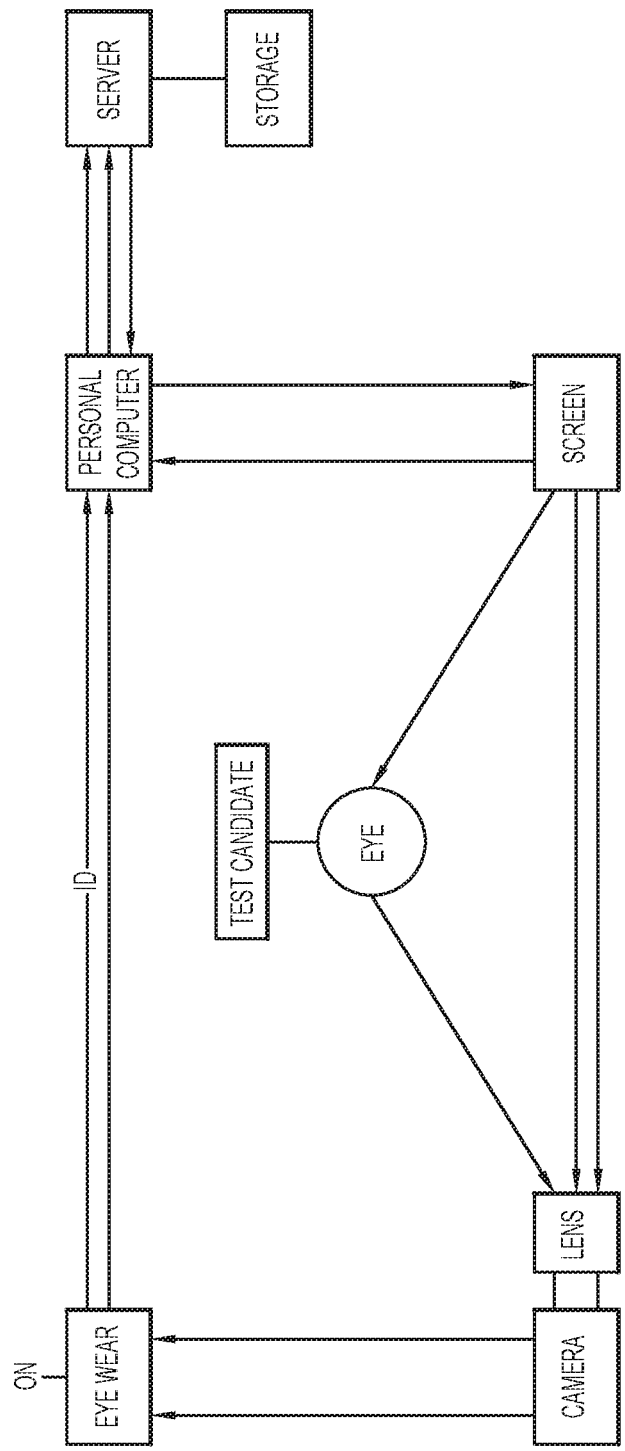
FIGS. 23A and 23B diagrammatically illustrate a calibration cycle flow charts according to the present invention.
Figure 23B:
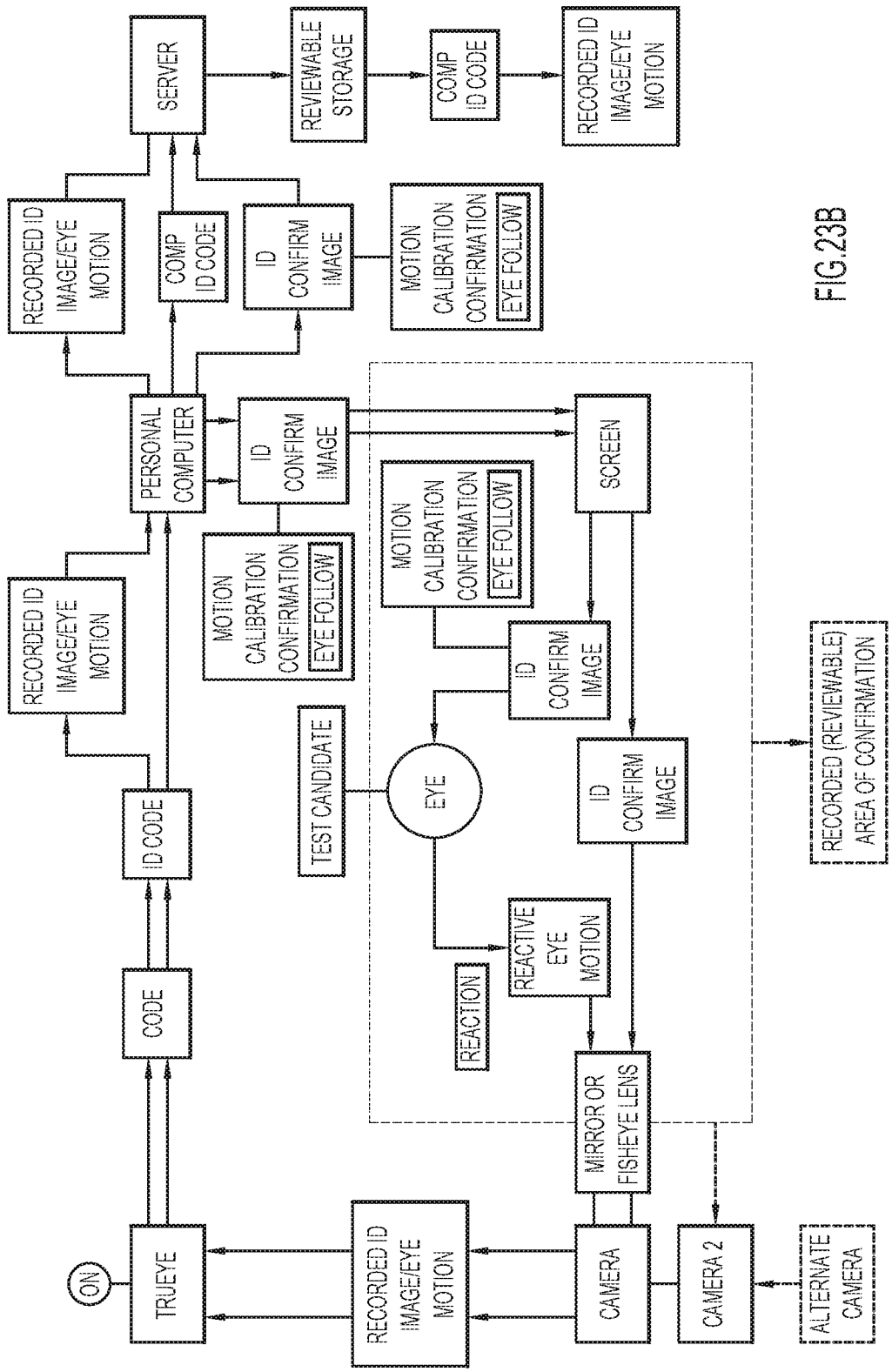

FIGS. 23A and 23B constitute a detailed continuous calibration cycle for the test candidate; his/her eye, personal computer, test sponsor, test delivery organization, the camera(s), and the image capture device. Once the test candidate has turned on his/her computer and image capture device, the device begins to communicate with the central server. The candidate enters his/her unique identification code. The initial communication will include the authentication of the unique testing identification number and the identity of the candidate. After the candidate's identity is authenticated he/she will complete an eye calibration procedure which includes a series of eye movement and image captures for identification and confirmation. The candidate may be asked to look at objects and move his/her head and eyes in various ways, such as up, down, left, right, in order to capture the entire area at the candidate's location. The images will be recorded and sent to the server. This calibration will be continuous to ensure at all times that the candidate is still testing, is the same candidate that began the exam, and that the candidate is not cheating or using unauthorized materials. The dotted lines depict the omnidirectional area that may be recorded all centered on the candidate's eye movements throughout the testing session.

From the foregoing descriptions it will be understood that, in the image capture devices described herein, the camera system comprised of the fish eye camera lens and 360° mirror may be coupled with the device processor which may include a microprocessor, graphic processor and wireless transmitter. The omnidirectional video signals are transmitted from the video camera by the wireless transmitter and then remotely streamed to the secure testing server. The encoded and scaled video stream from the device processor is transmitted to the device transmitter which packages the data for transmission through the wireless transmitter embedded in the device controller. The device transmitter sends the data to the secure testing server 260 in FIG. 1.

The image capture device camera system captures the omnidirectional image as viewed by the examinee wearing that device. Omnidirectional images are sent as a continuous video stream of individual frame images. The image capture device may utilize two cameras or a camera with a fish eye lens and a 360° mirror. The examinee's eye images can be analyzed along with the front facing images. The ocular movements can be correlated to the forward facing images to determine what the user was directly looking at when viewing the front facing images. The camera captures continuous real-time omnidirectional images.

The examinee will be asked by the remote monitor to execute a calibration test (the calibration software must be downloaded after the image capture device is powered on and wireless connection has been made between the device and the examinee's computer where the user is instructed to look in various directions or at various objects. During the calibration the pupil location with each eye image may then be calibrated to the corresponding items captured in the front facing images (e.g. computer monitor, keyboard, and calculator).

The image capture device includes an On/Off switch which is located in the device controller unit. The On/Off switch must be activated to the On mode in order for the image capture device to function. Once the image capture device has been turned on, the testing software provided by the test delivery organization will prompt the examinee to download the image capture device program. This program allows the device to be calibrated; in addition, a security check will be run to validate that the image capture device ID number matches the examinee's test profile. If it doesn't match, the device will be shut down.

The device battery should have a charge life of at least four hours, preferably more. The battery may be rechargeable using a USB port connection to the examinee's computer from the device controller unit. The device battery is located in the device controller and coupled to the electronic components embedded device controller to provide power to the electronic components. For example the battery may be connected to power the video camera, wireless transmitter, the device microprocessor and other components in the device controller. The device controller, microprocessor, battery, control button switches, and transmitter are all encased in the device controller housing and are electrically interconnected to one another and other device electronic components device gear through wiring that run through the device itself.

Although the embodiments described above focus on system operation for an individual examinee for purposes of simplicity and to facilitate understanding, it is to be understood that the system typically functions with multiple examinees communicating with the centrally located server, and that equipment and system functions described herein as associated with one examinee are replicated for each of the other examinees.

The invention may be viewed as a method and system that records a remote test candidate's ocular movement through integrated cameras secured to a head mounted image capture device with the capability of recording and sending the images to a central server that stores the data and sends the images in real time to a proctor if desired. The system is comprised of the head mounted image capture device with an integrated panoramic video camera system that may include a fish eye lens and 360° mirror to capture the examinee's field of view and images of the examinee's eye.

A controller integrated with the image capture device includes a battery that can be charged by the examinee's computer and houses a device microprocessor, control switches, and a device transmitter. A processing system located at the central server logs data directly to each candidate's testing event file.

The invention has numerous advantages. For example:

Proctors have the ability to stop an exam if deemed appropriate according to the test sponsor, and/or test delivery organizations guidelines.

The recorded data that is streamed to test delivery organizations can also utilize proprietary security methods that track unusual examinee behavior.

This system may be used as a complement to already established security protocols set up by test delivery organizations, such as 360° web cameras, software products, hardware devices, and other security products.

The method and apparatus for tracking a test candidate's eye contact mitigates risk for security breaches.

The system detects misuse, tampering, and other illicit activity that may be monitored at a centralized test delivery place of business.

Referring back to FIG. 1 of the accompanying drawings, the functional block diagram may also represent an alternative embodiment of the system and method of the present invention wherein a remotely located operator or user may be working at a location remote from a central server location. In this embodiment each remotely located operator is provided with one (or more) operator image capture device(s) 200 that communicates with a computer 240 at his/her location via a link 230 (e.g., a wired or wireless connection). The device 200 can be a head mounted unit such as eyewear (e.g., an eyeglasses frame), a resiliently flexible head attachment clamp, goggles with a flexible band, or any other suitable unit capable of being supported on the operator's head and carrying multiple cameras 220, as needed for the embodiments described hereinbelow, that can view the operator's field of view and the operator's eyes. The camera system permits capture of the 360° field of view about the operator during a situational event.

As previously discussed with regard to the first exemplary embodiment, the computer 240 may be a personal desktop computer, laptop computer, PDA, or the like, that is configured to communicate with device 200 via communication link 230. The computer 240 and the image capture device 200 may include wireless transmission components to enable the communication link 230. The wireless connection may be made by using, e.g., Bluetooth radio technology, communication protocols described in IEEE 802.11 (including any IEEE 802.11 versions), etc. The computer 240 may access the Internet or other communication channel 250 to gain access to a centrally located server system 260. The video streaming data from the image capture device 200 is received at the server system 260 where it is monitored (in real time or after a situational event) and saved in system logs 275 in a server database 270 on a per operator basis. That is, there is typically an individual file (virtual or actual) in the database for the image capture device of each remotely located operator.

Figure 5:
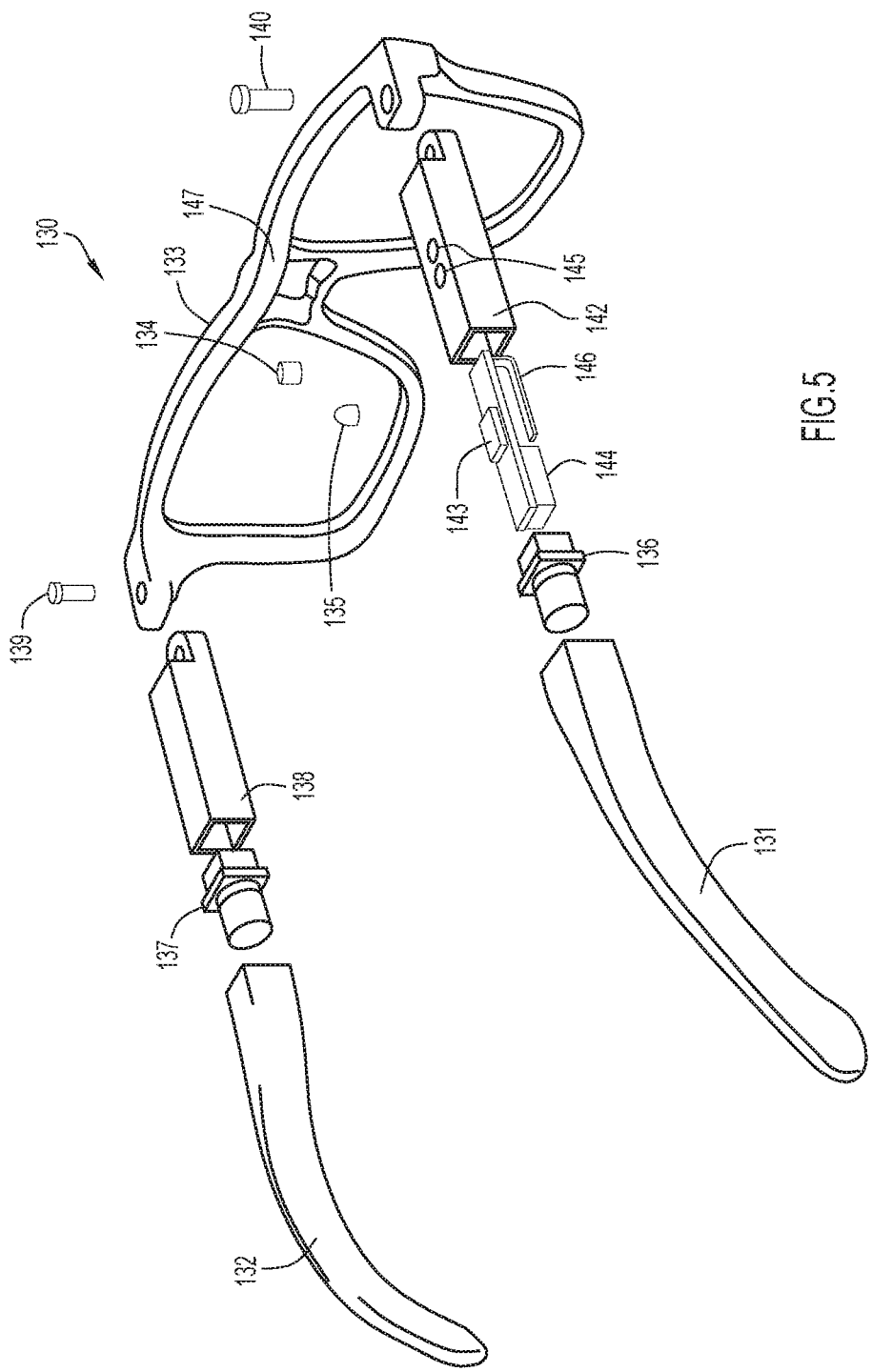
FIG. 5 is an exploded rear view in perspective of the eyewear assembly embodiment of FIG. 4.
Figure 25:
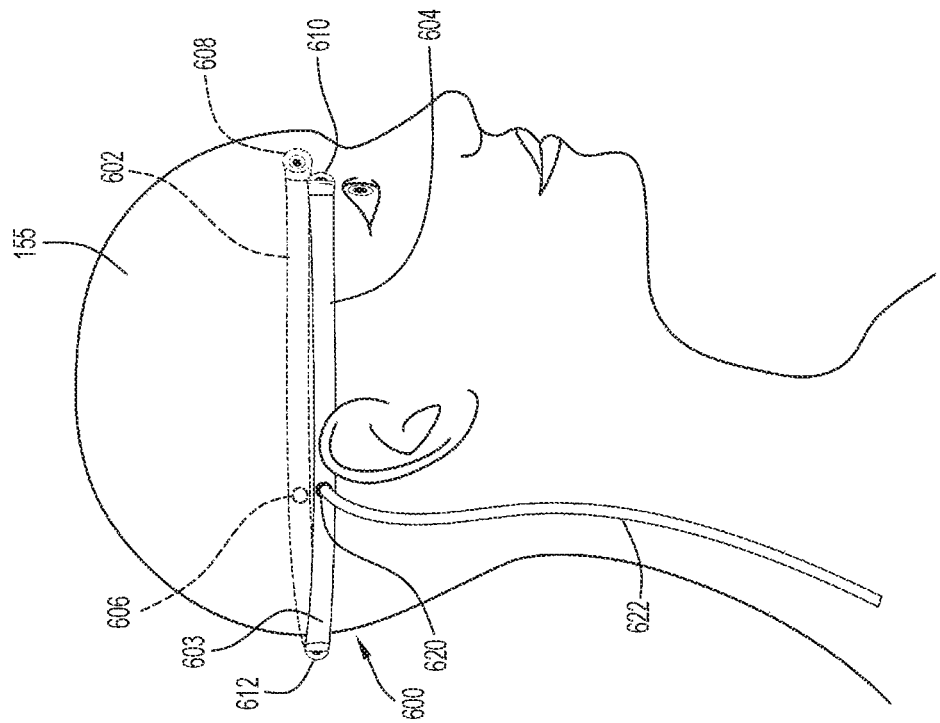
FIG. 25 is a right side view illustrating an operator wearing the flexible attachment clamp headset of FIG. 24 according to certain embodiments of the present invention.
Figure 24:
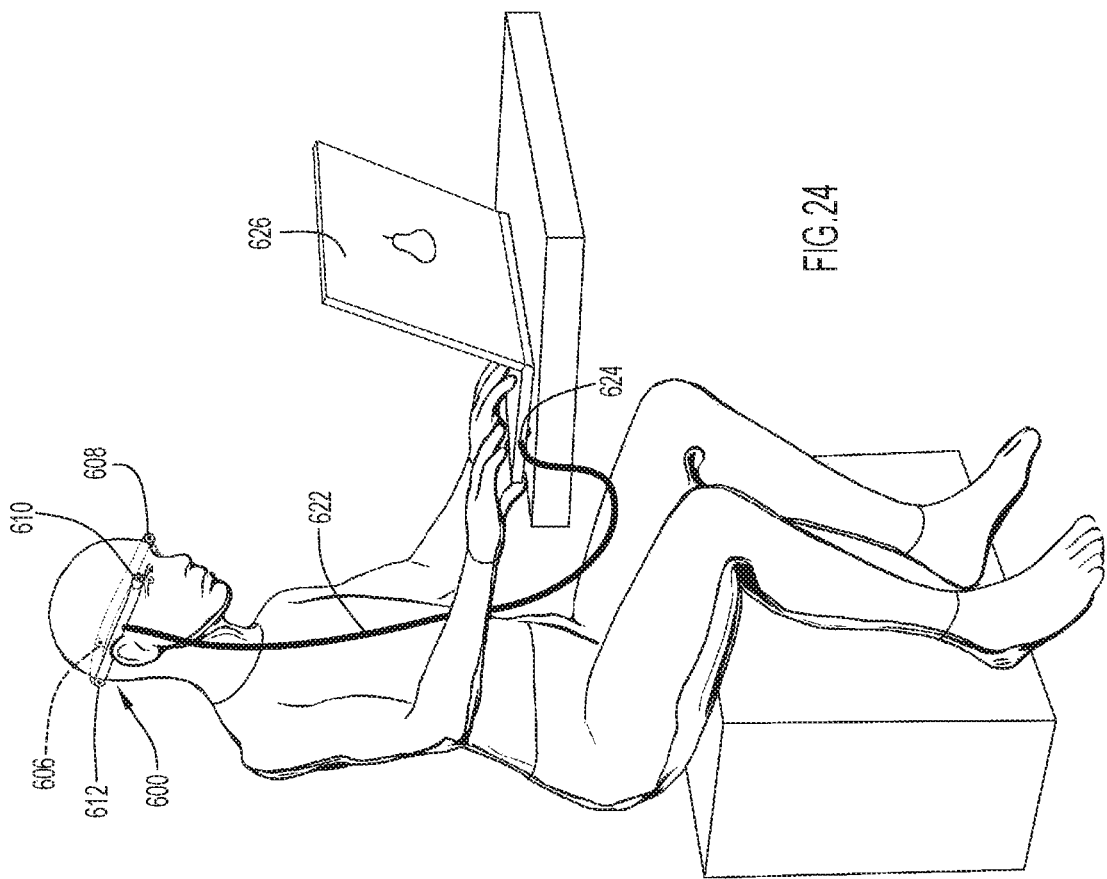
FIG. 24 is a perspective view from the front and right side illustrating an operator viewing a computer screen while wearing a flexible attachment clamp headset utilizing multiple cameras powered from the computer USB port in accordance with certain embodiments presented herein.

Referring now to FIGS. 24 and 25, shown is a lightweight, resiliently expandable, elongated clamp or pincher type headset 600 functioning as an exemplary alternative embodiment of the head mounted image capture device 200 of FIG. 1 in accordance with aspects of the present invention. In the illustrated embodiment, the flexible headset 600 has a generally U-shaped configuration and includes first and second leg portions 602, 604 of approximately equal length, each having a distal end terminating forward of the wearer's eyes, and a rear connecting portion configured to extend around the back of the wearer's (user/operator) head 155. The first leg portion extends on a first side (e.g., left side) of the headset and the second leg portion extends on a second side (e.g., right side) of the headset. The first and second leg portions are resiliently expandable outwardly to permit placement of the headset about a portion of a wearer's (user/operator) head and then released to engage sides of the wearer's head. The headset 600 is also provided with a device processing system (i.e., a processor or controller) 606 that includes components similar to the components described in connection with the example embodiments of FIGS. 3 and 5, except in this exemplary embodiment the battery has been removed for purposes of weight reduction and safety. Although the components of device processing system 606 are not illustrated in FIGS. 24 and 25, it should be understood that the device processing system includes control buttons (switches) 122, a wireless transmitter 124, a microprocessor 126, a graphics processor 128, etc., as illustrated in FIGS. 3 and 5. However, while the power source (i.e., battery) in this implementation of the exemplary embodiment has been eliminated, it will be appreciated that other implementations of headset 600 could be constructed with a rechargeable battery similar to the rechargeable battery of the FIGS. 3 and 5 embodiments, if desired.

Figure 26A:
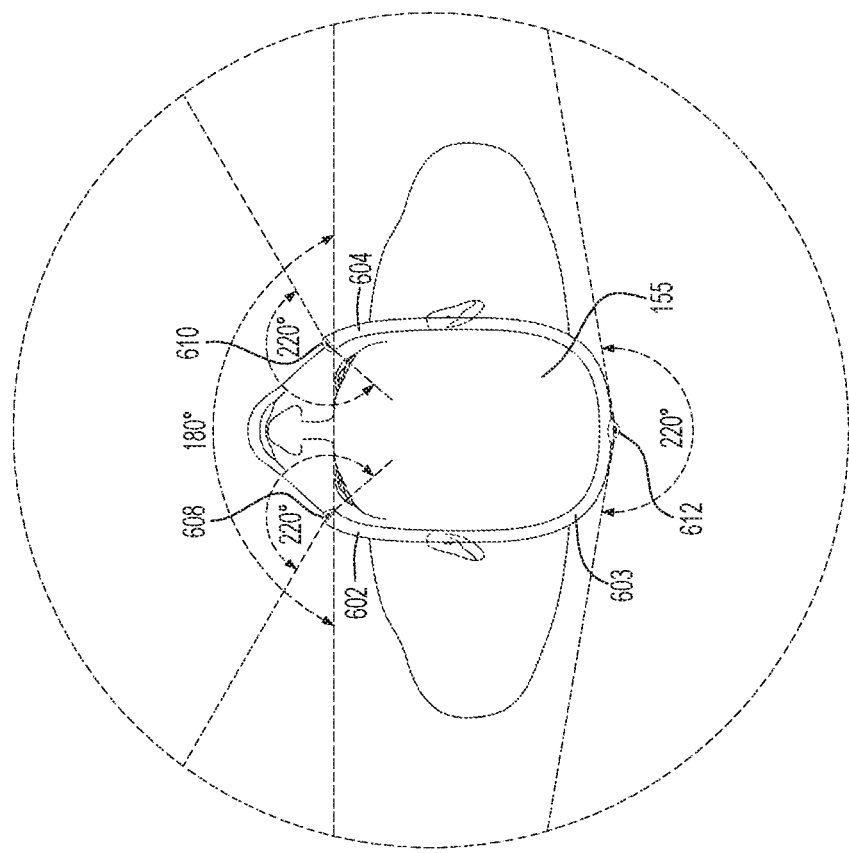
FIGS. 26A and 26B are top views illustrating an operator wearing the flexible attachment clamp headset of FIG. 24 and showing the horizontal plane fields of view captured by the cameras when viewing the computer screen in accordance with certain embodiments presented herein.
Figure 26B:
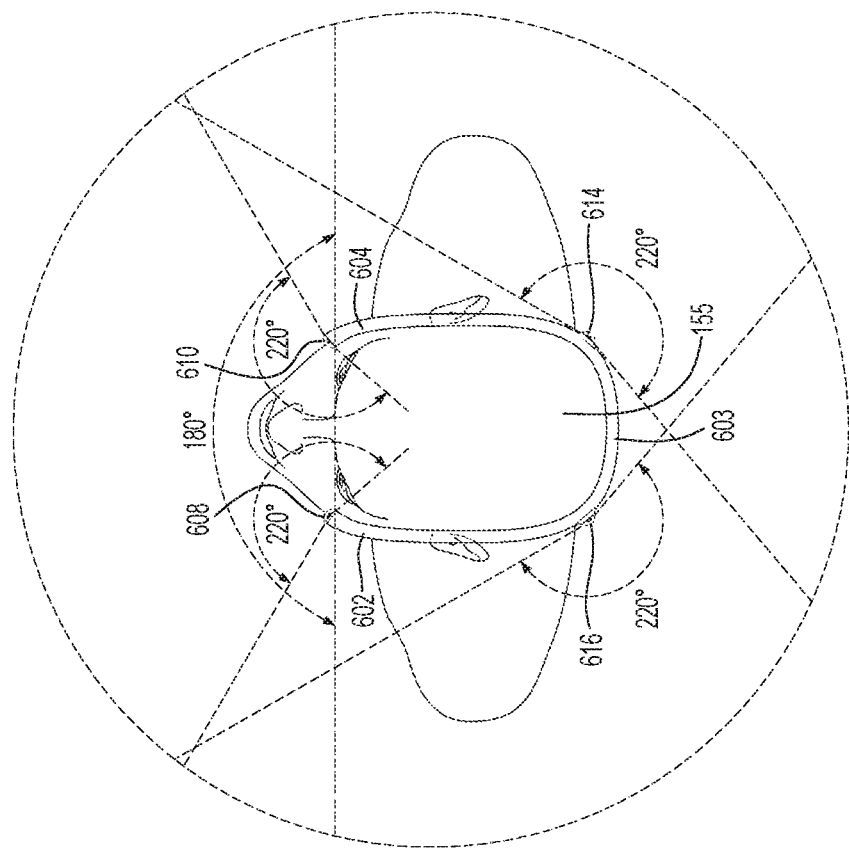
Figure 28:
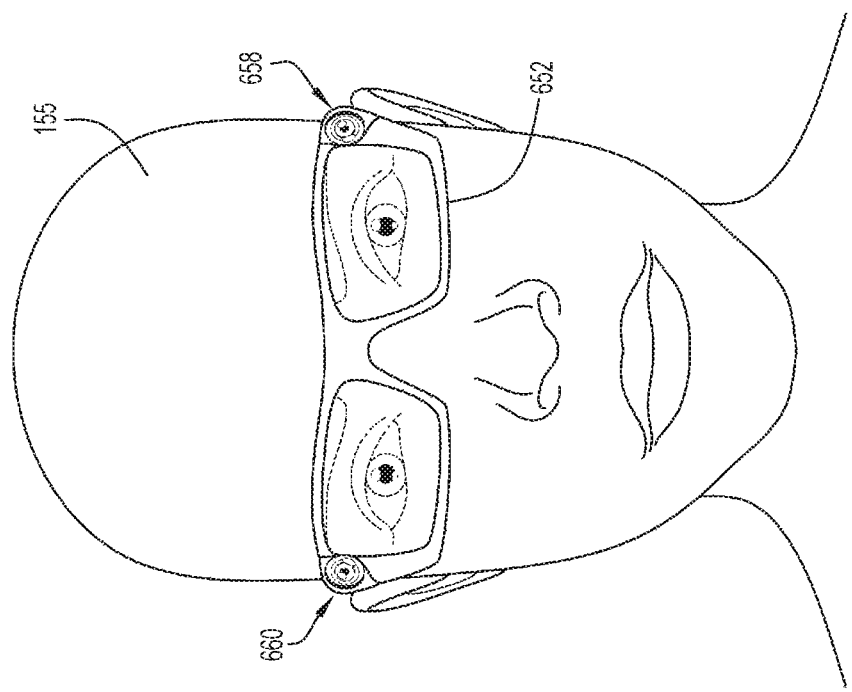
FIG. 28 is a front view in elevation illustrating an operator wearing the eyeglasses frame assembly of FIG. 27 and showing the left and right front cameras in accordance with certain embodiments of the invention presented herein.
Figure 27:
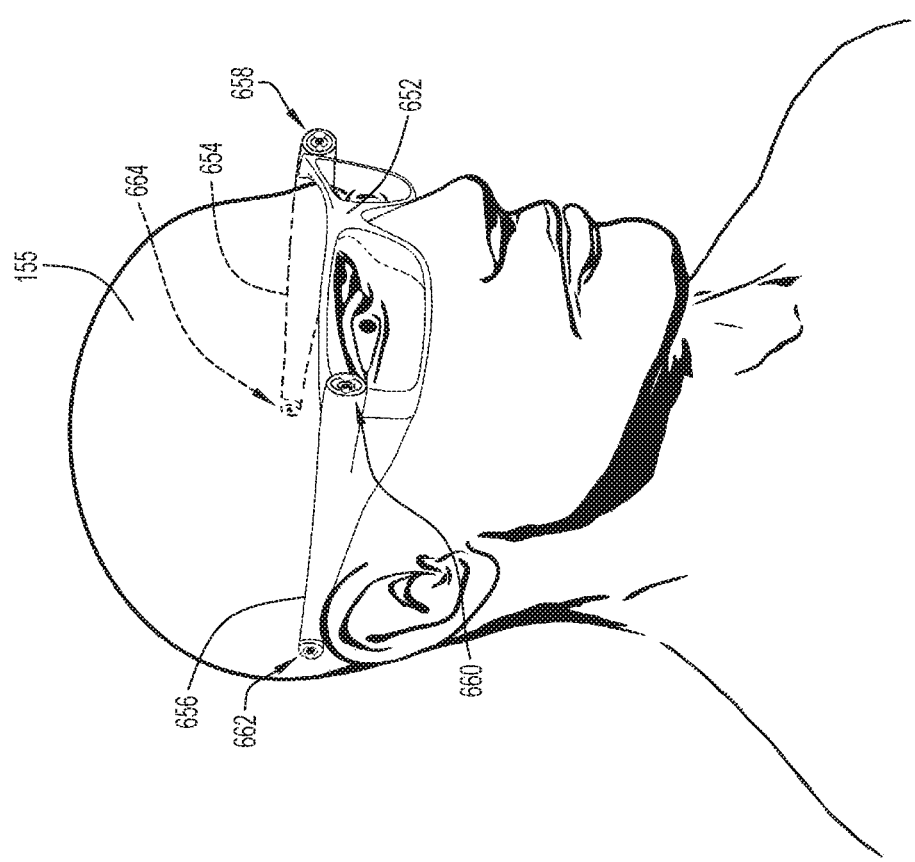
FIG. 27 is a perspective view from the front and right side illustrating an operator wearing an eyeglasses frame assembly utilizing multiple front and rear cameras in accordance with an embodiment of the present invention.
Figure 30:
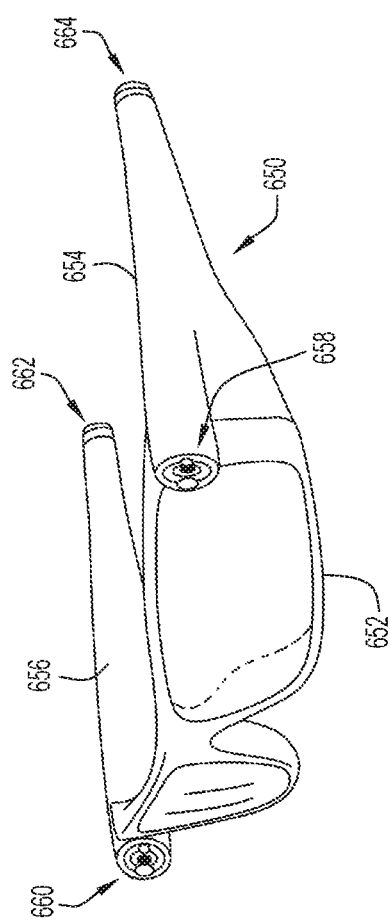
FIG. 30 is a perspective view from the front and left side illustrating the eyeglasses frame assembly of FIG. 27 utilizing multiple front and rear cameras in accordance with certain embodiments of the present invention.
Figure 29:
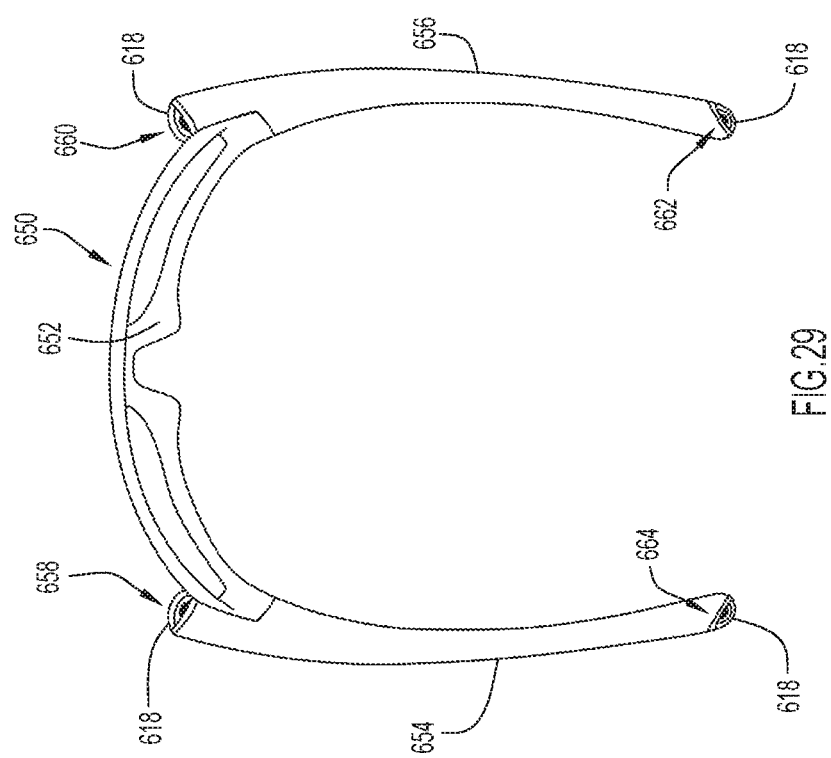
FIG. 29 is a top view of the eyeglasses frame assembly of FIG. 27 showing left and right front and rear cameras in accordance with certain embodiments presented herein.

As shown in FIGS. 24, 25 and 26A 26B, a left front facing video camera/recorder assembly 608 is mounted on or built into the distal end of first leg portion 602 and a right front facing video camera/recorder assembly 610 is similarly mounted on or built into the distal end of second leg portion 604 of the headset 600 so as to project beyond the operator's left and right eyes, respectively, when the headset is worn by the operator. Further, multiple spaced apart rear facing video camera/recorder assemblies 612, 614, 616 are secured to the rear connecting portion 603 of the headset. As depicted in FIG. 26A, the rear facing camera/recorder assemblies 614, 616 are located on the headset rear connecting portion adjacent respective right and left sides of the wearer's (operator's/user's) head, while the rear facing camera/recorder assembly 612, as depicted in FIG. 26B, is centrally located on the headset rear connecting portion between camera/recorder assemblies 614, 616. Each camera/recorder assembly 608, 610, 612, 614, 616 typically includes a wide angle lens.

In the exemplary embodiment described above, each front facing camera/recorder assembly 608, 610 has a wide angle lens with a conical field of view of approximately 220°; this permits the camera to view all images within a 220° field of view about the focal axis of the camera lens. The 220° field of view provided by each front facing camera/recorder assembly is diagrammatically illustrated in FIGS. 26A and 26B. However, it will be appreciated that wide angle lenses having other suitable horizontal fields of view may be utilized, if desired. Moreover, each camera/recorder assembly 608, 610 is forward facing and positioned at the distal end of its respective leg portion with its lens exposed in order to allow the forward field of view and ocular eye movements of the wearer (operator/user) to be captured contemporaneously. Each camera/recorder assembly 608, 610 provides a continuous video stream of front facing images and ocular eye images, respectively. More specifically, the lens of each front facing video/recorder assembly 608, 610 is angled to face slightly inward to capture direct images of the operator's eyes from a peripheral vantage point. The two front facing camera/recorder assemblies allow the head mounted image capture device (headset) 600 to capture the user's (operator's) eye movements while the user is viewing the front facing images during a situational event; those front facing images are captured by the two front facing camera/recorder assemblies 608, 610 continuously in real time. Thus, everything viewed by the operator wearing headset 600 is visually recorded contemporaneously with the operator's ocular movements.

The rear facing video camera/recorder assemblies 612, 614, 616 also have a wide angle lens with a field of view of approximately 220°. The field of view provided by each rear facing camera/recorder assembly is illustrated in FIGS. 26A and 26B. However, it will be appreciated that wide angle lenses having other suitable horizontal fields of view may be utilized, if desired. Similarly, each camera/recorder assembly 612, 614, 616 is generally rearward facing and positioned on the rear portion of the headset with its lens exposed in order to allow each such assembly to contemporaneously capture a rearward field of view of the wearer (operator/user). Each camera/recorder assembly 612, 614, 616 may provide a continuous video stream of rear facing images, as well as a continuous video stream of single rear facing images during a situational event. Each rear facing camera/recorder assembly 612, 614, 616 contemporaneously captures the rear facing images in real time while the front facing camera/recorder assemblies 608, 610 capture the front facing images in real time. When the fields of view of the front and rear camera/recorders are combined via conventional video stitching techniques, the head mounted image capture device 600 permits capture of a 360° field of view about the operator during a situational event (see FIGS. 26A and 26B).

The video camera/recorder assemblies 608, 610, 612, 614, 616 may be standard definition video recorders limited to recording in low resolution, such as video graphic array (VGA) resolutions of 640×480 pixels. The front and rear facing may be captured using any of a variety of different standardized imaging codecs (e.g., MPEG, MPEG4, series of JPEG images, etc.) or a proprietary imaging protocol. Moreover, one or more of the video recorders may include a built-in microphone and audio circuit (not shown) to capture audio associated with a situational event. Furthermore, each wide angle lens 618 in this embodiment may be a standard 220° mini-wide angle fisheye lens, such as the Etaniya model ENT220, the TELESIN 220° Wide Angle lens, and others.

Electrical power to operate the front and rear facing video camera/recorder assemblies 608, 610, 612, 614, 616, as well as the other components described above in connection with the embodiment illustrated in FIGS. 2 and 3 (namely the wireless transmitter 124, microprocessor 126, graphics processor 128, control switches 122, etc.), is provided by a power source/supply located outside the head mounted image capture device (headset) 600. Power to operate the video camera/recorder assemblies and other components of the headset may be provided by the battery powering the operator's/user's laptop computer 626. At least one of the leg portions 602, 604 of headset 600 is provided with a slot 620 configured to receive a cable 622 connectable to the battery of the operator's laptop via the computer's USB receptacle 624. The cable receiving slot 620 is shown located on right leg portion 604 in front of the operator's right ear; however, it should be understood that the slot can be located anywhere on the headset that is convenient for the wearer (user/operator).

The cable 622 includes a first end with a jack (not shown) removably coupleable to slot 620, and a second end with a USB plug (not shown), removably coupleable to the USB receptacle 624 in computer 626. However, the plugs on the second end of cable 622 may have various configurations to permit headset 600 to be removably coupleable to differently configured receptacles of external power sources. For example, the plug may have a configuration that permits it to be plugged into a power supply of a vehicle via the vehicle's cigarette lighter socket, a DC power port of a portable charger wearable on a harness or belt of the operator/user, an AC electrical outlet, etc.

The front and rear facing video camera/recorders 608, 610, 612, 614, 616 are connected to the graphic processor 128, the microprocessor 126, and the wireless transmitter 124 as described in connection with FIGS. 2, 3, etc. The video signals from the front facing cameras, including the ocular image video signals, as well as the video signals from the rear facing camera images, are transmitted from their respective video camera/recorders to the operator's computer 626 by the wireless transmitter of image capture device 600 and then remotely streamed to the secure centrally located server system 260 (FIG. 1) as described above. The video image camera/recorder input is streamed live to and saved at the centrally located server system. In addition, the streamed video images from the front and rear facing video camera/recorders 608, 610, 612, 614, 616 are stitched together at the centrally located server system into a single video stream using stitching software. Suitable stitching software for this purpose is StereoStitch™, a commercially available real-time 3D 360° video stitching software; information about this software is available at https://www.stereostitch.com. Other video stitching systems and methods are disclosed in US20080253685 (Kuranov et al.) and U.S. Pat. No. 9,451,180 (Mo et al.). Single camera/recorder image data and full audio/video data of a situational event (i.e., an incident) are transferred to the centrally located server system as well.

The video transmission data may be streamed from the video camera/recorders 608, 610, 612, 614, 616 with a resolution of 640×480 pixels to the graphic processor. The graphic processor 128 (FIG. 3) may encode and scale the video data into a particular video compression format such as H.264 video stream, and scale the video into a 0.5 Mbps stream with a resolution of 480×360 pixels. As described in connection with FIGS. 2, 3, the encoded and scaled video stream from the graphic processor 128 is transmitted to the microprocessor 126, which packages the data for the transmission via the wireless transmitter 124. The wireless transmitter 124 transmits the data to the secure centrally located server system 260 via the operator's computer 240 (FIG. 1). The front facing and ocular tracking video streams are time keyed or synchronized with each other.

FIGS. 27-31 illustrate an exemplary unit 650 comprising another embodiment of the head mounted image capture device of the present invention. As depicted, unit 650 is shown in the form of eyewear, specifically an eyeglasses frame assembly with or without lenses. The elements of the eyeglasses frame assembly include a front frame or rims 652 and left and right side arms or temples 654 and 656. Hinges (not illustrated) may connect the proximal end of the left eyeglasses temple 654 and the proximal end of right eyeglasses temple 656 to the front frame or rims 652. However, it will be appreciated that any other suitable arrangement may be utilized that permits the temples to rotate inwardly and outwardly during. The front frame 652 and the left and right temples 654, 656 may be formed of solid or hollow structural plastic or metal or similar material as to allow for the connections and functions described herein, and particularly for wiring and/or other electrical connections to be internally routed through the eye-gear.

A left front facing video camera/recorder assembly 658 may be mounted on or built into (i.e., embedded) the proximal end of left eyeglasses temple 654 adjacent the left rim of front frame 652 and a right front facing video camera/recorder assembly 660 may be similarly mounted on or built into (i.e., embedded) the proximal end of right eyeglasses temple 656 of the eye-gear 650 adjacent the right rim of front frame 652 so as to project beyond the operator's left and right eyes, respectively, when the eyeglasses frame assembly is worn by the operator. Further, a left rear facing video camera/recorder assembly 664 may be mounted on or built into (i.e., embedded) the distal end of left eyeglasses temple 654 and a right rear facing video camera/recorder assembly 662 may be similarly mounted on or built into (i.e., embedded) the distal end of right eyeglasses temple 656 of the eye-gear 650 (see FIGS. 27-30). Each camera/recorder assembly 658, 660, 662, 664 typically includes a wide angle lens 618 with a horizontal field of view of approximately 220° that is substantially identical to the wide angle lenses 618 described in the exemplary headset embodiment illustrated in FIGS. 24 and 25.

Figure 31:
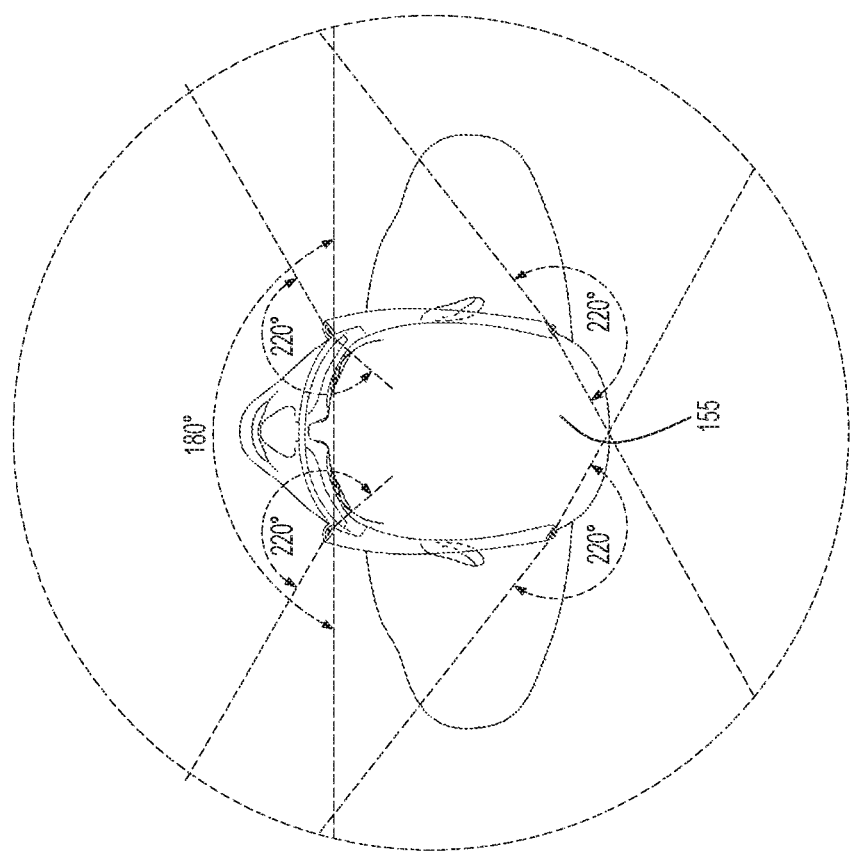
FIG. 31 is a diagrammatic top view illustration of the horizontal plane fields of view captured by the cameras of the eyeglasses frame assembly of FIG. 27 with the eyeglasses frame assembly superimposed according to certain embodiments presented herein.

The field of view provided by each front facing camera/recorder assembly 658, 660 is diagrammatically illustrated in FIG. 31. Again, it will be appreciated that wide angle lenses having other suitable horizontal fields of view may be utilized, if desired. Each camera/recorder assembly 658, 660 is forward facing and positioned at the distal end of its respective side arm or temple 654 and 656 with its lens 618 exposed in order to allow the forward field of view and ocular eye movements of the wearer (operator/user) to be captured contemporaneously. Both camera/recorder assemblies 658, 660 provide continuous video streams of front facing images and ocular eye images, respectively. More specifically, lens 618 of each front facing video/recorder assembly 658, 660 is angled to face slightly inward to capture direct images of the operator's eyes from a peripheral vantage point. The two front facing camera/recorder assemblies allow the head mounted image capture device 650 to capture the user's (operator's) eye movements while viewing the front facing images during a situational event. The two front facing camera/recorder assemblies 658, 660 capture the front facing images as viewed by the operator or user wearing the device (eyeglasses) 650. The front facing images are obtained continuously in real time, recording everything viewed by the operator wearing the eye-gear 650 in a manner similar to the headset embodiment of FIGS. 24 and 25, as described.

Figure 33:
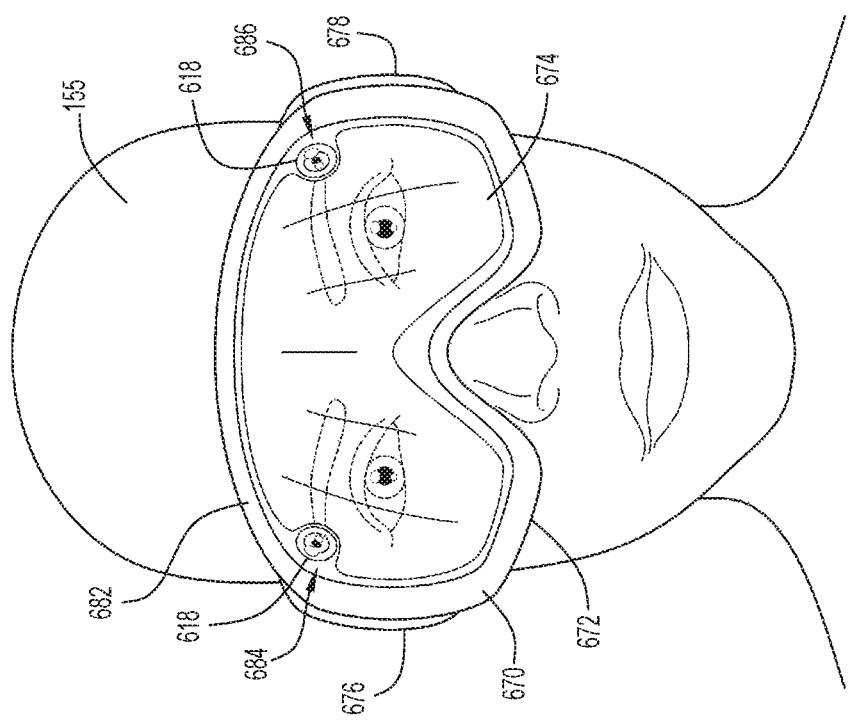
FIG. 33 is a front view in elevation illustrating an operator wearing the goggles assembly of FIG. 32 and showing the left and right front cameras in accordance with certain embodiments of the invention presented herein.

Turning now to FIGS. 32-35, shown is another form of eyewear, i.e., goggles assembly (unit) 670, functioning as another exemplary embodiment of the head mounted image capture device 200 of FIG. 1 in accordance with the present invention. As depicted, the goggles assembly (unit) 670 comprises a frame 672 formed, for example, of resilient flexible material, such as soft plastic or rubber-like material, with a lens 674 mounted within a front opening defined by the frame (FIG. 33). The lens, however, may be omitted, if desired. The flexible frame 672 may be solid or hollow to allow for the connections and functions described herein, and particularly for wiring and/or other electrical connections to be internally routed through the goggles. The frame includes right and left side portions 676, 678 and an elastic strap 680 attached to the proximal end of each side portion to secure the goggles assembly snugly against the face of a wearer (user/operator).

Mounted on or in the frame 672 of goggles unit 670 is a device processor or controller 682 (see FIG. 33) similar to the device processing system 606 (FIG. 25) described above. The processor/controller includes components that are similar to the components described in connection with the exemplary eye-gear embodiments illustrated in FIGS. 3 and 5, except in this example embodiment the battery has been removed for purposes of weight reduction and safety. Although the components of processor/controller 682 are not illustrated in FIGS. 32-34, it should be understood that the processor/controller includes control buttons (switches), a wireless transmitter, a microprocessor, a graphics processor, etc. While the power source (i.e., battery) in this implementation of the head mounted image capture device has been eliminated, it will be appreciated that other implementations of goggles unit 670 may include a rechargeable battery similar to the rechargeable battery in the FIGS. 3 and 5 embodiments, if desired.

Figure 32:
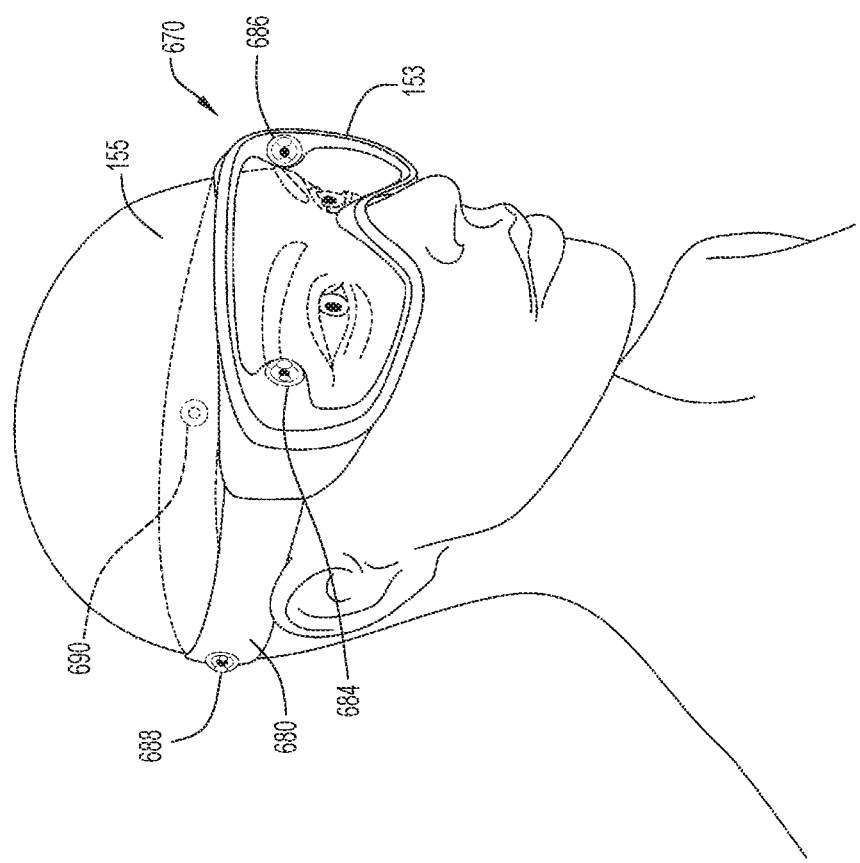
FIG. 32 is a perspective view from the front and right side illustrating an operator wearing a goggles assembly utilizing multiple front and rear cameras in accordance with an embodiment of the present invention.
Figure 35:
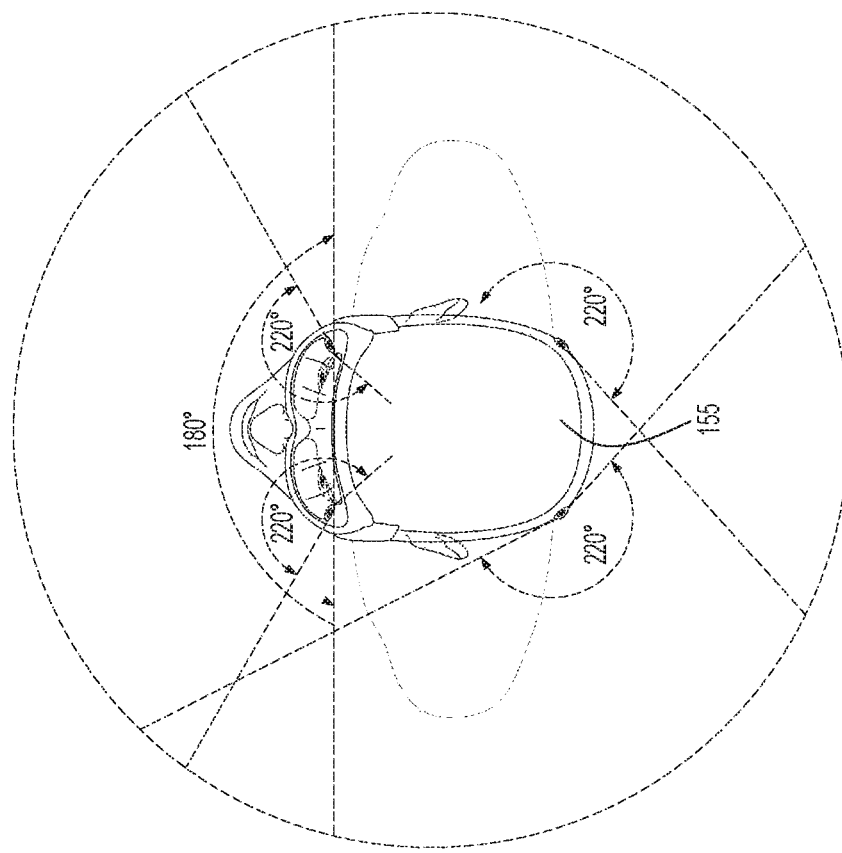
FIG. 35 is a diagrammatic top view illustration of the horizontal plane fields of view captured by the cameras of the goggles assembly of FIG. 32 with the goggles assembly superimposed according to certain embodiments presented herein.
Figure 34:
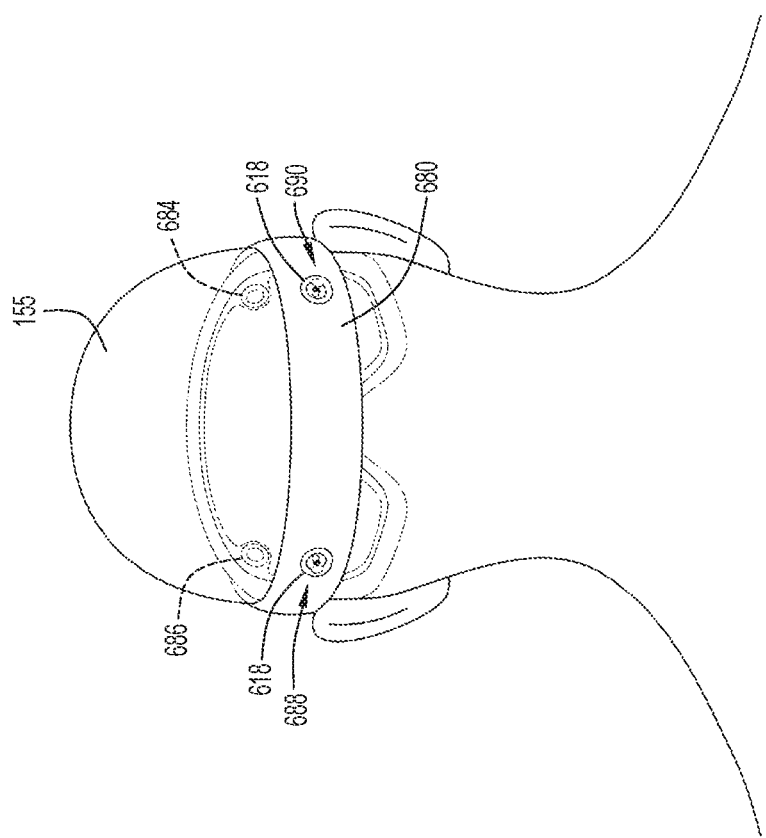
FIG. 34 is a rear view in elevation illustrating an operator wearing the goggles assembly of FIG. 32 and showing the left and right rear cameras according to certain embodiments presented herein.

As illustrated in FIGS. 32 and 33, the right side portion 676 of frame 672 has a distal end projecting beyond the operator's right eye and the left side portion 678 of frame 672 has a distal end projecting beyond the operator's left eye. A right front facing video camera/recorder assembly 684 is embedded in the distal end of the right side portion, and a left front facing video camera/recorder assembly 686 is similarly embedded in the distal end of left side portion 678 of the goggles assembly 670 so as to project beyond the operator's left and right eyes, respectively, when the goggles assembly is worn by the operator. Further, multiple spaced apart rear facing video camera/recorder assemblies 688, 690 are secured to a portion of the elastic strap 680 extending around the back of the wearer's head 155. As shown in FIG. 34, the rear facing camera/recorder assemblies 688, 690 are located on the elastic strap adjacent respective left and right sides of the wearer's head. Each camera/recorder assembly 684, 686, 688, 690 typically includes a wide angle lens.

Each front facing camera/recorder assembly 684, 686 has a wide angle lens 618 with a field of view of approximately 220°. The field of view provided by each front facing camera/recorder assembly is diagrammatically illustrated in FIG. 35. It will be appreciated that wide angle lenses having other angular fields of view may be utilized, if desired. Moreover, each camera/recorder assembly 684, 686 is forward facing and positioned at the distal end of its respective leg portion with its lens exposed in order to allow the forward field of view and ocular eye movements of the wearer to be captured contemporaneously. Each camera/recorder assembly 684, 686 provides a continuous video stream of front facing images and ocular eye images, respectively. More specifically, lens 618 of each front facing video/recorder assembly 684, 686 is angled to face slightly inward to capture direct images of the operator's eyes from a peripheral vantage point. The two front facing camera/recorder assemblies allow the head mounted image capture device (goggles unit) 670 to capture the user's (operator's) eye movements while viewing the front facing images during a situational event. The two front facing camera/recorder assemblies 684, 686 capture the front facing images as viewed by the operator or user wearing the device (goggles unit) 670. The front facing images are obtained continuously in real time, recording everything viewed by the operator wearing the goggles assembly 670 in a manner similar to the headset embodiment of FIGS. 24 and 25, as described.

Referring now to FIGS. 36-40, an example embodiment of a flexible torso mounted image capture apparatus 700 is illustrated. The image capture apparatus may be utilized as a stand-alone image capture system or in conjunction with any of the exemplary head mounted image capture devices of FIGS. 24, 27 and 32 to permit capture of a wearer's (user/operator) surroundings, i.e., the capture of a field of view of approximately 360° about the operator during an incident or a situational event.

Figure 37:
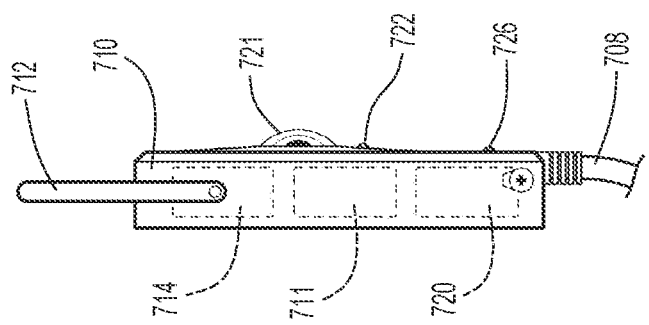
FIG. 37 is a left side view of the transmitter unit shown in FIG. 36 illustrating the unit charging port, antenna and transmitter/camera indicators in accordance with certain embodiments presented herein.
Figure 36:
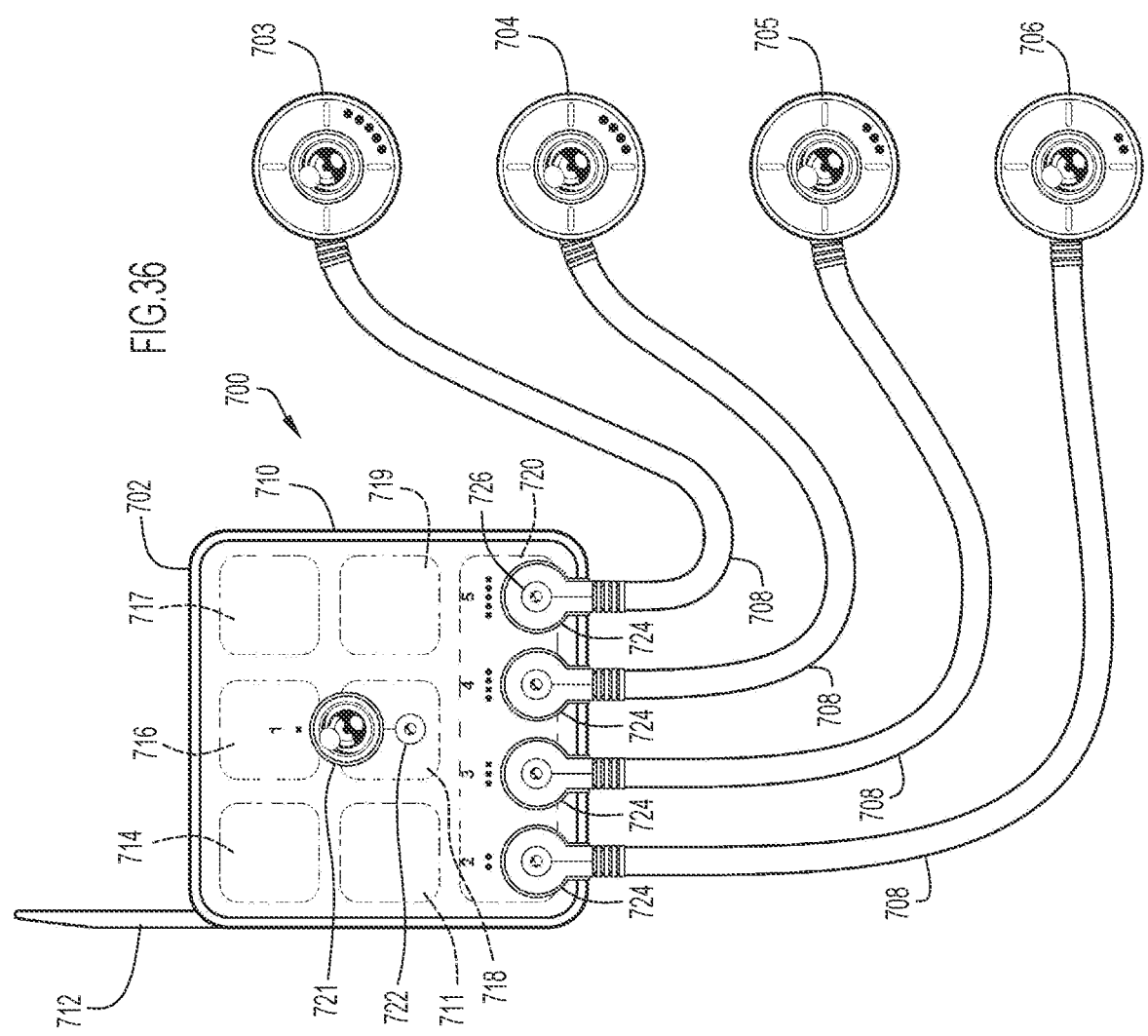
FIG. 36 is a diagrammatic front view illustrating a torso mounted image capture apparatus showing a transmitter unit with multiple micro-cameras connected to the transmitter unit by a data transfer cable in accordance with certain embodiments of the present invention.

As may be seen in FIG. 36, the torso mounted image capture apparatus 700 comprises a transmission unit 702 and a plurality of video camera/recorder assemblies 703, 704, 705, 706 connected to the transmission unit via data transmission cables 708. The transmission unit and video cameras may be harnessed to a remotely located user/operator to capture the 360° field of view about the operator as described. The transmission unit 702 includes a transmitter case 710 housing a transmitter 714, multiple computer processing units (CPUs) 716-719, a memory component 711, and a battery 720. As shown in FIG. 37, an antenna 712 is rotatably attached to a side wall of the transmitter case 710 and is operatively coupled to the transmitter 714. The transmitter case 710 may be formed of hard plastic or metal or similar material to protect the components of the transmission unit from being damaged.

In addition, the transmitter case 710 includes a light emitting transmitter indicator 721 secured to an outer case surface for indicating to the wearer (user/operator) whether transmission unit 702 is on or off, and a light emitting camera indicator 722 secured to the outer case surface adjacent the transmitter indicator for informing the operator whether video camera/recorder assemblies 703-706 are powered on or off. Typically, indicators 721, 722 are light emitting diodes (LEDs); however, any other suitable light emitting indicators may be utilized.

Figure 40:
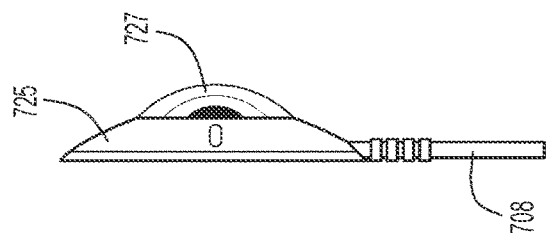
FIG. 40 is a side view illustrating the camera of FIG. 39 showing the camera case and camera lens in accordance with certain embodiments presented herein.
Figure 39:
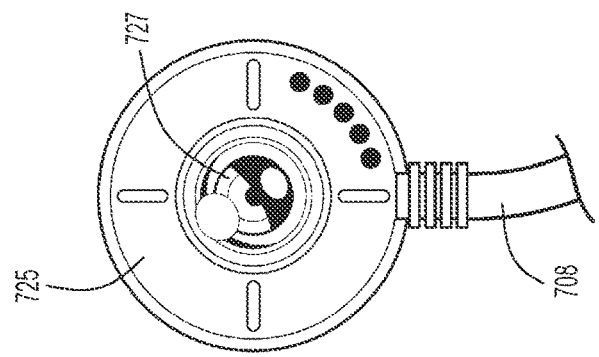
FIG. 39 is an enlarged front view of one of the cameras illustrated in FIG. 36 showing the camera case, camera lens and indicator lights in accordance with certain embodiments presented herein.
Figure 38:
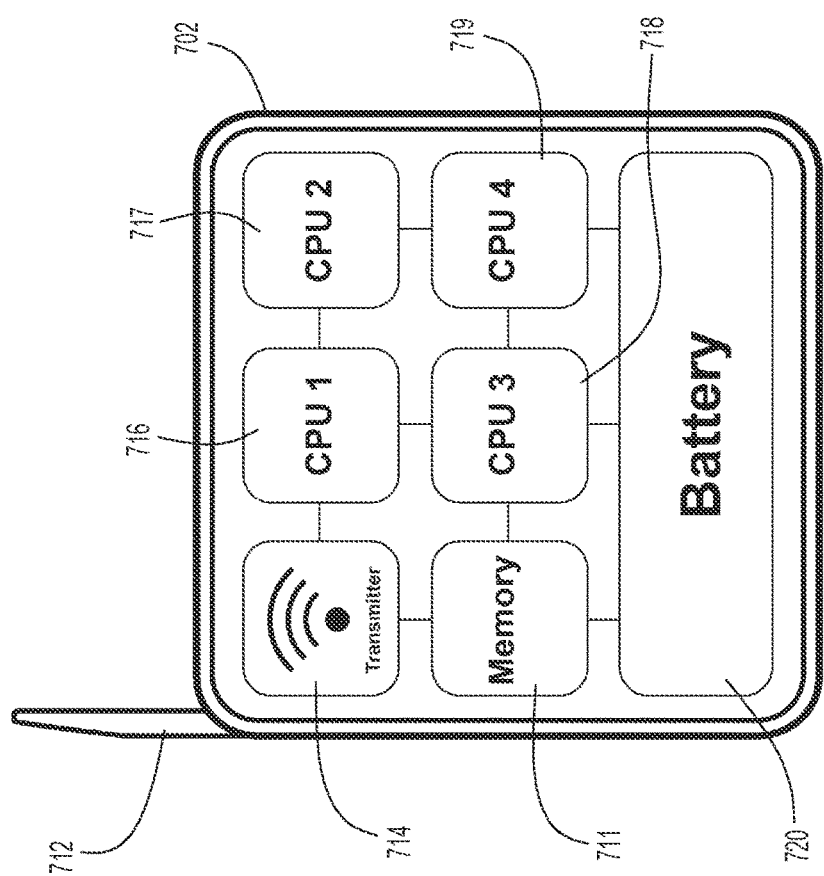
FIG. 38 is a cross-sectional view of the transmitter unit shown in FIG. 36 illustrating electronic components located in the transmitter case according to certain embodiments presented herein.
Figure 42:
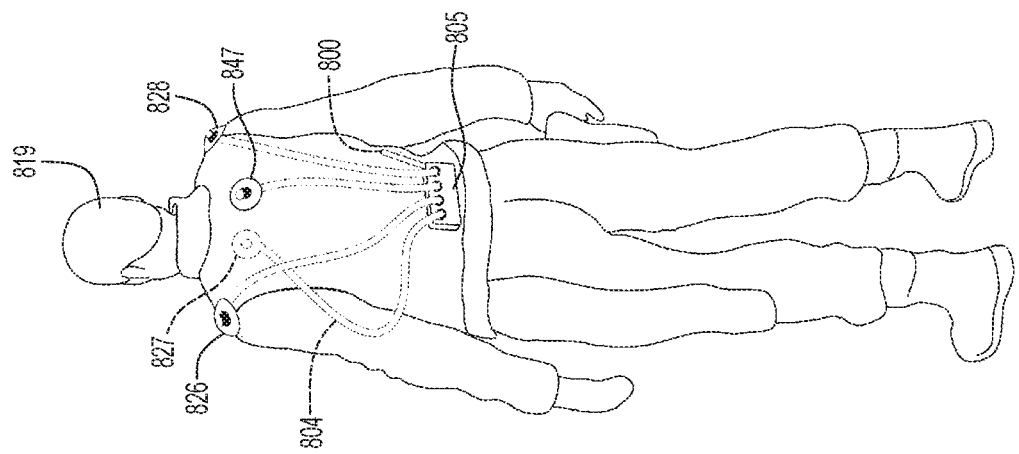
FIG. 42 is a rear perspective view, right, illustrating an operator wearing the torso mounted image capture apparatus of FIG. 36 with the transmitter unit being worn in the rear middle of the torso in accordance with certain embodiments presented herein.
Figure 41:
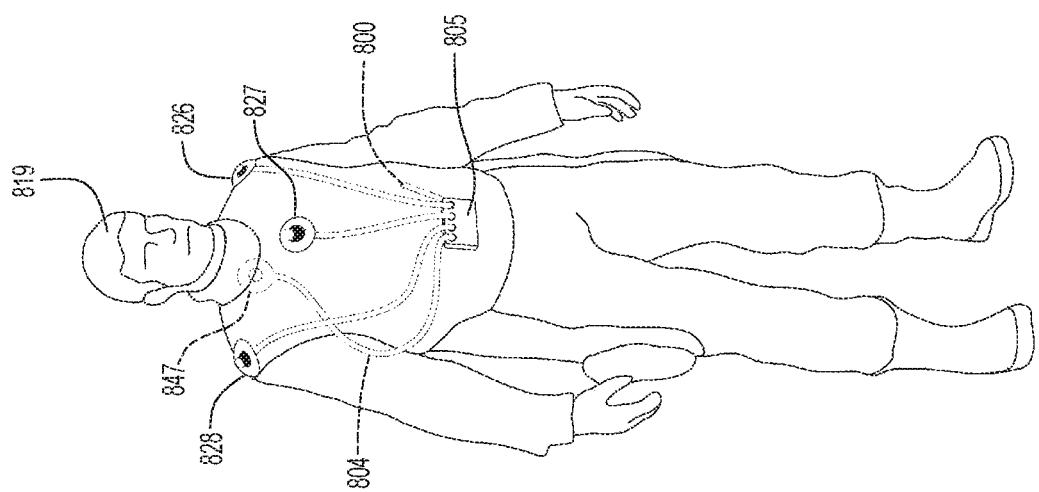
FIG. 41 is a front perspective view, right, illustrating an operator wearing the torso mounted image capture apparatus of FIG. 36 with the transmitter unit being worn in the front middle of the torso in accordance with certain embodiments presented herein.

Each of the data transmission cables 708 has a distal end operatively connected to a respective video camera/recorder assemblies 703-706, and a proximal end operatively attached to a plug-in connector 724 configured to engage with a port (not shown) in the transmitter case for connecting the camera to the transmitter unit's power source (i.e., battery) 720. As illustrated in FIG. 36, each plug-in connector 724 includes an embedded light source, e.g., a light emitting diode (LED) 726 to indicate the operational state of the camera to an operator/user of the apparatus. As shown in FIGS. 36 and 39-40, the respective video camera/recorder assemblies include a camera case 725 and a camera lens 727.

Figure 44:
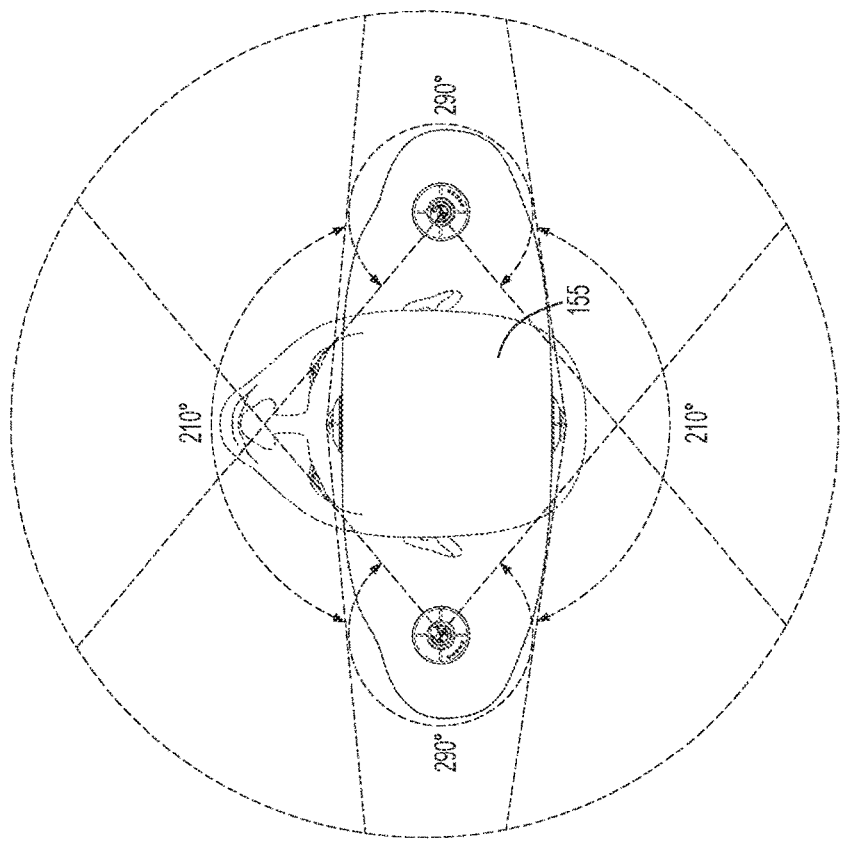
FIG. 44 is a diagrammatic top view illustrating an operator wearing the torso mounted image capture apparatus of FIG. 36 and showing the horizontal plane fields of view captured by front, rear and shoulder mounted cameras according to certain embodiments presented herein.
Figure 43:
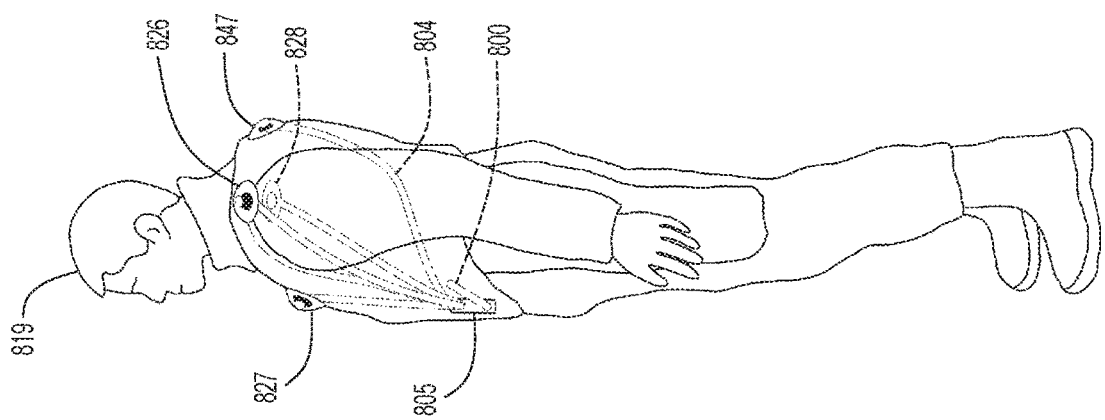
FIG. 43 is a left side view illustrating an operator wearing the torso mounted image capture apparatus of FIG. 36 with the transmitter unit being worn in the front middle of the torso in accordance with certain embodiments presented herein.

Referring to FIGS. 41-44, there is illustrated a torso mounted embodiment of the present invention. Specifically, an operator 819 is shown wearing the image capture apparatus described above in connection with FIG. 36. The system shown includes a left shoulder mounted video camera/recorder assembly 826, a front center chest mounted video camera/recorder assembly 827, a right shoulder mounted video camera/recorder assembly 828, and a center back mounted video camera/recorder assembly 847, all of which are operably connected by individual data transfer cables 804 to transmitter 805 having an antenna 800. Optionally, an additional video camera, or an alternative to chest mounted camera 827, may be positioned on the operator's head or forehead. The cameras and transmitter are of the same type, and they function in the same manner, as the cameras and transmitters described above and illustrated in connection with FIGS. 24-40. The video camera/recorder assemblies 826, 827, 828 and 847, and transmitter 805 are typically removably attached to the clothing or uniform of the operator 819 by hook and loop fastening means (e.g., Velcro) or may be permanently sewn or otherwise secured to the garment. In operation, as shown in FIG. 44, the wide angle fields of view of the cameras are individually selected and overlap to provide a combined 360° horizontal field of view about operator 819, as well as the operator's ocular movement. The images captured by the cameras are transmitted by transmitter 805 to a remote receiver where they are processed as described above.

Figure 46:
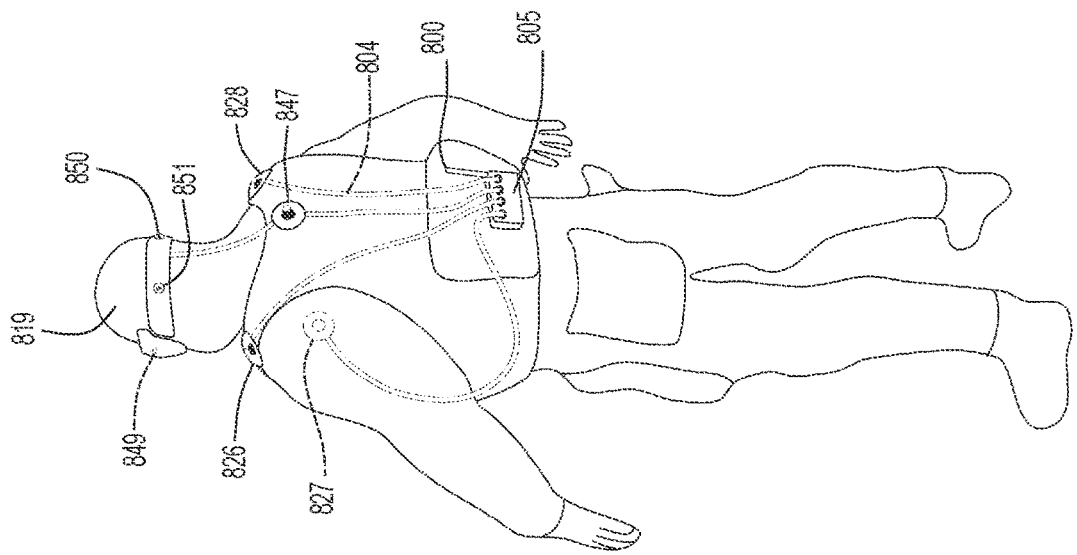
FIG. 46 is a rear perspective view, right, illustrating an operator wearing the goggles assembly of FIG. 32 in tandem with the torso mounted image capture apparatus of FIG. 36 in accordance with certain embodiments presented herein.
Figure 45:
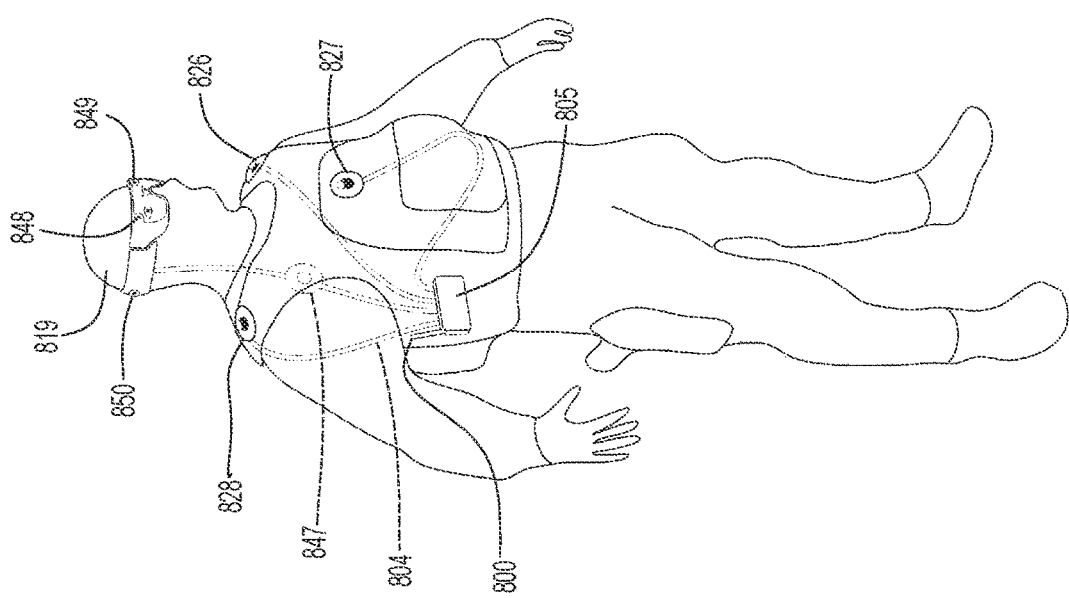
FIG. 45 is a front perspective view, right, illustrating an operator wearing the goggles assembly of FIG. 32 in tandem with the torso mounted image capture apparatus of FIG. 36 in accordance with certain embodiments presented herein.
Figure 47:
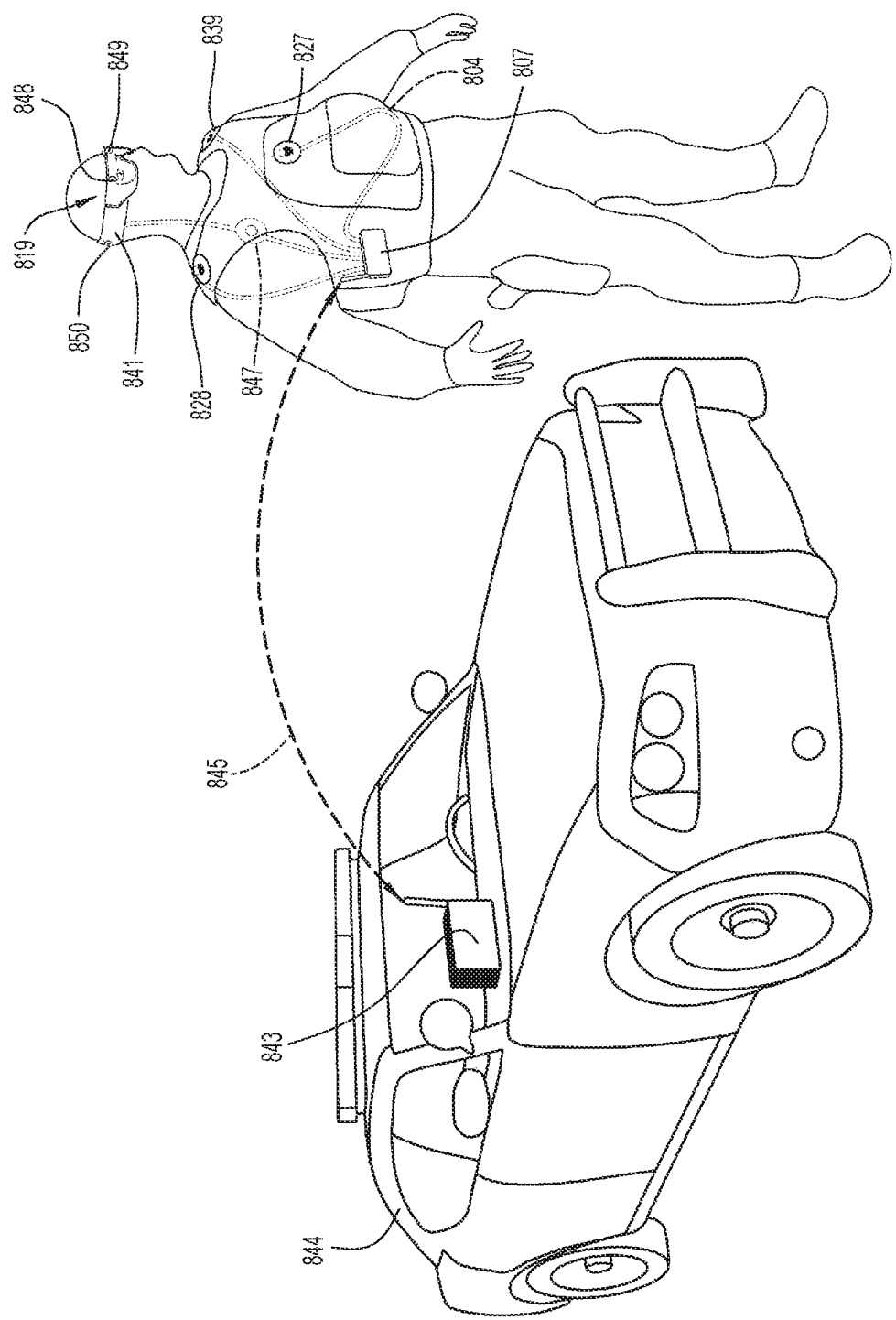
FIG. 47 is a diagrammatic view illustrating an operator wearing the goggles assembly of FIG. 32 in tandem with the torso mounted image capture apparatus of FIG. 36 and showing the transmitter unit of the image capture apparatus transmitting data to a public service vehicle equipped with a transmission receiver in accordance with certain embodiments presented herein.

Operator 819 is shown in FIGS. 45, 46 and 47 additionally wearing goggles unit 841 with additional video camera/recorder assemblies 848, 849, 850 and 851 mounted or otherwise affixed thereto. Specifically, video camera/recorder assembly 848 is affixed to the front right side of the goggles, video camera/recorder assembly 849 is affixed to the front left side of the goggles, video camera/recorder assembly 850 is affixed to the rear right side of the goggles, and video camera/recorder assembly 851 is affixed to the rear left side of the goggles. Although shown as additional video camera/recorder assemblies, video camera/recorder assemblies 848, 849, 850 and 851 may be used without any or all of video camera/recorder assemblies 826, 827, 828 and 847 as desired for given system needs. The operator is shown in FIG. 47 in communication with a nearby emergency vehicle (e.g., a police car) 844 with which the operator is in communication via a local communication link 845 (e.g., a Bluetooth wireless connection). In this embodiment the body worn transmitter 805 in transmitter case 807 transmits the video image signals from the body worn video camera/recorder assemblies to a receiver assembly 843 in vehicle 844. The signal received at receiver 843 may be processed at the vehicle and/or transmitted on to a central location for processing pursuant to system operation described herein.

Figure 48:
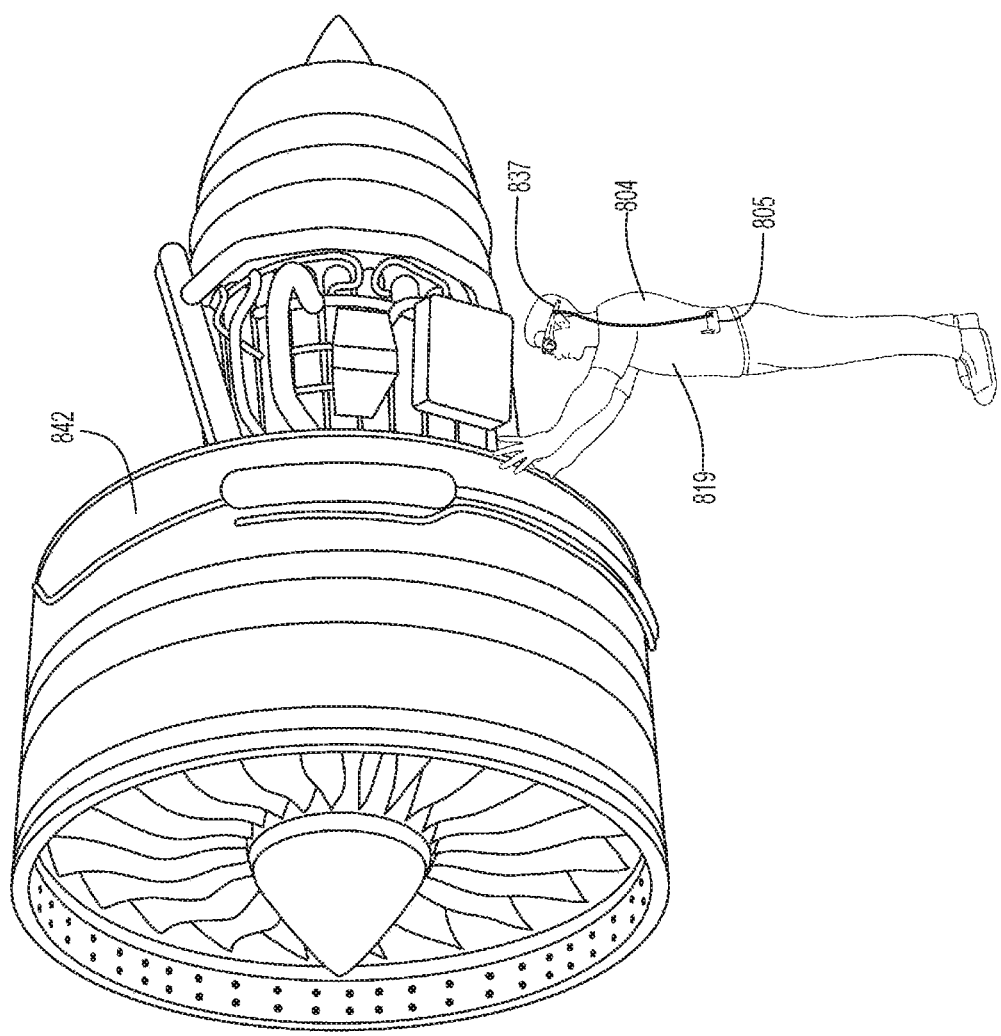
FIG. 48 is a diagrammatic view illustrating equipment being serviced, maintained or repaired by an operator wearing the eyeglasses frame assembly of FIG. 27 connected through data transfer cable to the transmitting unit shown in FIG. 36 for sending data via the transmitter shown in FIG. 38 to a central processor in accordance with certain embodiments presented herein.

Another utilization of the system and method of the present invention is illustrated in FIG. 48 wherein an operator 819 is shown servicing equipment, in this example an engine 842, but which can be any mechanical, electromechanical, electrical, electronic or fluid dynamic part or system. The operator is shown wearing an eyeglasses embodiment 837 (e.g., of the type shown of FIGS. 27-30) but any of the embodiments described and illustrated herein may be utilized, depending on the equipment being serviced and the service environment. A data transfer cable transmits the video data signals from the video camera(s) mounted on the eyeglasses 837 to that transmitter unit 805 which in turn transmits the data to a supervisory or central location. The camera positions are selected to permit visual monitoring of the operator's field of view and ocular movement.

Figure 49:
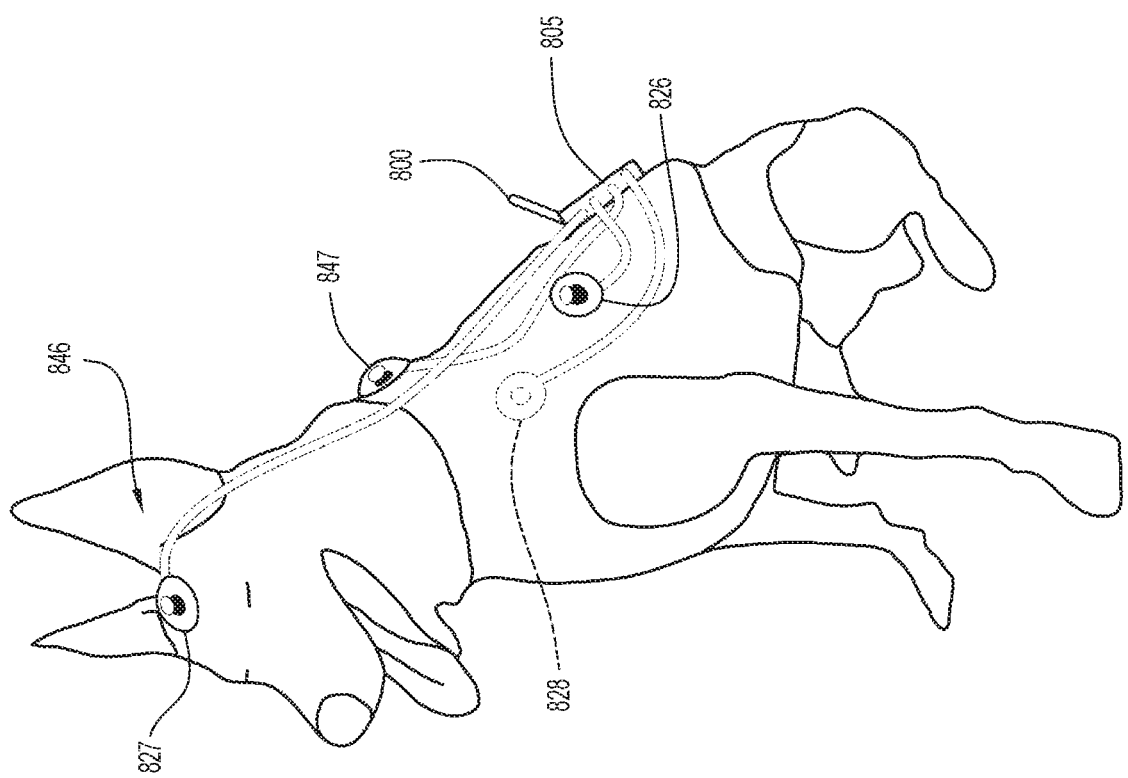
FIG. 49 is a perspective view from above, left, illustrating a service animal wearing the torso mounted image capture apparatus of FIG. 36 according to certain embodiments presented herein.

Referring to FIG. 49, a service animal 846 is shown wearing the torso mounted image capture apparatus of the type described above in connection with FIG. 36. Shown are a center back mounted video camera/recorder assembly 847, a head mounted video camera/recorder assembly 827, a left shoulder mounted video camera/recorder assembly 826 and a right shoulder mounted video camera/recorder assembly 828 operably connected to transmitter 805 which transmits the RF-modulated video signals to a central location via antenna 800.

Figure 50A:
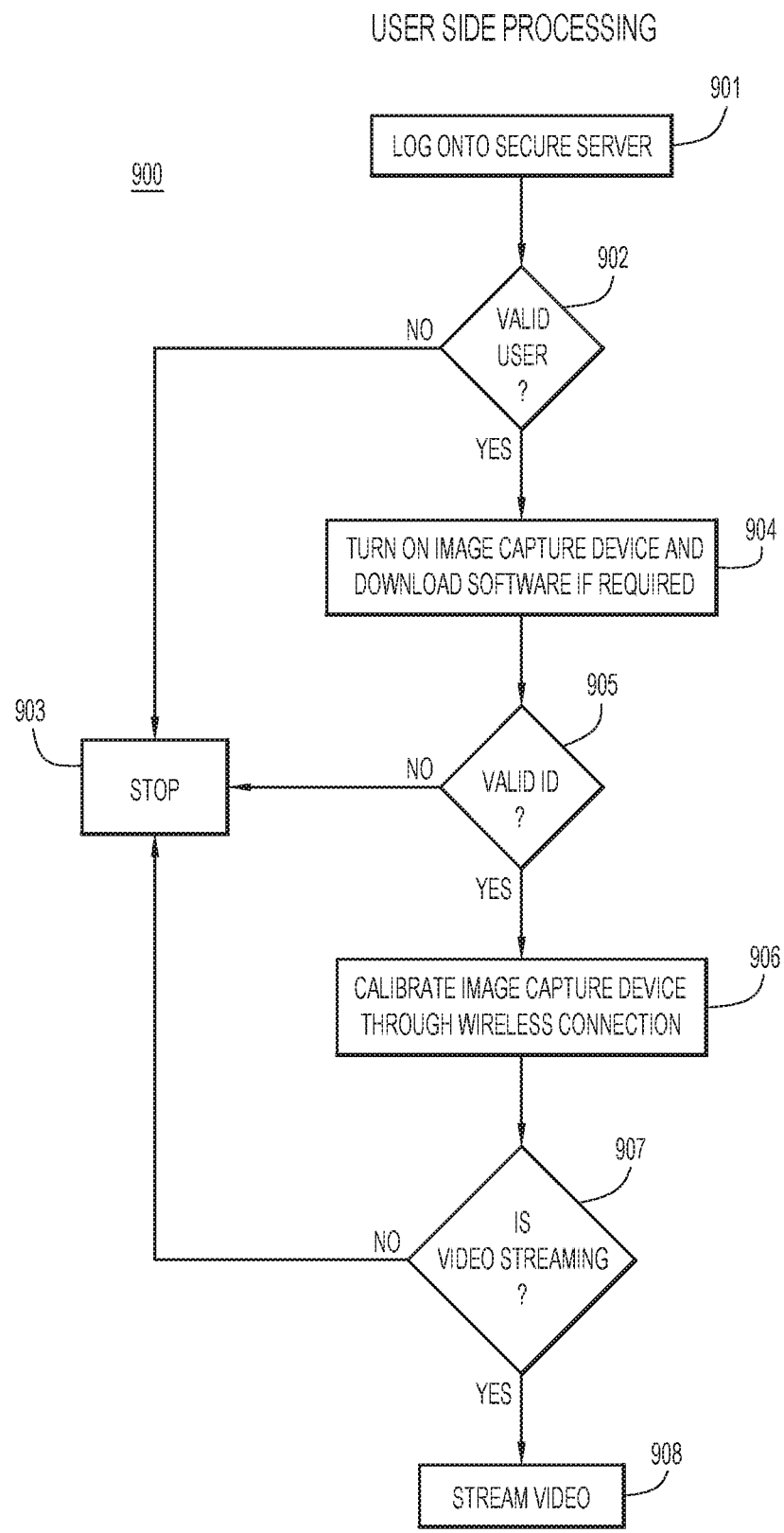
FIGS. 50A and 50B comprise a flow chart illustrating an embodiment of operator side processing according to the present invention.
Figure 50B:
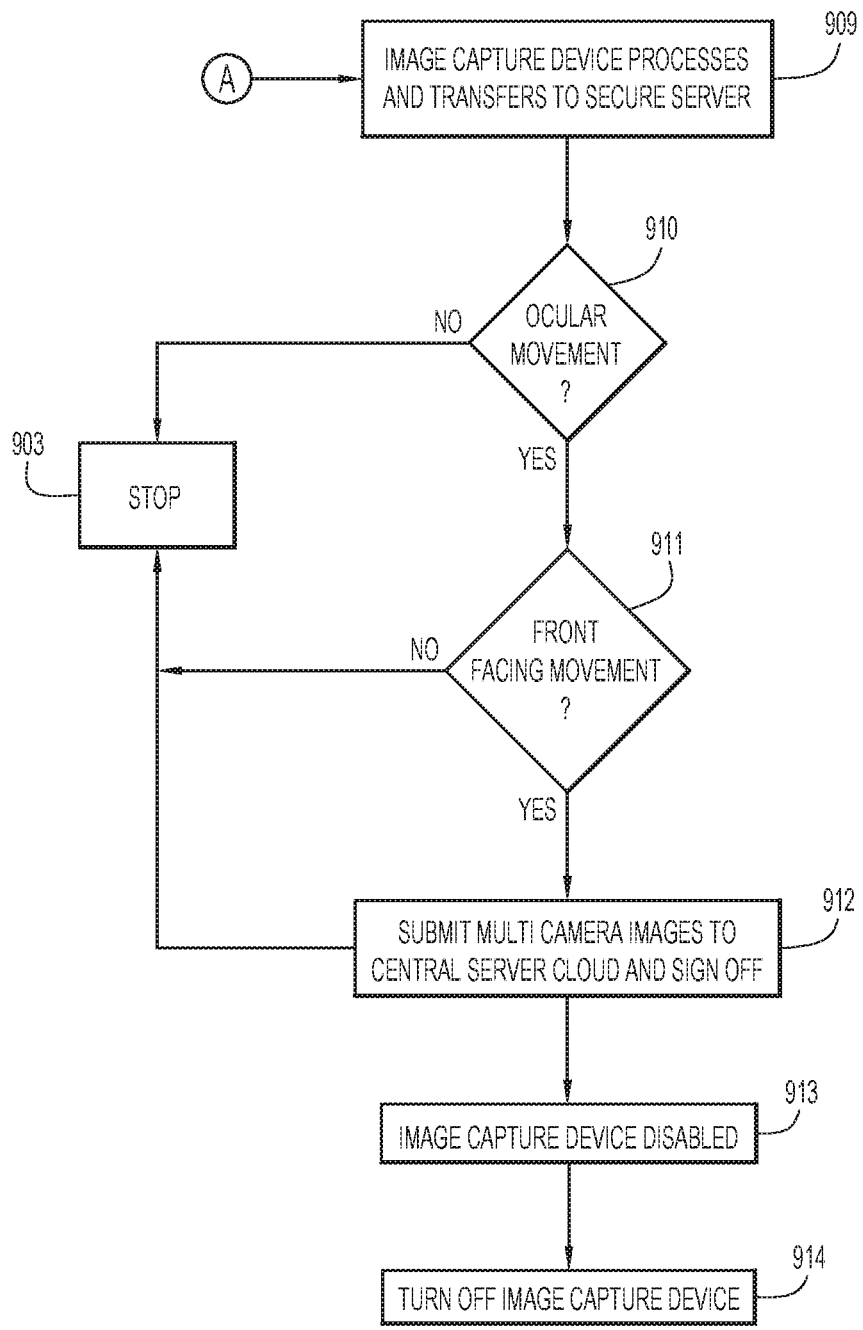

FIGS. 50A and 50B constitute a flow chart illustrating the user (operator) side process 900 for a typical embodiment of the invention. Process 900 may be executed by any video image capture device illustrated and described herein. In process block 901, the user logs onto the secure test site. In process block 902 there is interaction between the user and the remote site to validate the user. If it is determined that the user (operator) is invalid, the image capture device will stop as indicated in process block 903. In block 904, if the user passes the first validity test, he/she is prompted to turn on the image capture device and download the software validation and calibration program described below in connection with FIGS. 52A and 52B. Process block 905 validates the image capture device unique ID with the user's profile. If the unique ID does not match the user's profile, process block 903 stops the processing. Process block 906 calibrates the image capture device through the wireless connection. In process block 907 the device establishes the streaming video connection with the integrated device camera through the wireless connection. In process block 908 the streaming video begins. In process block 909 the image capture device streams the 360° videos, in real time, to the secure server. In process blocks 910 and 911, if the image capture device detects that a front facing or ocular screen image has been frozen on the same image with no movement for more than a predetermined time (e.g., five minutes), the system sends a message to the user. If no response is received within, for example, fifteen seconds, the process may be shut down at process block 903. In process block 912, when the user finishes an event or situation, he/she will sign off. In process block 913, when the user signs off, the image capture device will be automatically disabled. In process block 914 the 360° camera is turned off.

Figure 51A:
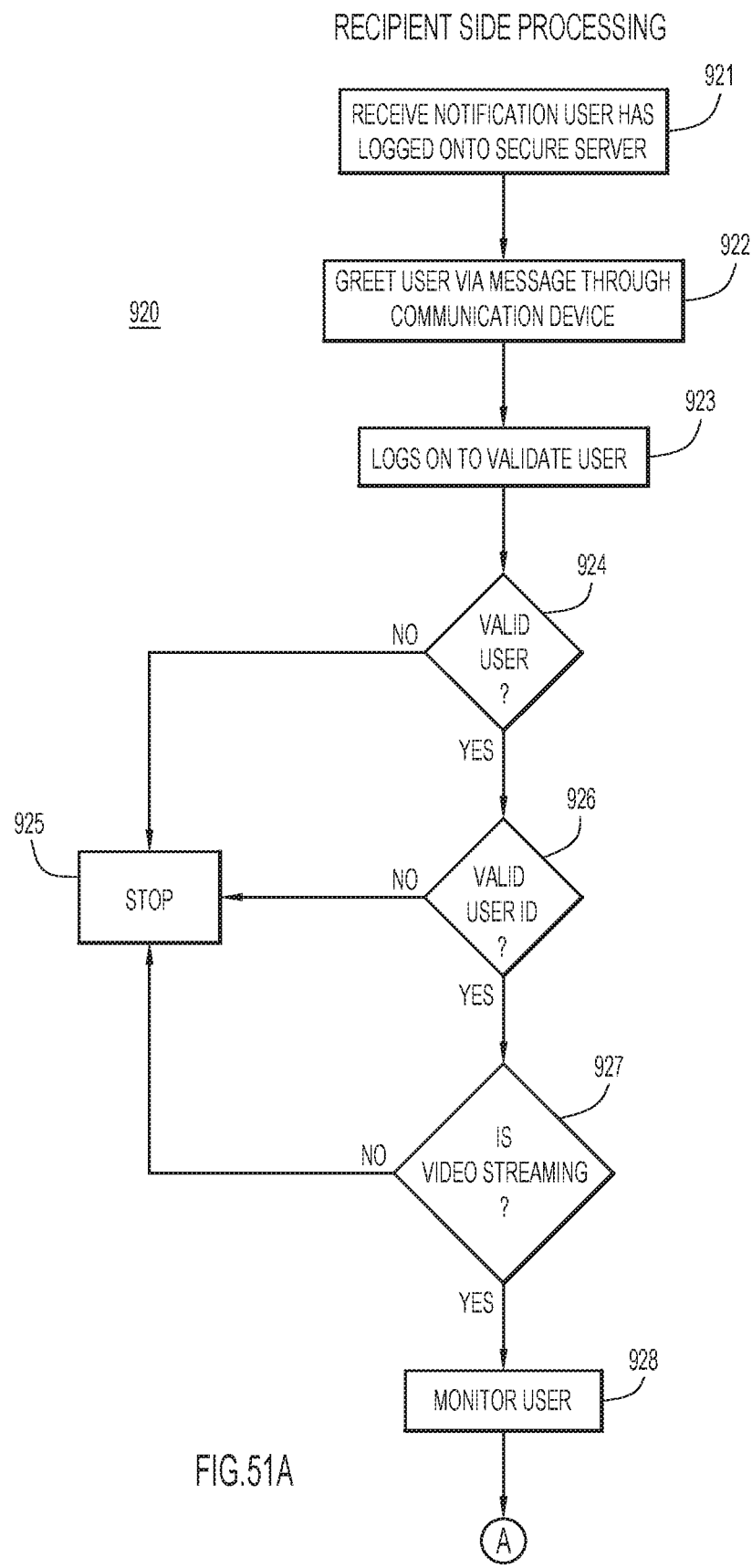
FIGS. 51A and 51B comprise is a flow chart illustrating an embodiment of recipient side processing according to the present invention.
Figure 51B:
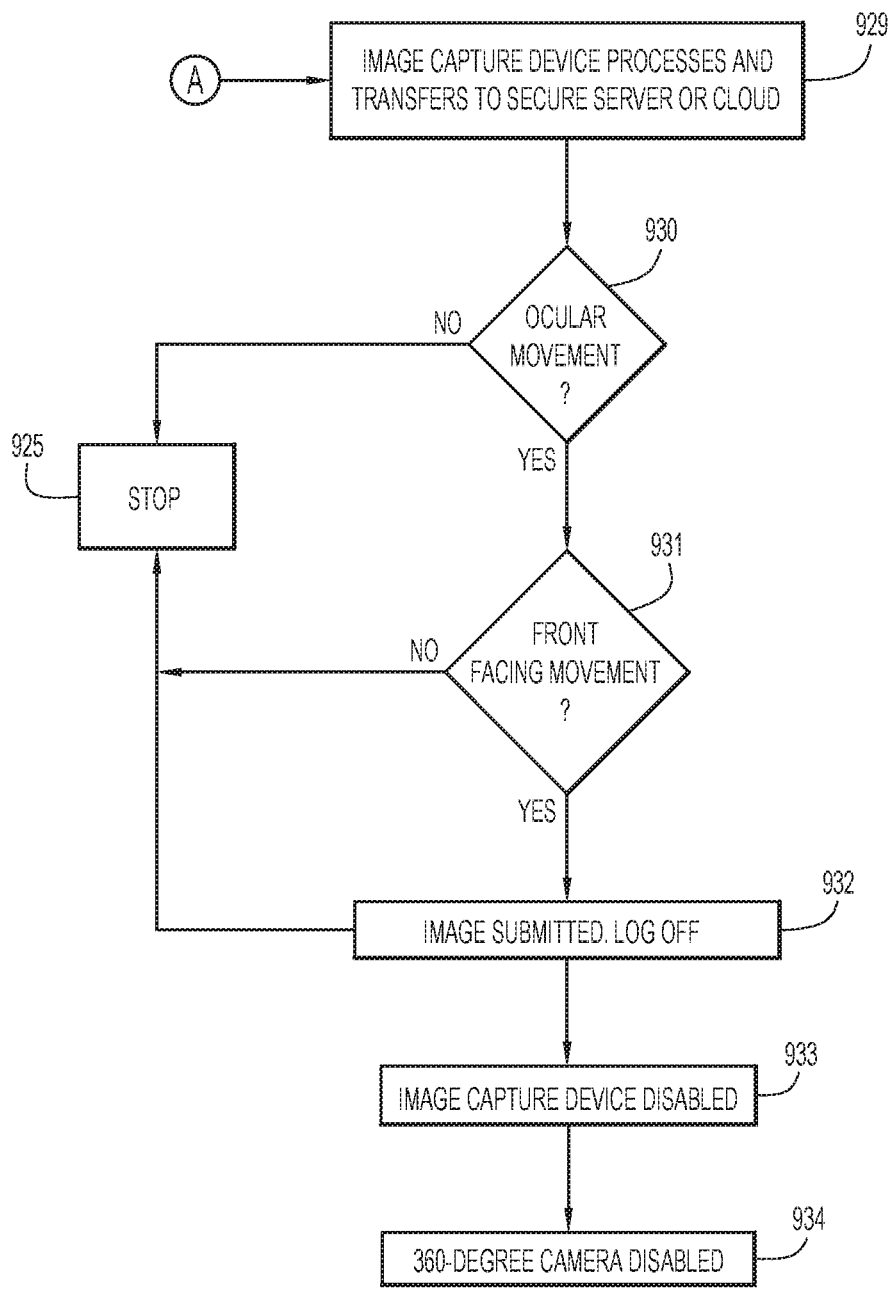

FIGS. 51A and 51B constitute a flow chart illustrating the recipient side progressing 920 for a typical embodiment of the invention. Process 920 may be executed by any image capture device described hereinabove. In process block 921 the recipient receives notification that a user (operator) has signed onto the secure server. In process block 922 there is communication between the user and the central server. In the process block 923 the server logs on to validate the user. In process block 924 the server checks the validity of the user. If it is determined the user is invalid, the process will stop at process block 925. In process block 926, if the user passes the first validity test, he/she is prompted to turn on the image capture device and download the software validation and calibration program; this process also validates the image capture detector's unique ID with user's testing profile. If the user is not valid, process block 925 will stop the processing. In process block 927 the image capture devices establish the streaming video connection with the device cameras through the wireless connection to the central server. In process block 928 the system monitors the user. In process block 929 the image capture devices are streaming 360° videos in real time to the central server. In process blocks 930 and 931, if a front facing or ocular image has been frozen on the same image with no movement for more than a predetermined amount of time (e.g., five minutes), the system will send a message to the user. If no response is received the process may be shut down in process block 925. In process block 932, when the images for the event/situation have been submitted, the user will sign off, and at process block 933 the image capture device will be automatically disabled. In process block 934 user turns off the 360° cameras.

Figure 52A:
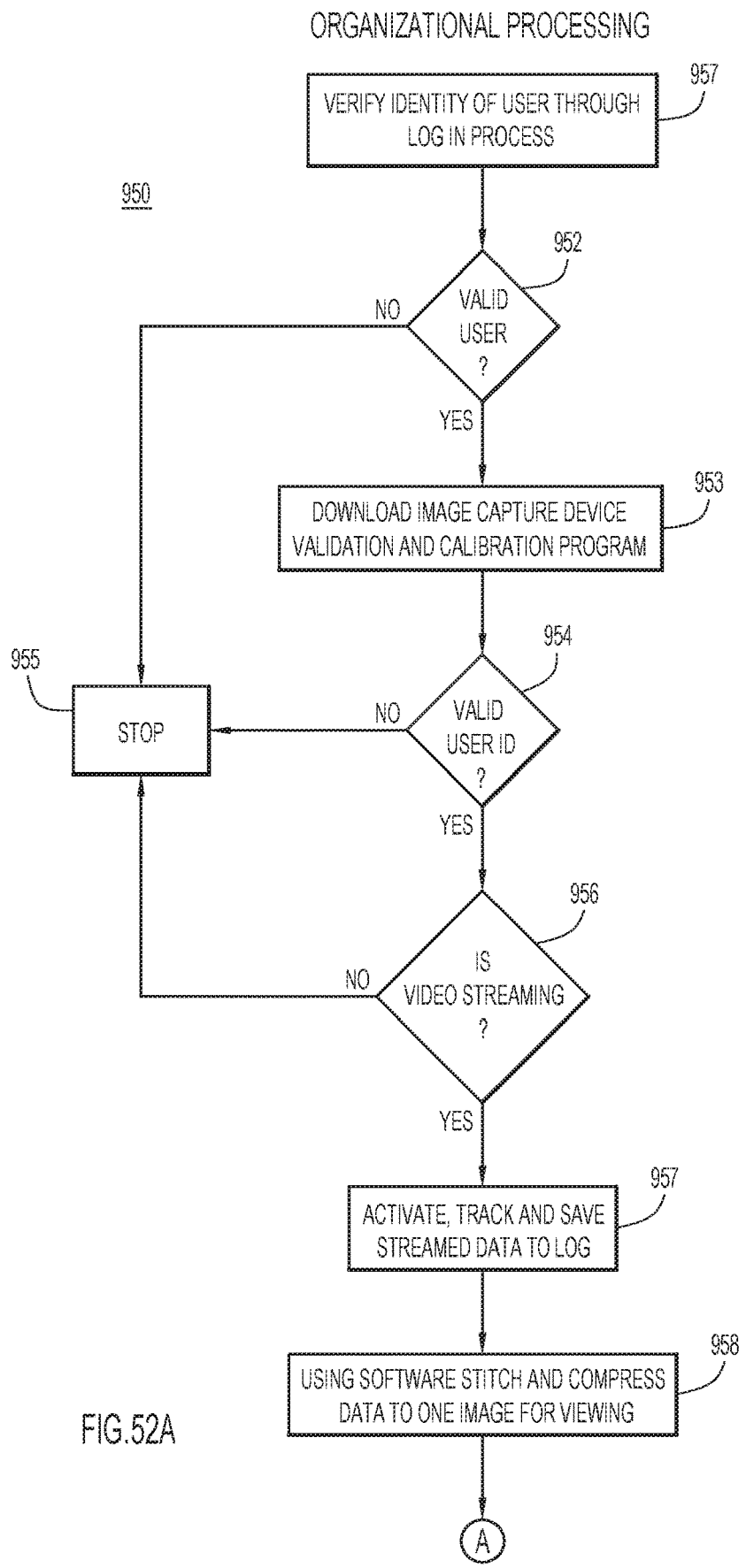
FIGS. 52A and 52B comprise a flow chart illustrating an embodiment of organization processing according to the present invention.
Figure 52B:
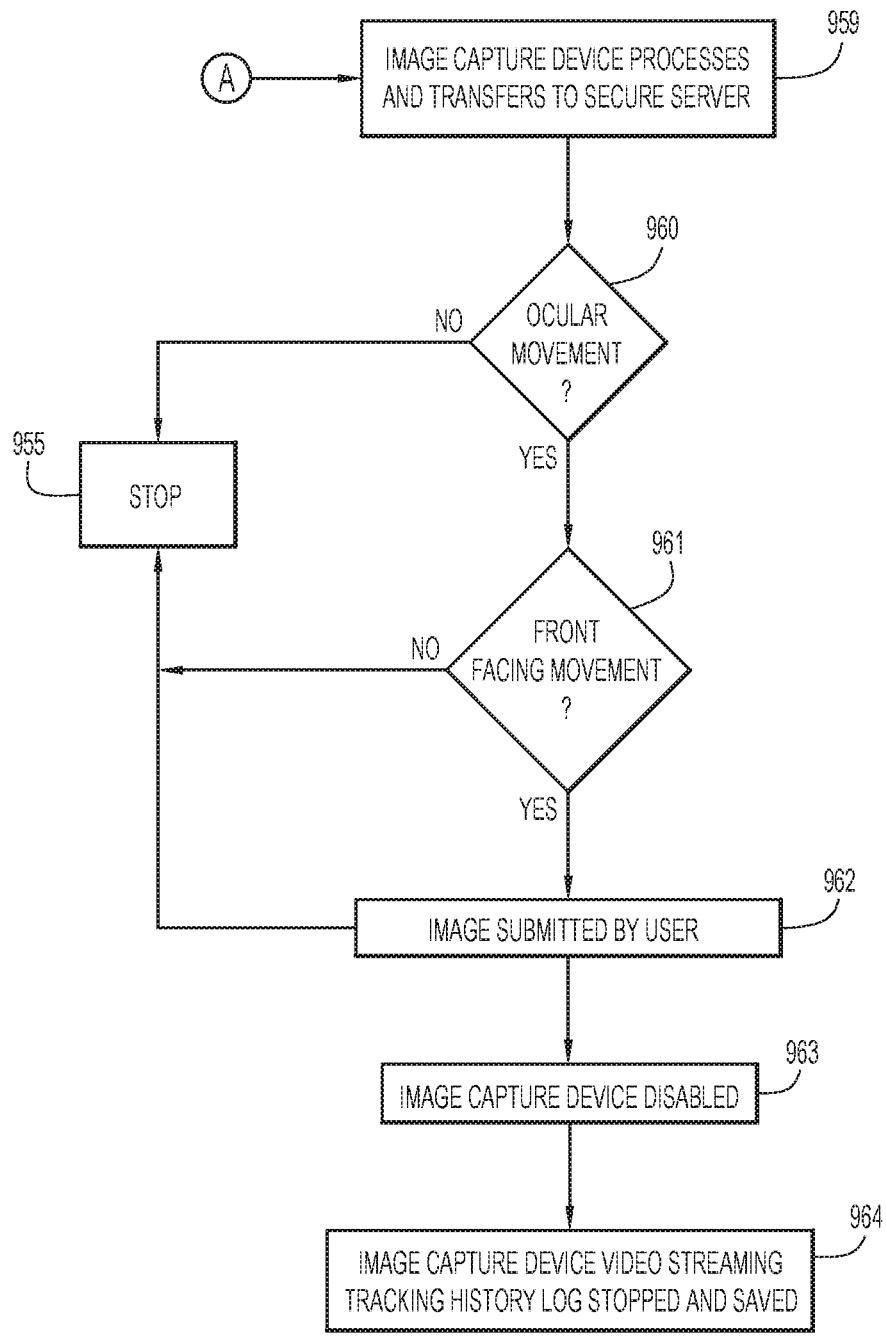

FIGS. 52A and 52B constitute a flow chart illustrating organizational processing 950 for a typical embodiment of the invention. Process 950 may be executed by any image capture device described hereinabove. In process block 951 the central server verifies the identity of the user through the secure logon procedure. In process block 952 the server checks the validity of the user, and if it is determined the user is invalid, the process will stop in process block 955. In process block 953 if the user passes the first validity test, he/she is prompted to turn on the image capture device(s) and download the software validation and calibration program; this process also validates the device's unique ID with user's profile. If the unique ID does not match the user's profile, process block 955 will stop the exam. In process block 956 the system establishes the streaming video connection with the camera(s) through the wireless connection for 360° tracking video to the central server. In process block 957 the user process is activated. In process blocks 958 and 959 the image capture device is streaming the 360° tracking videos in real time to the central server. In process blocks 960 and 961, if the image capture device detects that an image has been frozen with no movement for more than a predetermined period of time (e.g., five minutes), the system will send a message to the user. If no response is received the process may be shut down in process block 955. In process block 962, when the situation/event has terminated, the user will sign off, and at process block 963 the image capture devices will be automatically disabled. In process block 964 the device video streaming tracking history log is stopped and saved for the situation/event.

From the foregoing descriptions it will be understood that, in the image capture devices described herein, the camera systems may be coupled with the device processor which may include a microprocessor, graphic processor and wireless transmitter. The omnidirectional video signals are transmitted from the video camera by the wireless transmitter and then remotely streamed to the secure central server.

The image capture device camera systems capture the omnidirectional images as viewed by the user/operator wearing the devices. Omnidirectional images are sent as a continuous video stream of individual frame images.

The present invention, as described above, provides a method and system whereby multiple (i.e., two or more) image capture devices (e.g., cameras) worn by or otherwise attached on a person or animal can be used to capture video or sequential still images of a 360° horizontal view about the person or animal, which images can be transmitted automatically to a central location for viewing or processing. The cameras may be attached to the body via a flexible harness/cable system connected to a transmitter and/or to the cameras. The images captured by the cameras may be streamed live to the central server and saved. Moreover, the multiple contemporaneous images may be stitched together at the central server.

Further embodiments and uses for the system may include: tracking an athlete's eye(s) during training; assisting in safety for the elderly or disabled by alerting the person wearing the image capture device to potentially dangerous surrounding objects or impediments such as an up-coming curb; use by professionals working with remote clients when the wearer (i.e., the client) needs assistance by the professional for training; installation, maintenance or repair of equipment; use by marketing professionals for new products or films to track what interests patrons for marketing purposes such as development of a trailer for a movie; use by remote medical personnel to review emergency procedures with colleagues in another location; or for family members of a patient in a hospital or nursing home or other medical setting to use as a viable means of communication.

Having described preferred embodiments of new and improved method and system for providing secure capture and transfer of image and audio data it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A system for secure monitoring at a central location the field of view of one or more remotely located operators, the system comprising:
   a server at the central location having a file for each operator;
   for each operator:
      a first video camera configured to be worn or attached to the operator in a position to provide a first series of video and data signals representing images including a forward field of view of the operator;
      a second video camera configured to be worn or attached to the operator in a position to provide a second series of video and data signals representing images including ocular movements of the operator's eyes;
      a third video camera configured to be worn or attached to the operator to provide a third series of video and data signals representing images including a rearward facing field of view from behind the operator; and
      an operator microprocessor configured to receive and combine the first, second and third series of video and data signals from the first, second and third video cameras and continuously stream the combined signals in real time to said server for processing,
   wherein the combined signals representing the images of the operator's forward field of view and ocular eye movements are time keyed with each other,
   wherein the combined signals are monitored and analyzed in real time at the central location, and
   wherein the monitored and analyzed combined signals are stored in the operator's server file for later analysis.

2. The system of claim 1, wherein said first and third video cameras for each operator are positioned and configured such that the images including the forward field of view and the images including the rearward facing field of view comprise a combined 360° field of view about the operator.

3. The system of claim 2, wherein said first and second video cameras for each operator are secured to a head mounted unit configured to be worn or otherwise secured to the head of that operator.

4. The system of claim 3, wherein said third video camera for each operator is secured to said head mounted unit.

5. The system of claim 3, wherein said third video camera for each operator is configured to be attached to or worn on the torso of that operator.

6. The system of claim 3, wherein said third video camera for each operator is configured to be attached to or worn at the shoulder of that operator.

7. The system of claim 3, wherein said head mounted unit is an eyeglasses frame.

8. The system of claim 3, wherein said head mounted unit is a goggles assembly.

9. The system of claim 3, wherein said head mounted unit is a resiliently expandable pincher type headset.

10. A method for securely monitoring the surroundings of plural operators during events and situations comprising:
   for each operator, providing a first operator image capture device configured to be mounted on the operator's head to capture images of the operator's ocular eye movements while contemporaneously capturing images of at least the operator's forward facing field of view;
   with said first operator image capture device, transforming said images of the operator's ocular eye movements and said images of the operator's forward facing field of view to video signals;
   for each operator, transmitting said video signals from the first operator image capture device to an operator transmitter in real time;
   transmitting the video signals from each operator transmitter to a central location in real time via a transmission link; and
   at said central location with a system server, receiving the video signals for each operator from said transmission link in real time,
   at said central location, monitoring and analyzing the video signals in real time, and
   at said central location, saving information representing said monitored and analyzed video signals in files dedicated to respective operators for later analysis,
   wherein transmitting the video signals from each operator transmitter to a central location in real time includes, for each operator, time keying the transmitted video signals representing the captured images of the operator's forward facing field of view and ocular eye movements with each other,
   wherein providing said first operator image capture device further comprises providing multiple video cameras fixedly secured to said first operator image capture device, each video camera including a wide angle lens with a field of view of at least approximately 220°, and
   wherein providing multiple video cameras comprises positioning and configuring at least one of said multiple video cameras to contemporaneously capture images of the operator's forward field of view and ocular eye movements.

11. The method of claim 10, wherein providing said first operator image capture device comprises providing said image capture device as an eyeglasses frame.

12. The method of claim 10, wherein providing said first operator image capture device comprises providing said image capture device as a resiliently expandable pincher type headset.

13. The method of claim 10, wherein providing said first operator image capture device comprises positioning and configuring at least one of said multiple video cameras to capture images of the operator's rearward facing field of view.

14. The method of claim 10, further comprising, for each operator, providing a second operator image capture device configured to be worn on or attached to that operator's torso to capture images other than the operator's ocular eye movements and forward facing field of view.

15. The method of claim 10, further comprising, for each operator, providing a second operator image capture device configured to be worn on or attached to a limb of that operator to capture images other than the operator's ocular eye movements and forward facing field of view.

16. A method for secure monitoring of the field of view of remotely located operators during situational events comprising:
   for each operator, providing in real time video and data signals representing a series of images including a forward field of view of the operator, ocular eye movements of the operator, and a rearward facing field of view from behind the operator;
   for each operator, transmitting in real time the video and data signals to an operator microprocessor;
   streaming the video and data signals from each operator microprocessor in real time to a central location via a transmission link;

at a system server located at the central location, receiving the video and data signals from said transmission link for each operator;

at the system server, monitoring and analyzing the received video and data signals in real time;

at the system server, stitching together the received video signals representing the images of the operator's forward field of view and the operator's rearward field of view into a single video stream to provide a 360° field of view; and at the system server, saving information representing the operator's forward field of view, the operator's ocular eye movements, and the operator's rearward facing field of view in files dedicated to respective operators for later analysis.

17. The method of claim 16, wherein, for each operator, providing in real time the video and data signals representing a series of images of the operator's forward field of view, ocular eye movements and rearward field of view comprises providing an operator image capture device for each operator configured to be mounted on the operator's head that includes multiple front and rear video cameras fixedly secured to the image capture device to contemporaneously capture said series of images.

18. The method of claim 16, wherein providing the operator image capture device comprises providing the image capture device as an eyeglasses frame.

19. The method of claim 16, wherein providing the operator image capture device comprises providing the image capture device as a goggles assembly including an elastic strap to secure the goggles assembly against the face of the operator.

20. The method of claim 10, wherein providing multiple video cameras fixedly secured to said first operator image capture device comprises providing a left eye front facing video camera assembly and a right eye front facing video camera assembly, each video camera assembly including a wide angle lens projecting beyond the operator's eyes to provide said field of view of approximately 220° such that images of the forward facing field of view and the ocular eye movements of the operator are contemporaneously captured.

21. The method of claim 20, wherein the wide angle lens of each video camera assembly is angled to face slightly inward to capture direct images of the operator's eyes from a peripheral vantage point.

* * * * *